US006938162B1

(12) United States Patent
Nagai et al.

(10) Patent No.: US 6,938,162 B1
(45) Date of Patent: Aug. 30, 2005

(54) OPTICAL DISK, OPTICAL DISK RECORDING AND REPRODUCING APPARATUS, METHOD FOR RECORDING, REPRODUCING AND DELETING DATA ON OPTICAL DISK, AND INFORMATION PROCESSING SYSTEM

(75) Inventors: Takahiro Nagai, Osaka (JP); Hideshi Ishihara, Osaka (JP); Yuji Takagi, Osaka (JP); Takashi Yumiba, Kyoto (JP); Mamoru Shoji, Osaka (JP); Mitsuaki Oshima, Kyoto (JP); Shunji Ohara, Osaka (JP); Motoshi Ito, Osaka (JP); Takashi Ishida, Kyoto (JP); Atsushi Nakamura, Osaka (JP); Tadashi Jahana, Kanagawa (JP); Kouhei Nakata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/560,563

(22) Filed: Apr. 28, 2000

(30) Foreign Application Priority Data

| Apr. 28, 1999 | (JP) | ............................... P11-122104 |
| May 10, 1999 | (JP) | ............................... P11-128197 |
| Oct. 21, 1999 | (JP) | ............................... P11-299635 |

(51) Int. Cl.[7] ............................................. G06F 12/14
(52) U.S. Cl. ................. 713/189; 380/3; 380/4; 380/21; 380/22; 369/272; 369/273; 369/286; 713/193; 713/200
(58) Field of Search .................... 713/189, 193, 713/200–202; 369/272, 273, 286; 380/3–4, 21–22

(56) References Cited

U.S. PATENT DOCUMENTS

| 5,513,169 A | 4/1996 | Fite et al. |
| 5,596,639 A | 1/1997 | Kikinis |
| 5,646,993 A * | 7/1997 | Aizawa ........................ 705/57 |
| 5,745,568 A | 4/1998 | O'Connor et al. |
| 5,752,009 A * | 5/1998 | Nakahara et al. ............. 703/23 |
| 5,761,301 A * | 6/1998 | Oshima et al. ............... 705/57 |
| 6,081,785 A | 6/2000 | Oshima et al. |
| 6,289,102 B1 * | 9/2001 | Ueda et al. .................. 380/201 |
| 6,516,064 B1 * | 2/2003 | Osawa et al. ............... 380/201 |
| 6,546,490 B2 * | 4/2003 | Sako et al. .................. 713/193 |
| 6,587,948 B1 * | 7/2003 | Inazawa et al. ............. 713/193 |

FOREIGN PATENT DOCUMENTS

| CN | 1166223 | 11/1997 |
| EP | 0442566 A1 | 8/1991 |
| EP | 0802527 A1 | 10/1997 |
| EP | 0 802 527 | 10/1997 |
| EP | 0954173 A1 | 11/1999 |
| EP | 0984346 A1 | 3/2000 |
| GB | 2332977 | 7/1999 |
| JP | 9-171619 | 6/1997 |
| JP | 10-208386 | 8/1998 |
| JP | 2000-113586 | 4/2000 |
| WO | WO 97/14144 | 4/1997 |
| WO | 98/58368 | 12/1998 |
| WO | 00/21087 | 4/2000 |

* cited by examiner

*Primary Examiner*—Andrew Caldwell
*Assistant Examiner*—Minh Dieu Nguyen
(74) *Attorney, Agent, or Firm*—Wenderoth, Lind & Ponack L.L.P.

(57) ABSTRACT

A recording type optical disk on which data is recordable includes a data recording and reproducing area for recording data therein and reproducing data therefrom, and a read-only disk identification information area for recording disk identification information for identifying the optical disk therein. In the optical disk, the disk identification information is formed by removing a reflection film that is formed on the optical disk in a strip shape. The disk identification information includes an inherent disk identifier for each optical disk, and the data recording and reproducing area includes an area for recording encrypted data therein. The encrypted data is encrypted by using information including the disk identification information for identifying the optical disk as a key.

28 Claims, 36 Drawing Sheets

CASE WHERE KEY INDEX TO DESCRAMBLE KEY IS RECORDED IN SECTOR DATA 401 (FIRST PREFERRED EMBODIMENT)

RECORDING FORMAT OF BCA 106

DISK IDENTIFICATION INFORMATION 305

SECTOR STRUCTURE OF SECTOR DATA 401 IN USER DATA AREA 102

CASE WHERE DESCRAMBLE KEY IS RECORDED IN SECTOR DATA 401 (MODIFIED FIRST PREFERRED EMBODIMENT)

CASE WHERE KEY INDEX TO DESCRAMBLE KEY IS RECORDED IN SECTOR DATA 401 (FIRST PREFERRED EMBODIMENT)

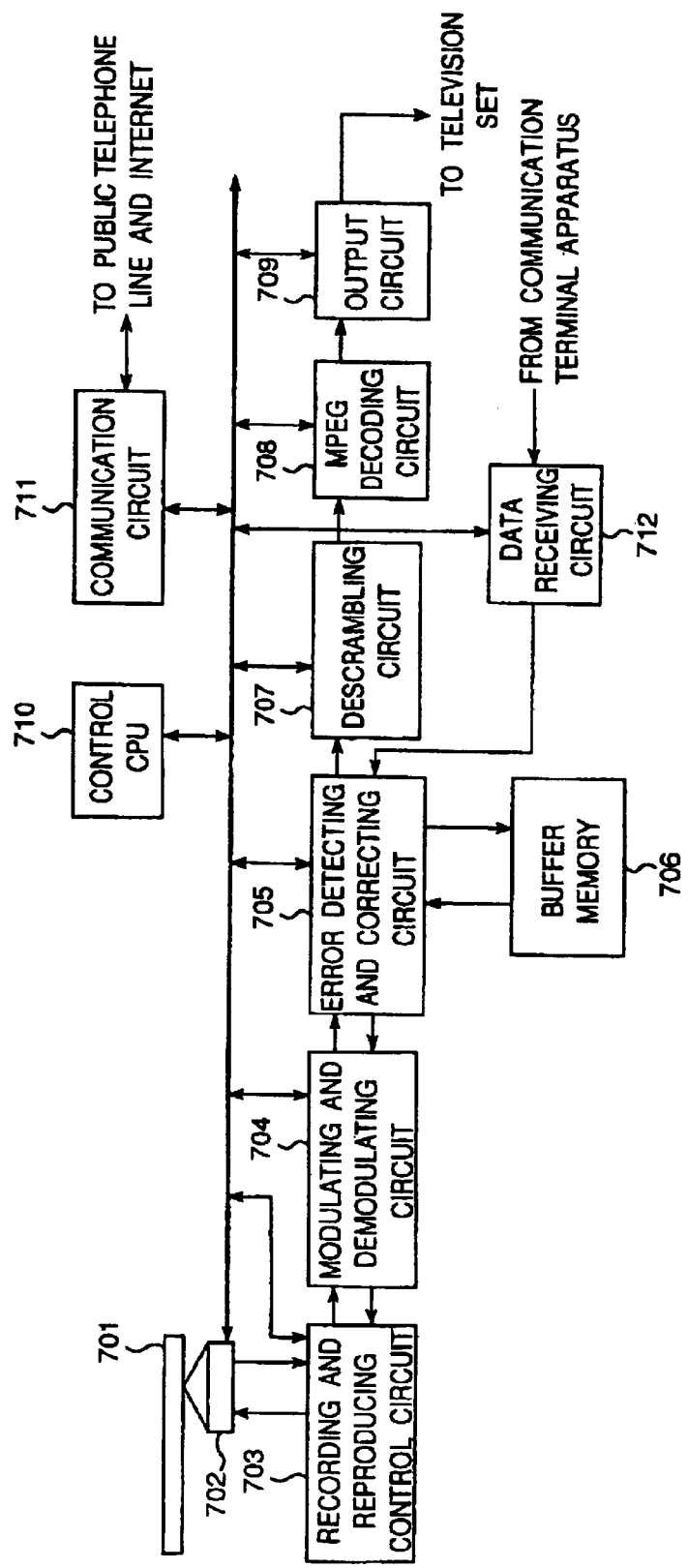

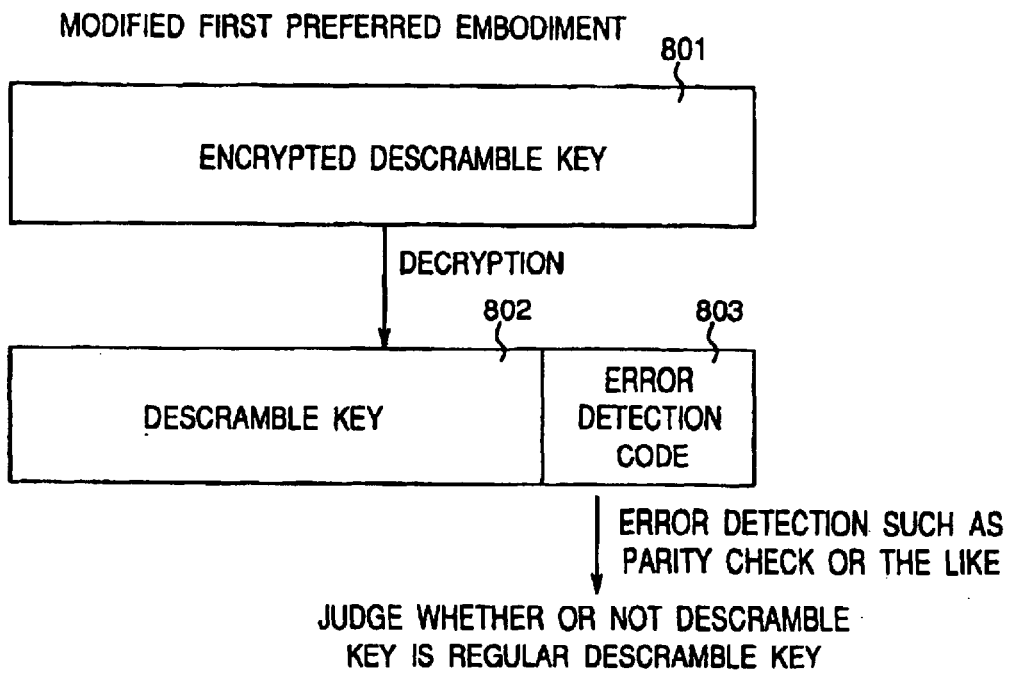

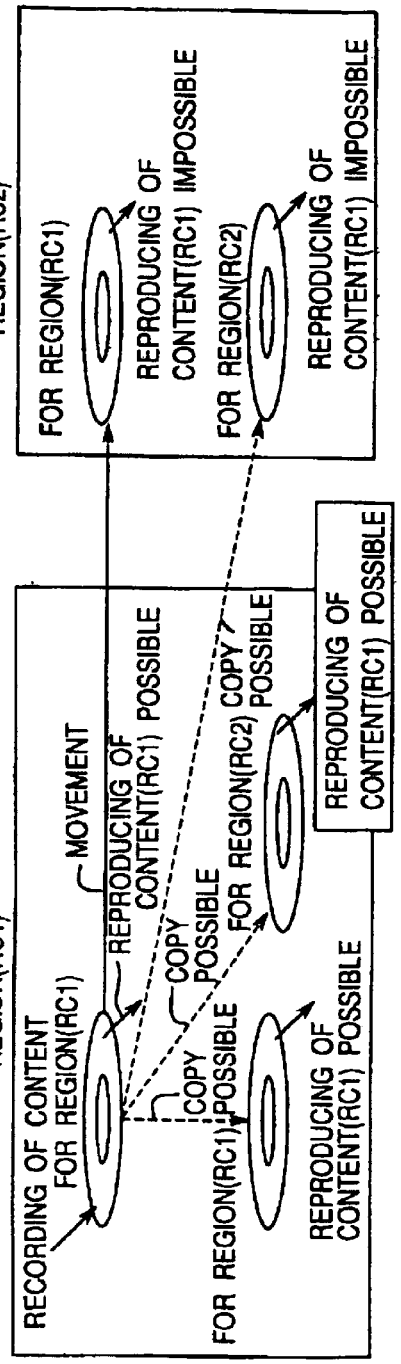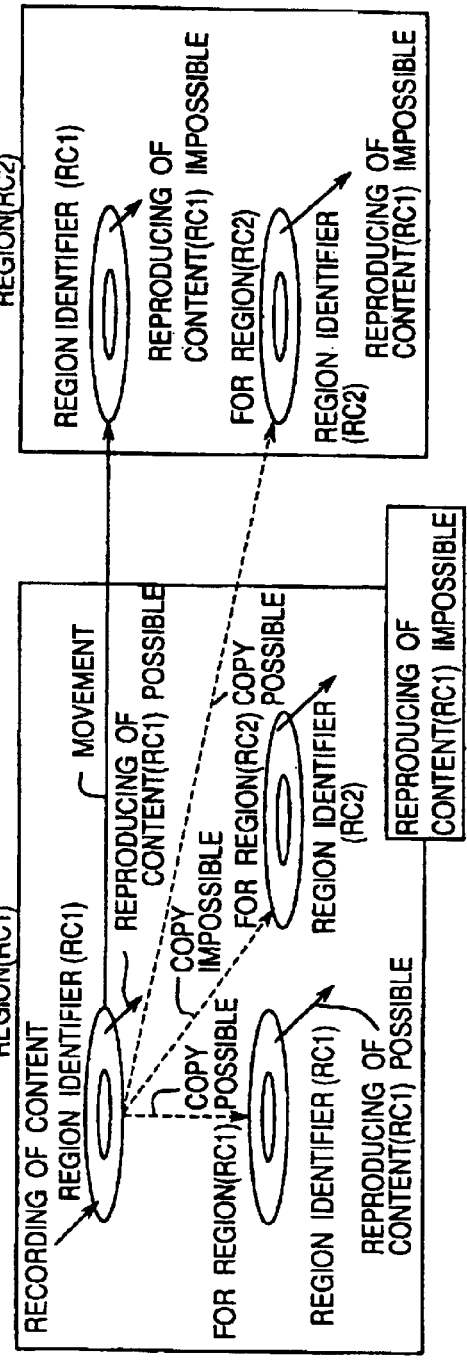
Fig.15A CASE WHERE REGION IDENTIFIER IS RECORDED IN RECORDING CONTENT
Fig.15B CASE WHERE REGION IDENTIFIER IS PREVIOUSLY RECORDED IN SHIPPING OPTICAL DISK Fig.18 BCA REPRODUCING CIRCUIT 1401

TABLE WITH ID

| | | T1 | T2 | T3 |
|---|---|---|---|---|
| TITLE CODE T | | | | |
| FIRST DECIPHER KEY FK | | FK1 | FK2 | FK3 |
| TIME LIMITING INFORMATION TIME | | TIME1 | TIME2 | TIME3 |
| SYSTEM ID | DID1 | K11 | K12 | K13 |
| | DID2 | K21 | K22 | K23 |
| | DID3 | K23 | K32 | K33 |
| DISK ID | BCAS1 | DK11 | DK12 | DK13 |
| | BCAS2 | DK21 | DK22 | DK23 |
| | BCAS3 | DK31 | DK32 | DK33 |

MODIFIED THIRD PREFERRED EMBODIMENT

Fig.26 SIXTH PREFERRED EMBODIMENT

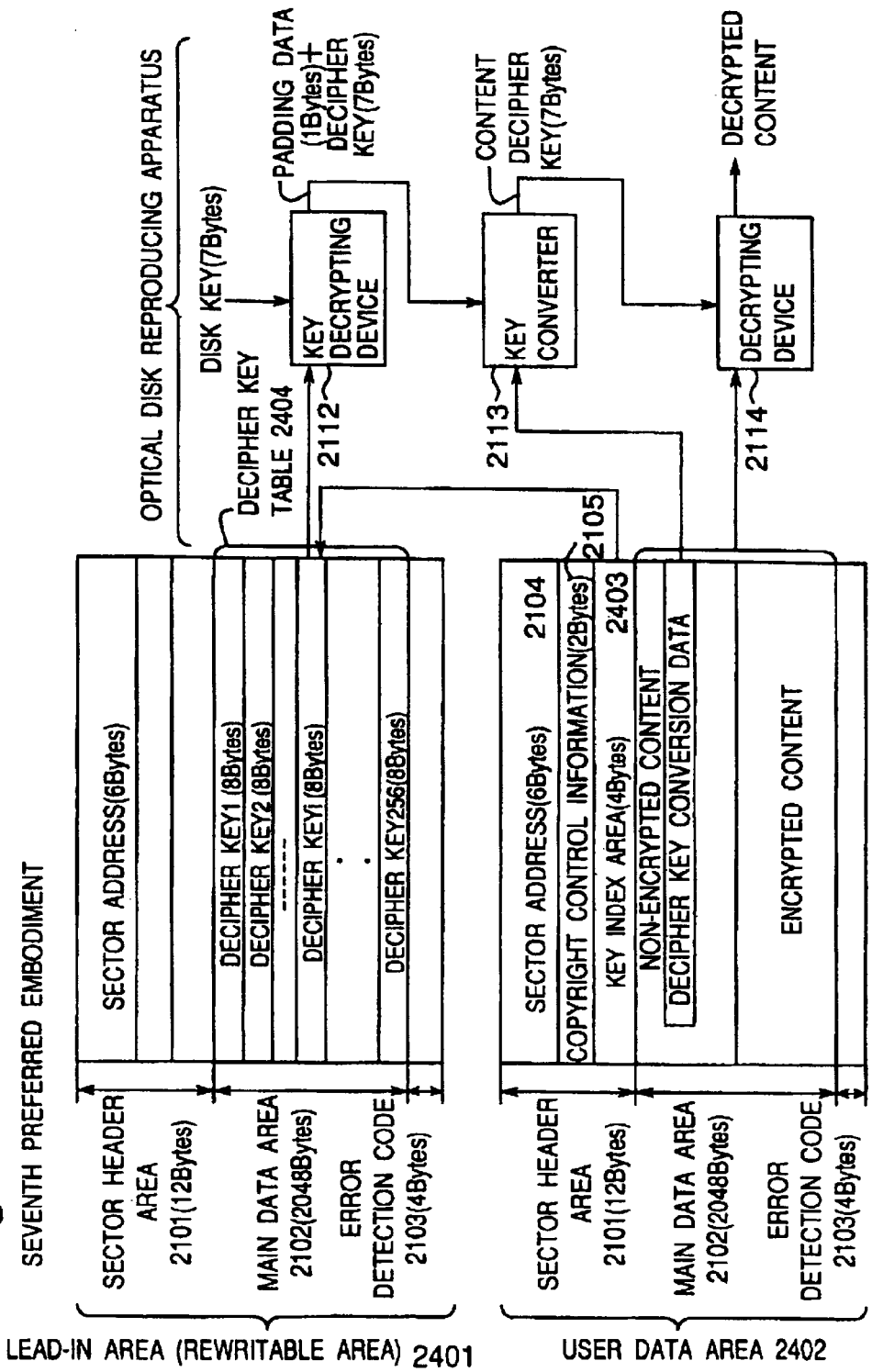

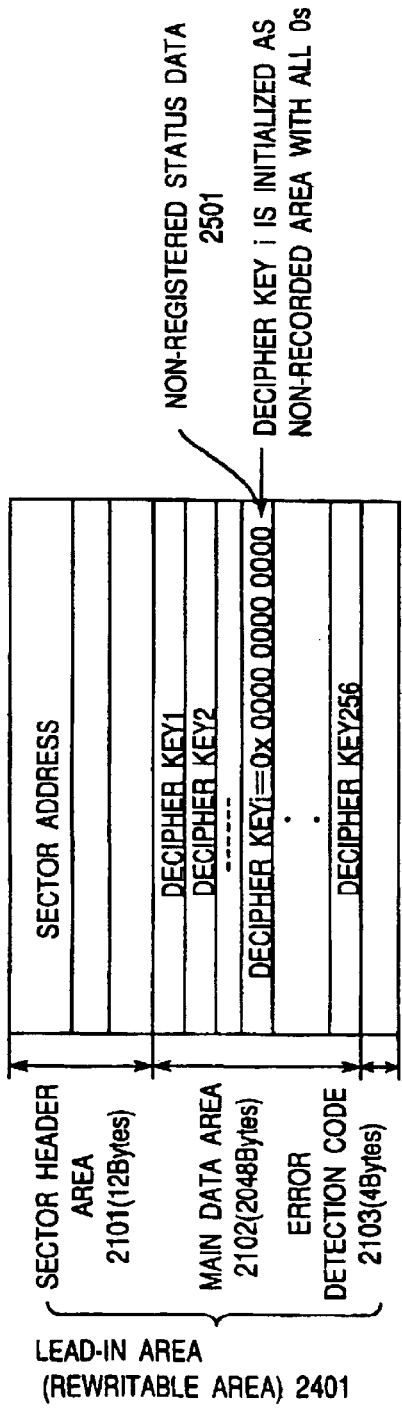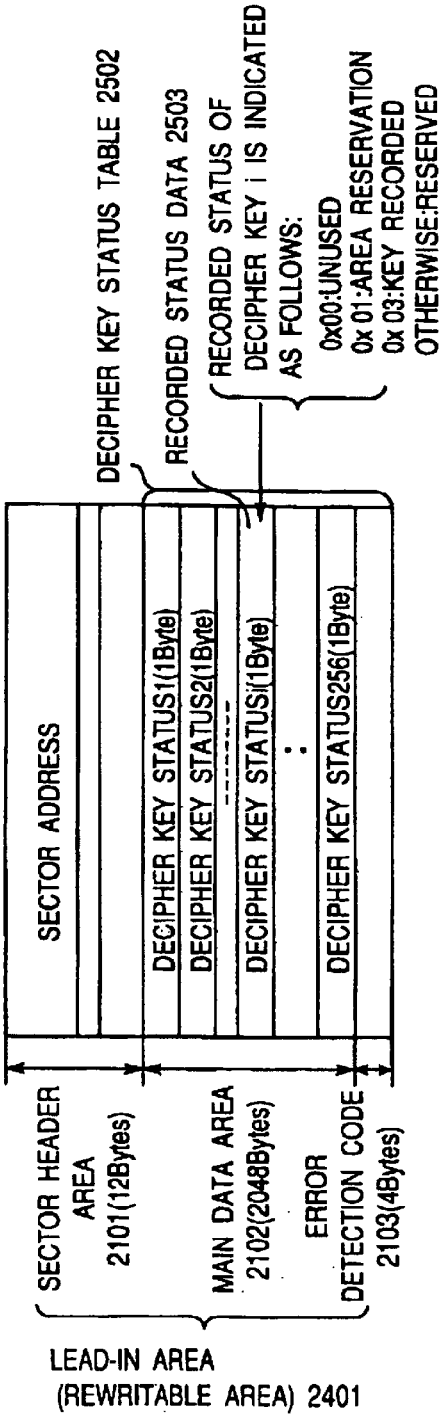
Fig.30A REPRESENTATION OF NON-RECORDED STATUS WITH INITIAL VALUE OF DECIPHER KEY
Fig.30B REPRESENTATION OF RECORDED STATUS WITH DECIPHER KEY STATUS TABLE Fig.38 ELEVENTH PREFERRED EMBODIMENT

OPTICAL DISK, OPTICAL DISK RECORDING AND REPRODUCING APPARATUS, METHOD FOR RECORDING, REPRODUCING AND DELETING DATA ON OPTICAL DISK, AND INFORMATION PROCESSING SYSTEM

BACKGROUND OF THE INVENTION

1. Field of the Invention

The present invention relates to an optical disk, an optical disk recording and reproducing apparatus, a method for recording, reproducing and deleting data on an optical disk, and an information processing system. In particular, the present invention relates to an optical disk, an optical disk recording and reproducing apparatus, a method for recording, reproducing and deleting data on an optical disk, and an information processing system which can prevent unauthorized digital copying from being performed from an optical disk, on which data such as AV data (Audio and Visual Data) including image data of movies and audio data of music which are protected with copyrights is recorded, to another recording media such as an optical disk of another recording type or the like.

2. Description of the Related Art

An optical disk is superior in random accessibility to conventional tape media, and has such an advantage in that deterioration of the optical disk due to repetitive use is reduced because of being capable of non-contacting recording and reproducing by using a laser light. Further, the optical disk has such an advantage in that the optical disk can be mass produced at low cost by mastering performed by disk manufacturers, and a CD (Compact Disc) becomes generalized as a high quality digital audio instead of a conventional phonograph record for analog recording. Furthermore, a DVD (Digital Video Disk or Digital Versatile Disk) on which high quality image data has been digitally recorded has recently been commercialized, and the optical disk will be expected to be further developed as a digital recording medium for AV data in the near future.

On the other hand, in addition to a read-only optical disk on which data has been previously recorded in a pre-pit form by a disk manufacturer, such as a music CD, CD-ROM, DVD-ROM or the like, an optical disk of recording type (a recording type optical disk) on which a user can record AV data at home, such as CD-R, CD-RW, MO, MD, DVD-RAM or the like has been recently developed and has become widespread.

Also, in television broadcasts, digital systems for allowing multi-channeling or various services have been introduced instead of conventional analog systems, and such a trend will increase in the near future. In particular, the optical disk of recording type is expected to be utilized as recording media of content which is delivered through digitized broadcasting or communication for recording AV data which is mainly for the purpose of time shift utilization where, after contents are accumulated upon being delivered, a program selection is performed and the selected content is listened to or watched.

Conventionally, an optical disk of recording type which has been utilized mainly for computers is utilized for storing data which has been created by a user himself, and the optical disk of recording type does not have any means for preventing copying from being performed between two or more recording type optical disks. When the optical disk of recording type is widely utilized, an ordinary user copies recorded data of an optical disk to another optical disk of recording type irregularly as it is so that it becomes possible to obtain an unjust reproduction without paying the copyright royalty that is to be paid to an author or writer of the copied AV data and without any deterioration in the sound quality and image quality of the copied AV data because the optical disk of recording type is digitally recordable, which becomes a factor in preventing the spread of excellent content. Regarding an MD (Magentic Disk) on which music or the like is digitally recorded, means for performing generation management for limiting the number of recordings has been introduced where data, together with generation management data, is recorded on an optical disk and the number of permissible times the data can be copied is limited by the generation management data.

Also, in order to prevent the unjust copying of a CD-ROM or a DVD-ROM, for example, a method for forming a Burst Cutting Area (hereinafter referred to as a BCA), which is a write once area for overwriting a barcode on a pit section of an optical disk, and for recording respective disk IDs of each of the optical disks on the BCA which are different from each other and are assigned for each optical disk when the optical disks are manufactured has been proposed in an international application of International Publication No. WO 97/14144. According to this method, since a password is different for each disk ID, one password can decrypt only a cipher of one disk, and therefore, even when content is copied unjustly, the content cannot be decrypted due to the lack of information of a disk ID.

FIG. 39 is a block diagram showing a configuration of a user data area of a conventional DVD-ROM, and a configuration of an optical disk reproducing apparatus for decrypting an encrypted content from data in the user data area. In the DVD-ROM, as shown in FIG. 39, encryption is performed on content data that is recorded on a disk.

Referring to FIG. 39, the user data area of the DVD-ROM is constituted by a sector header area 3201, a main data area 3202, and an error detection code 3203. In this case, a sector address 3204 indicating a position of a sector, copyright control information 3205 on which the copyright control information regarding data that is recorded on the main data area 3202 (for example, a scramble flag, copy control information and the like) is recorded, and a decipher key 3206 for decrypting a cipher when the cipher is performed on data that is recorded on the main data area 3202 are each recorded on the sector header area 3201. Also, mainly AV data that are required for copyright protection and the like are encrypted and recorded on the main data area 3202.

At the time of reproducing such a user data area, a decipher key 3206 which is required for reproducing encrypted content from the sector header area 3201 is first acquired. The acquired decipher key 3206 is inputted to a key decrypting device 3207. The key decryption device 3207 decrypts the inputted decipher key 3206 into a content decipher key by using a predetermined disk key, and outputs the content decipher key to a decrypting device 3208. Next, the decrypting device 3208 decrypts the encrypted content of the main data area 3202 by using the decrypted content decipher key according to the copyright control information 3205 which has been stored on the sector header area 3201 corresponding to the main data area 3202, and then, the decrypted content which is reproducible data can be obtained.

In the optical disk according to the configuration shown in FIG. 39, it is possible to perform reading-out from the main data area 3202 through a driving apparatus of a personal computer or the like. However, an unjust reproduction or a production of a pirated version can be prevented by constituting the optical disk so that an area where the decipher key 3206 is recorded can be read out only by an optical disk reproducing apparatus with a regular authentication function.

However, for the unjust copying preventing method using the generation management data, the generation management data will be inevitably changed upon copying (i.e., changed from "once copying possible" to "copying impossible"). On the other hand, there is a problem in that unjust copying cannot be prevented sufficiently by copying data on the optical disk together with the generation management data without changing the generation management data or by altering the generation management data by a computer or the like and recording the data and the generation management data on the optical disk. Furthermore, since the number of permissible copies is limited based on the generation management data which has been previously recorded together with the content, there is a problem in that, even when a regular copyright royalty is paid, data which has been designated as "copying impossible" is not allowed to be copied to another optical disk at all, and a user must therefore wait for a content provider to provide the user with content data. Both of the above-described problems are caused because the content provider cannot manage content copying onto an optical disk of recording type performed by a user sufficiently.

Recently, personal computers are further improved in performance and they are also connected to networks so that cipher decryption can be performed at high speeds by a plurality of personal computers. In order to further increase the robustness of the cipher against such a decryption, it becomes necessary to extend a key length of a key which is used for the cipher. However, in a key management method for recording a decipher key in a sector header as is conventionally proposed, there is a problem in that only a decipher key with a size of a predetermined length (a size of decipher key area) or less is recorded, and a key length cannot be elongated for the purpose of improving the robustness of a cipher in the future.

SUMMARY OF THE INVENTION

The first object of the present invention is to provide an optical disk, an optical disk recording apparatus, an optical disk reproducing apparatus, an optical disk recording and reproducing apparatus, a method for recording and reproducing data on an optical disk, a method for recording data on an optical disk, a method for reproducing data on an optical disk, a method for deleting data on an optical disk, and an information processing system which can prevent the unjust digital copying which a content provider cannot manage.

Also, the second object of the present invention is to provide an optical disk, an optical disk recording apparatus, an optical disk reproducing apparatus, an optical disk recording and reproducing apparatus, a method for recording and reproducing on an optical disk, a method for recording on an optical disk, a method for reproducing on an optical disk, a method for deleting data on an optical disk, and an information processing system which can enhance the reliability of a decipher key that is required to decrypt data which is required for copyright protection.

Furthermore, the third object of the present invention is to provide an optical disk, an optical disk recording apparatus, an optical disk reproducing apparatus, an optical disk recording and reproducing apparatus, a method for recording and reproducing data on an optical disk, a method for recording data on an optical disk, a method for reproducing data on an optical disk, a method for deleting data on an optical disk, and an information processing system which can set the robustness level of a cipher according to a level of copyright protection of content to be recorded.

In order to achieve the aforementioned objects, according to a first aspect of the present invention, an optical disk of recording type on which data is recordable is provided. The optical disk of the first aspect includes a data recording and reproducing area for recording data therein and reproducing data therefrom, and a read-only disk identification information area for recording disk identification information for identifying the optical disk therein.

In the above-mentioned optical disk, the disk identification information is preferably formed by removing a reflection film that is formed on the optical disk in a strip shape.

In the above-mentioned optical disk, the disk identification information preferably includes an inherent disk identifier for each optical disk.

In the above-mentioned optical disk, the data recording and reproducing area preferably includes an area for recording encrypted data therein, where the encrypted data is encrypted by using information including the disk identification information for identifying the optical disk as a key.

In the above-mentioned optical disk, the encrypted data preferably includes content data which is at least one of image data and music data.

In the above-mentioned optical disk, the encrypted data preferably includes a descramble key for decrypting a cipher which has been performed on content data.

In the above-mentioned optical disk, the encrypted data preferably includes a descramble key for decrypting a cipher which has been performed on content data, and an error detection code for detecting an error in the descramble key.

According to a second aspect of the present invention, there is provided an optical disk of recording type on which data is recordable, wherein the optical disk includes a data recording and reproducing area for recording data therein and reproducing data therefrom, and wherein the data recording and reproducing area includes an area for recording therein content data which is at least one of encrypted image data and encrypted music data, and a descramble key for decrypting a cipher which has been performed on the content data.

According to a third aspect of the present invention, there is provided an optical disk of recording type on which data is recordable. The optical disk of the third aspect includes:

a read-only disk identification information area for recording therein disk identification information for identifying the optical disk;

a data recording and reproducing area for recording therein and reproducing therefrom content data including at least one of encrypted image data and encrypted music data; and a key management information area for recording therein key information that is used when reproducing the content data, and a descramble key which is encrypted by using the disk identification information as a key.

According to a fourth aspect of the present invention, there is provided an optical disk recording and reproducing apparatus for controlling at least one of:

(a) a recording operation for recording data in a data recording and reproducing area of an optical disk of recording type on which data is recordable; and (b) a reproducing operation for reproducing data from the data recording and reproducing area, wherein the optical disk includes a disk identification information area for recording therein disk identification information for identifying the optical disk.

The optical disk recording and reproducing apparatus of the fourth aspect comprises:

reproducing means for reproducing the disk identification information from the disk identification information area; and control means for judging whether or not at least one of the recording operation and the reproducing operation is performed based on the reproduced disk identification information, and for controlling the optical disk recording and reproducing apparatus so as to perform at least one of the recording operation and the reproducing operation in response to a judgment result.

According to a fifth aspect of the present invention, there is provided an optical disk recording apparatus for recording content data on an optical disk of recording type on which data is recordable, wherein the optical disk includes an area for recording a disk identification information area for identifying the optical disk.

The optical disk recording apparatus of the fifth aspect comprises reproducing means for reproducing the disk identification information from the disk identification information area, and recording means for recording at least partially encrypted data on the optical disk by using the reproduced disk identification information as a key.

According to a sixth aspect of the present invention, there is provided an optical disk reproducing apparatus for reproducing content data from an optical disk of recording type on which data is recordable wherein the optical disk includes a disk identification information area for recording therein disk identification information for identifying the optical disk.

The optical disk reproducing apparatus of the sixth aspect comprises reproducing means for reproducing the disk identification information from the disk identification information area, and decrypting means for decrypting at least partially encrypted data by using the reproduced disk identification information as a key after reproducing the at least partially encrypted data from the optical disk.

According to a seventh aspect of the present invention, there is provided an optical disk recording and reproducing method for controlling at least one of:

(a) a recording operation for recording data into a data recording and reproducing area of an optical disk of recording type on which data is recordable; and (b) a reproducing operation for reproducing the data from the data recording and reproducing area, wherein the optical disk includes a disk identification information area for recording therein disk identification information for identifying the optical disk, and The method of the seventh aspect includes the steps of:

reproducing the disk identification information from the disk identification information area; and judging whether or not at least one of the recording operation and the reproducing operation is performed based on the reproduced disk identification information, and controlling the recording operation and the reproducing operation so as to perform at least one of the recording operation and the reproducing operation based on a judgement result.

According to an eighth aspect of the present invention, there is provided an optical disk recording method for recording content data on an optical disk of recording type on which data is recordable, wherein the optical disk includes a disk identification information area for recording therein disk identification information for identifying the optical disk.

The method of the eighth aspect includes the steps of reproducing disk identification information from the disk identification information area, and recording at least partially encrypted data on the optical disk by using the reproduced disk identification information as a key.

According to a ninth aspect of the present invention, there is provided an optical disk reproducing method for reproducing content data from an optical disk of recording type on which data is recordable wherein the optical disk includes a disk identification information area for recording therein disk identification information for identifying the optical disk.

The method of the ninth aspect includes of the steps of reproducing the disk identification information from the disk identification information area, and decrypting at least partially encrypted data by using the reproduced disk identification information as a key after reproducing the at least partially encrypted data.

According to a tenth aspect of the present invention, there is provided an optical disk of recording type on which data is recordable. The optical disk of the tenth aspect includes a first information area for recording first disk information therein, a second information area for recording therein second disk information for identifying each optical disk, and a user data area for recording information data by irradiating a light beam onto the user data area.

According to an eleventh aspect of the present invention, there is provided an optical disk of recording type on which data is recordable, wherein the optical disk has a sector structure comprising a plurality of sectors, wherein each of the plurality of sectors includes a sector header area and a main data area for recording encrypted data therein, wherein the sector header area includes a decipher key information area for recording therein at least one decipher key that is required for decrypting the encrypted data, and wherein a size of the decipher key information area is smaller than the size of each decipher key.

According to a twelfth aspect of the present invention, there is provided an optical disk of recording type on which data is recordable, wherein the optical disk includes a main data area for recording data therein, wherein the main data area includes a non-encrypted area for recording data in a non-encrypted status, and an encrypted area for recording data in an encrypted status, wherein the non-encrypted area includes decipher key conversion data used for converting a decipher key for decrypting data into a converted decipher key, and wherein data in the encrypted area is encrypted by using the converted decipher key.

According to a thirteenth aspect of the present invention, there is provided an optical disk recording method for recording data on an optical disk of recording type on which data is recordable. The method of the thirteenth aspect includes the steps of:

reading out a decipher key status which is recorded on the optical disk, and judging whether or not there is an empty area for a decipher key based on the read-out decipher key status;

reserving a decipher key area and recording the decipher key in the decipher key area when judging that there is the empty area for the decipher key;

setting copyright control information and a decipher key index in at least one unit of a file unit and an extent unit;

encrypting data by using the decipher key, and recording the encrypted data on the optical disk in at least one unit of a file unit and an extent unit; and recording, on the optical disk, optical disk file management information for managing data which is recorded on the optical disk.

According to a fourteenth aspect of the present invention, there is provided an optical disk reproducing method for reproducing data from an optical disk of recording type on which data is recordable. The method of the fourteenth aspect includes the steps of reproducing and acquiring a decipher key index from a data recording area in which data to be reproduced is recorded in a file unit or an extent unit, reproducing and acquiring a decipher key corresponding to the acquired decipher key index, and reproducing data in the file unit or the extent unit which is encrypted by using the decipher key.

According to a fifteenth aspect of the present invention, there is provided an optical disk deleting method for deleting data from an optical disk of recording type on which data is recordable. The method of the fifteenth aspect comprises:

reproducing and acquiring a decipher key index from a recording area in which data to be deleted is recorded in a file unit or an extent unit;

updating a decipher key status, which corresponds to the acquired decipher key index and which indicates a recorded status of a decipher key, and releasing the decipher key; and updating file management information for managing data which is recorded on the optical disk by deleting a file entry corresponding to the data to be deleted from the file management information.

According to a sixteenth aspect of the present invention, there is provided an information processing system comprising a data encrypting apparatus for encrypting data by using a cipher key, an optical disk recording and reproducing apparatus for recording a decipher key that is required for decrypting data on an optical disk of recording type, and for reproducing the recorded decipher key, and a control apparatus which is connected to the optical disk recording and reproducing apparatus and the data encrypting apparatus.

The optical disk recording and reproducing apparatus of the seventeenth aspect comprises:

first recording and reproducing means for recording a decipher key table on the optical disk, and for reproducing the decipher key table from the optical disk;

encrypting and decrypting means for encrypting the decipher key, for transmitting the encrypted decipher key, for receiving the encrypted decipher key from the control apparatus, and for decrypting the encrypted decipher key; and second recording and reproducing means for recording a decipher key status table for indicating a recorded status of the decipher key on the optical disk, and for reproducing the decipher key status table from the optical disk.

The data encrypting apparatus of the seventeenth aspect comprises encrypting means for encrypting the decipher key, and transmitting the encrypting decipher key to the control apparatus.

The control apparatus of the seventeenth aspect comprises: receiving means for receiving the encrypted decipher key from the encrypting means of the data encrypting apparatus; and allocating means for searching for an empty area for the decipher key based on the reproduced decipher key status table, for allocating the received and encrypted decipher key into the searched empty area, and for transmitting the allocated and encrypted decipher key to the optical disk recording and reproducing apparatus.

The encrypting and decrypting means of the optical disk recording and reproducing apparatus receives the allocated and encrypted decipher key from the allocating means of the control apparatus, and decrypts the received encrypted decipher key.

According to an eighteenth aspect of the present invention, there is provided an optical disk of read-only type for reproducing recorded data. The optical disk of the eighteenth aspect includes a data reproducing area for recording data therein, and a read-only disk identification information area for recording therein disk identification information for identifying the optical disk.

The data reproducing area of the optical disk of the eighteenth aspect includes an area in which data is recorded that is encryptedby using information including the disk identification information for identifying the optical disk as a key.

BRIEF DESCRIPTION OF THE DRAWINGS

These and other objects and features of the present invention will become clear from the following description when taken in conjunction with the preferred embodiments of the present invention with reference to the accompanying drawings throughout which like parts are designated by like reference numerals, and in which:

FIG. 7 is a block diagram showing a configuration of an optical disk recording and reproducing apparatus of a second preferred embodiment according to the present invention;

FIG. 13 is a block diagram showing a method for determining whether or not a descramble key is regular based on an encrypted descramble key according to a modified preferred embodiment of the first preferred embodiment;

FIG. 14 is a diagram showing a configuration of the descramble area management table according to a modified preferred embodiment of the first preferred embodiment;

FIG. 15A is a diagram showing whether or not copying or reproducing of contents is possible within the same region or in different regions in a case where a region identifier is recorded when a content is recorded in the first preferred embodiment;

FIG. 15B is a diagram showing whether or not copying or reproducing of the content is possible in the same region or in different regions in a case where a region identifier is previously recorded when an optical disk is shipped in the first preferred embodiment;

FIG. 29 is a block diagram showing a configuration of a lead-in area 2401 and a user data area 2402 within an optical disk of a seventh preferred embodiment according to the present invention, and a configuration of an optical disk reproducing apparatus for decrypting an encrypted content from data stored in the lead-in area 2401 and the user data area 2402;

FIG. 30A is a block diagram showing a data configuration in the case of indicating an unrecorded status by an initial value of a decipher key in the main data area 2102 of the lead-in area 2401 within the optical disk according to the seventh preferred embodiment;

FIG. 30B is a block diagram showing a data configuration in the case of indicating a recorded status by a decipher key status table 2502 in the main data area 2102 of the lead-in area 2401 within the optical disk according to the seventh preferred embodiment;

DETAILED DESCRIPTION OF THE INVENTION

Preferred embodiments according to the present invention will be described below with reference to the attached drawings.

First Preferred Embodiment

Figure 1:
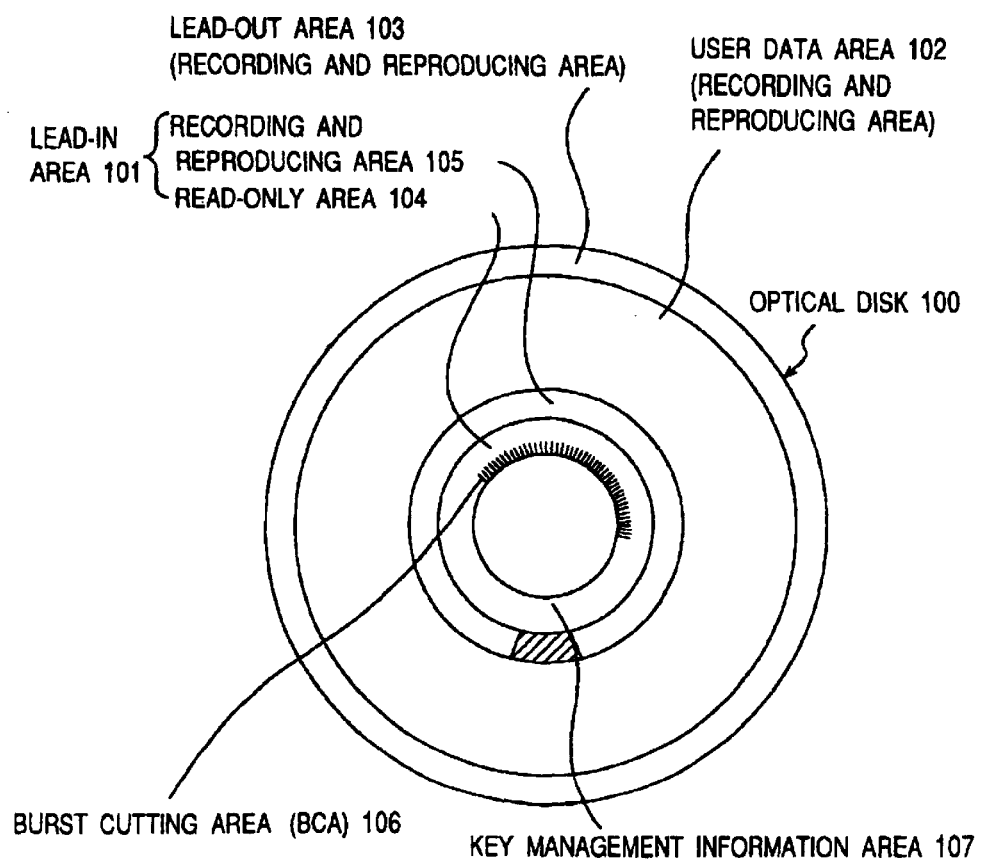
FIG. 1 is a plan view illustrating a data recording area of an optical disk of recording type 100 of a first preferred embodiment according to the present invention.

FIG. 1 shows a plan view illustrating a data recording area of an optical disk 100 of recording type of the first preferred embodiment according to the present invention. The optical disk 100 of recording type is a recording medium which is capable of recording digital data, and includes a write-once type non-rewritable optical disk and a rewritable optical disk.

Referring to FIG. 1, reference numeral 101 denotes a lead-in area for recording management information therein for the optical disk 100, and reference numeral 102 denotes a user data area for recording digital data therein which needs copyright protection, such as (a) AV data content including at least one of image data (including still picture images and animated picture images) such as movies or the like, and speech sound data such as music or the like; and (b) computer software. Reference numeral 103 denotes a lead-out area for recording defect management information or the like therein. The lead-in area 101 is constituted by a read-only area 104 in which data is recorded in a form of pre-pits, and a recording and reproducing area 105 which is a rewritable area with guide grooves. In this case, in the read-only area 104, a control area or the like which describes physical characteristics of the optical disk 100 is recorded in a form of pre-pits by the manufacturer. In the lead-out area 103 and the rewritable area 105, data for a writing test which is performed by an optical disk recording apparatus, and management information for managing defects on the optical disk 100 are recorded by an optical disk recording apparatus. In addition, on the inner peripheral side of the read-only area 104 in the lead-in area 101, a BCA 106 which is formed as disk individual information is once written on the optical disk 100 by the following well-known method, after completion of the optical disk 100 on which content has been recorded.

Figure 2:
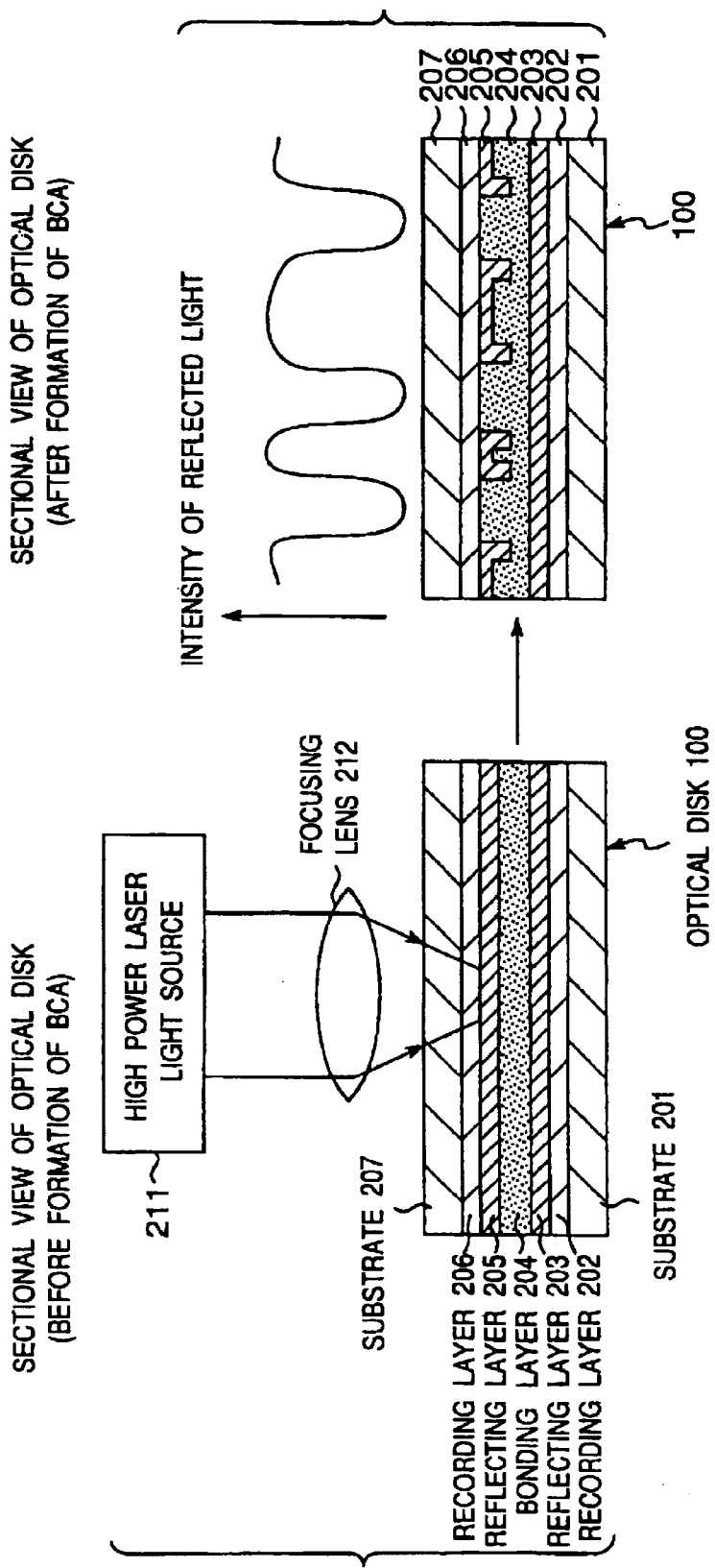
FIG. 2A shows a block diagram and a cross section view illustrating an apparatus configuration for forming a BCA 106 on the optical disk 100 shown in FIG. 1.
FIG. 2B shows a cross section view of the optical disk 100 after formation of the BCA 106 on the optical disk 100 shown in FIG. 1, and a graph showing a strength of a reflected light in the horizontal direction.

FIG. 2A shows a block diagram and a cross sectional view illustrating an apparatus configuration when the BCA 106 is formed on the optical disk 100 shown in FIG. 1, and FIG. 2B shows a cross sectional view of the optical disk 100 and a graph showing an intensity of reflected light in the horizontal direction after the BCA 106 is formed on the optical disk 100 shown in FIG. 1.

Referring to FIGS. 2A and 2B, an example of the optical disk 100 of double-side recording type is shown, and the optical disk 100 is constituted so that a recording layer 202, a reflecting layer 203, a bonding layer 204, a reflecting layer 205 and a recording layer 206 are inserted between two substrates 201 and 207.

As shown in FIG. 2A, when the BCA is recorded on the optical disk 100, data after phase encoding modulation is recorded in a stripe form so as to overlap on pits by irradiating a laser beam in the form of pluses from a high power laser light source 211 onto, for example, the reflecting layer 205 of the optical disk 100 through a focusing lens 212 so as to eliminate or remove a part of the reflecting layer 205. As shown in FIG. 2B, upon reproducing the signals, the signals, which result from a lowered amount of reflecting light from the portions where the reflecting layer 205 is eliminated or removed, are intermittently reproduced. The BCA data is reproduced through the phase encoding demodulation after the reproduced signals are binarized. The BCA formed by such a recording system can record a disk identifier which is specific information for each optical disk 100, and further, the BCA has such a feature whereby it is impossible to falsify recorded data.

Figure 3:
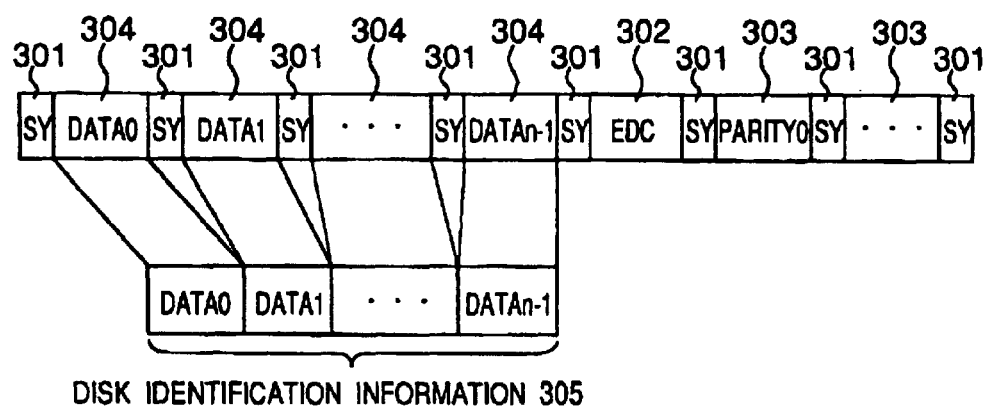
FIG. 3 is a diagram showing a recording format of the BCA 106 shown in FIG. 1.

FIG. 3 is a diagram which illustrates a recording format of the BCA 106 shown in FIG. 1. As shown in FIG. 3, a synchronization code (SY) 301, an error detection code (EDC) 302, an error correction code 303 and the like are recorded in the BCA 106 so as to improve the reading-out factor of the BCA data (DATA) 304. By connecting the plurality of BCA data 304, a disk identification information 305 is constituted. In the disk identification information 305, there are recorded types of data that are recordable into the user data area and the types of data which are reproducible from the user data area. It is impossible for the data of BCA 106 to be falisified, and therefore, a user's disk usage can be limited to a certain degree by means of the disk identification information that is recorded when the optical disk 100 is manufactured.

Figure 4:
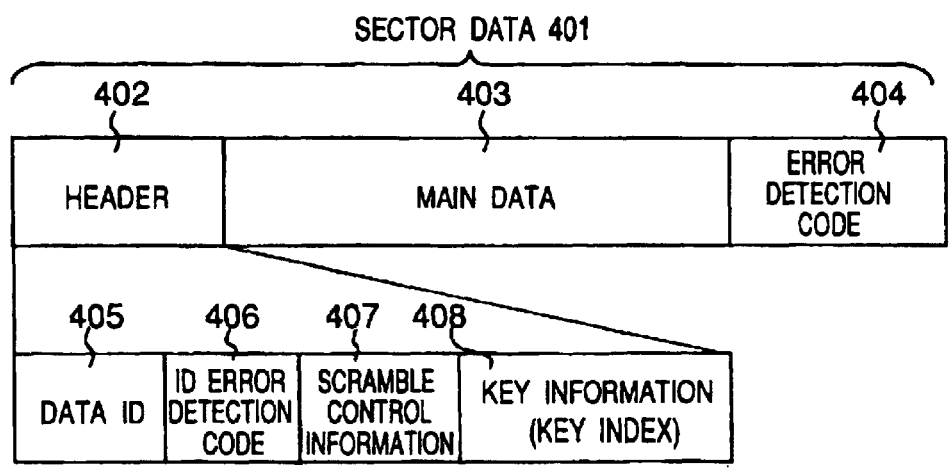
FIG. 4 is a diagram for illustrating a sector structure of sector data 401 within a user data area 102 shown in FIG. 1.

FIG. 4 shows a sector structure of sector data 401 within the user data area 102 shown in FIG. 1. Referring to FIG. 4, the user data area 102 shown in FIG. 1 has a sector structure which is accessible by a unit of a certain amount, and the sector data 401 is constituted by a header 402, main data 403 and an error detection code 404.

The main data 403 is an area in which AV data, computer data and the like are recorded. A data ID (data identifier) 405, an ID error detection code 406, scramble control information 407, key information 408 or the like are recorded in the header 402. A logical address for identifying sectors or the like is recorded in the data ID 405, and the ID error detection code 406 is provided for detecting errors in the data IDs. The scramble control information 407 is a flag for showing whether or not the main data has been scrambled, and information corresponding to a key for descrambling the main data 403 is recorded in the key information 408. As the information corresponding to the key, the descramble key itself (in the modified preferred embodiment of the modified preferred embodiment of the first preferred embodiment) or a key index (in the first preferred embodiment), which is a pointer to the descramble key which is recorded onto another area of the optical disk 100, are recorded. An example of FIG. 4 shows the case where a key index is recorded for referring to the descramble key recorded in the key management information area 107 shown in FIG. 1 which is another area of the optical disk 100.

Figure 5:
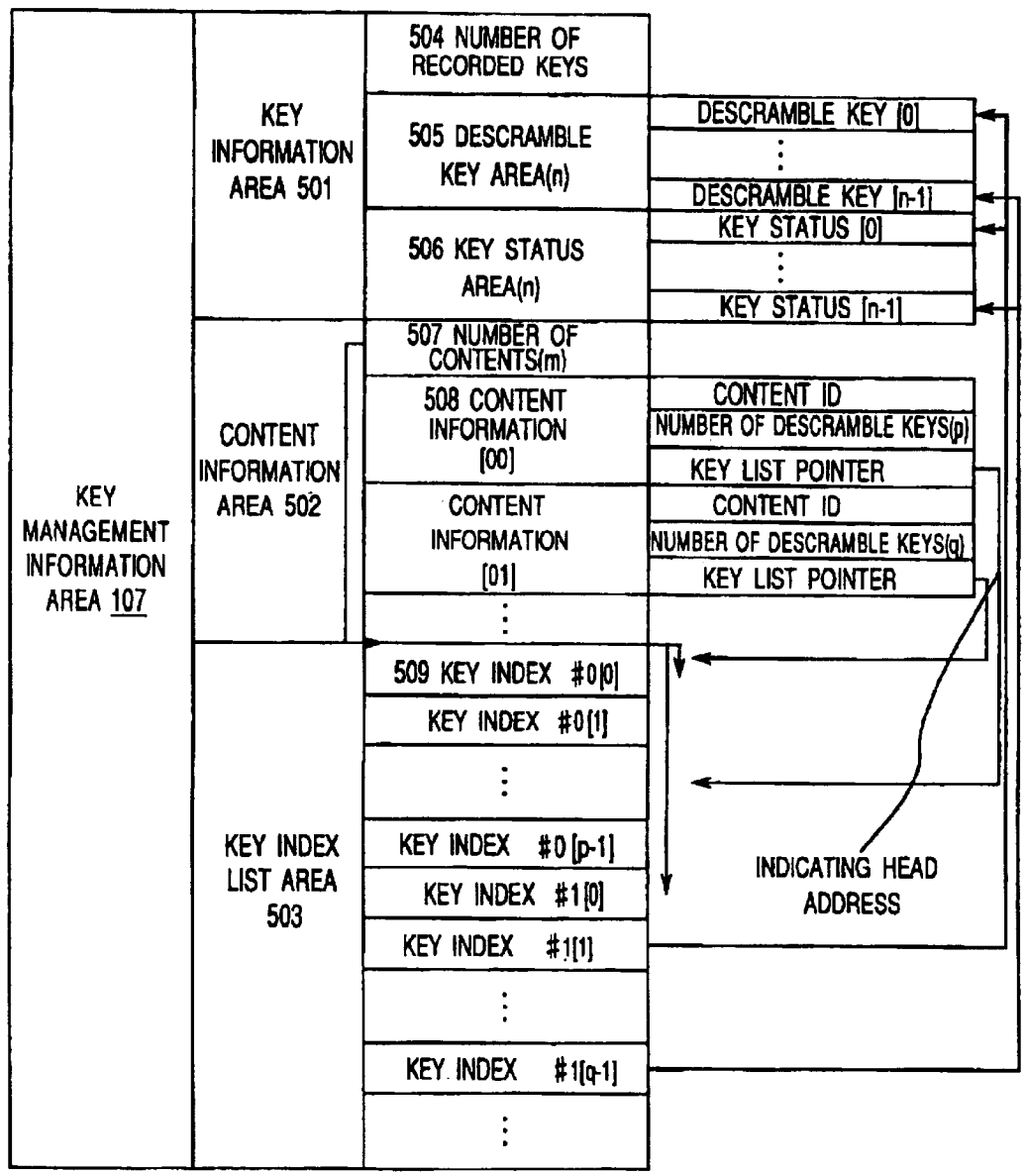
FIG. 5 is a diagram illustrating a configuration of a key management information area 107 shown in FIG. 1.

FIG. 5 shows a configuration of the key management information area 107 shown in FIG. 1. Referring to FIG. 5, the key management information area 107 is constituted by a key information area 501, a content information area 502 and a key index list area 503.

In the key information area 501, the number of recorded key areas 504 is recorded, and the key information area 501 includes (a) a descramble key area 505, which is an area for recording the descramble key to descramble the scrambled AV data or the like, and (b) a key status area 506 for recording therein a recording status (indicating unused, area reservation, recorded or the like) of the descramble key which is recorded in the descramble key area 505. In the descramble key area 505, plurality of descramble keys are recorded, and a key index for representing the stored position in the descramble key area 505 is recorded in the key index list area 503. The above-mentioned plurality of descramble keys are possible to be referred to by this key index. In the key status area 506, the status information for representing the recording status of the descramble keys is stored at a position which is possible to be referred to by the key index.

In the content information area 502, the contents which are recorded on the optical disk 100 are registered when copyright protection is necessary, and the information with respect to keys which are used for the contents is registered. The number of contents 507 registered in the key index list area 503 and content information 508 for the content number are recorded in the content information area 502. In addition, a content ID for identifying the content, the number of descramble keys which are used for the content, and the pointer to the key index list 509 which records the used keys are each recorded in the content information 508. The key index list area 503 is an area for recording indexes to refer to the keys which are used for the content in a form of in content unit. A key index for referring to the entire recording area of the descramble keys which are used for the content is recorded in the key index list area 503.

The optical disk of recording type 100 constituted in this way makes it possible to control the recording operation and the reproducing operation in accordance with the protection level or the usage level of the copyright held by the contents. Controlling the recording and reproducing operations according to the designated protection or usage level is achieved by recording information for representing conditions or a status for disk usage on the disk identification information which is difficult to rewrite such as a region identifier, a data category identifier and a disk identifier upon manufacturing, and by detecting such information by an optical disk and reproducing apparatus. Since data is recorded in such a manner so as to make it difficult to rewrite so that a user cannot change the data, even in the case where the copyright protected content is copied to another optical disk, the disk identification information cannot be copied while it remains possible to copy the user data area. Accordingly, by recording the data as being scrambled by using the disk identification information on the optical disk, such data on the optical disk can be prevented from being reproduced correctly since there exists a user data area which cannot be descrambled in an optical disk having different disk identification information.

FIG. 15A shows a diagram showing whether or not copying or reproducing the content is possible in the same region as well as in a different region in the case where a region identifier is recorded when the content is recorded in the first preferred embodiment, and FIG. 15B shows a diagram indicating whether or not the copying or the reproduction of the content is possible in the same region as well as in a different region in the case where a region identifier is recorded in advance when the optical disk is shipped in the first preferred embodiment.

For example, as shown in FIG. 15A, in the case where a region identification code is not recorded when the optical disk is shipped, and the region identifier, which represents the region where the contents are available when the contents are recorded, is recorded in a recording and reproducing area, the usage can be prevented in another region. However, the contents are recordable in a disk (for a region RC2 shown in FIG. 15A) to be used in another region, and it is therefore possible to reproduce the content correctly. A recording medium in which a digital copying of the content is possible is provided with a tax imposing system to protect the benefit of copyright holders which collect an added charge when the optical disk is sold. However, the added charge differs according to a particular country and in the case where the recording medium to be used in another country is utilized unjustly, the possibility remains that the copyright holders will not be able to share in the appropriate profit.

As shown in FIG. 15B, by recording in advance at the time of shipping in such a way that the region identifier cannot be falsified, copying or reproduction of the content to an optical disk to be used in another region can be prevented. In a manner similar to that as described above, in the case where a data category identifier is recorded as disk identification information, copying or reproduction of the content to the disk on which the data is recordable and reproducible can be limited by comparison between category identifiers which the record data have. In the case where an inherent disk identifier for each optical disk is recorded as disk identification information, the recorded data can be made available only by the optical disk by encrypting the recorded data with the disk identifier.

In the present preferred embodiment, the data which is scrambled by the disk identification information may be AV data or computer data which needs copyright protection, or the scrambled data may be descramble keys for descrambling scrambled AV data or computer data.

FIG. 13 is a block diagram showing a method for judging whether or not a descramble key is a regular descramble key based on the encrypted descramble key according to the modified preferred embodiment of the first preferred embodiment. As shown in FIG. 13, the data which is obtained by adding an error detection code for detecting errors in the descramble key to the descramble key may be scrambled by using disk identification information so as to calculate an encrypted descramble key which may be recorded on the optical disk. In the optical disk reproducing apparatus, the encrypted descramble key is decrypted into a descramble key and an error detection code so as to judge whether or not the decrypted descramble key is a regular descramble key by detecting errors based on the parity check in the decrypted error detection code. For example, in the case of descrambling by using different disk identification information, an error descramble key is produced so that an irregular copy can be detected by checking the error detection code for determining that the decrypted descramble key is not a regular descramble key.

As another method for recording disk identification information, by preparing stampers which are formed with a plurality of types of disk identification information in the form of pre-pits and by forming an optical disk from each of the stampers, different usage limitations may be given to respective optical disks which are formed from different stampers. In addition, by scrambling the disk identification information by using a secret key and by recording the scrambled disk identification information on the optical disk, the protective level of the copyright described in the disk identification information is kept unknown to the users, and as a result, the copyright protection is further enforced.

Figure 6A:
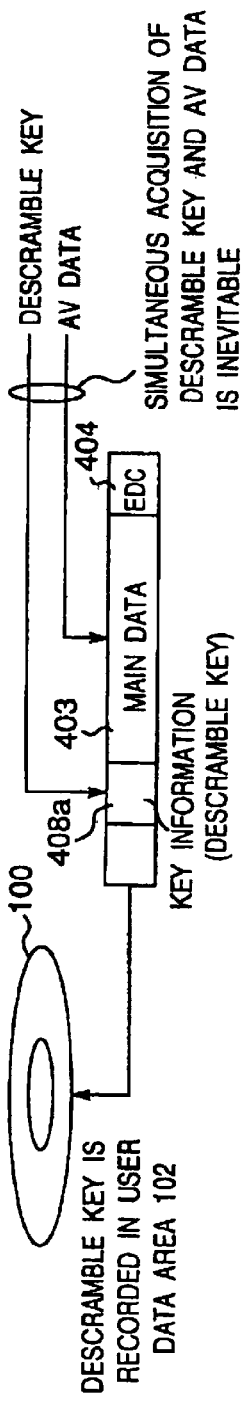
FIG. 6A is a block diagram showing a recording method for recording a descramble key and AV data in the sector data 401 shown in FIG. 1 according to a modified preferred embodiment of the first preferred embodiment.

The case where the descramble key itself is recorded as the information corresponding to the key described in FIG. 4 (in the modified preferred embodiment of the first preferred embodiment) and the case where the key index, which is a pointer to the descramble key which is recorded in another area of the disk, is recorded (in the first preferred embodiment) will be described with reference to FIGS. 6A and 6B. FIG. 6A is a block diagram showing a recording method for recording a descramble key and AV data in the sector data 401 shown in FIG. 1 according to the modified preferred embodiment of the first preferred embodiment, and FIG. 6B shows a block diagram showing a recording method for recording a key index and AV data to a descramble key in the sector data 401 shown in FIG. 4 in the user data area 102 shown in FIG. 1 according to the first preferred embodiment.

In the case of FIG. 6A, the main data 403 and the descramble key which is key information 408*a* which is required for descrambling of the main data 403 are recorded in the same sector data 401. Thus, it is necessary to acquire a descramble key which is required for descrambling when AV data are recorded. That is to say, the acquisition or the purchase of the key itself is indispensable or inevitable when AV data are recorded.

Figure 6B:
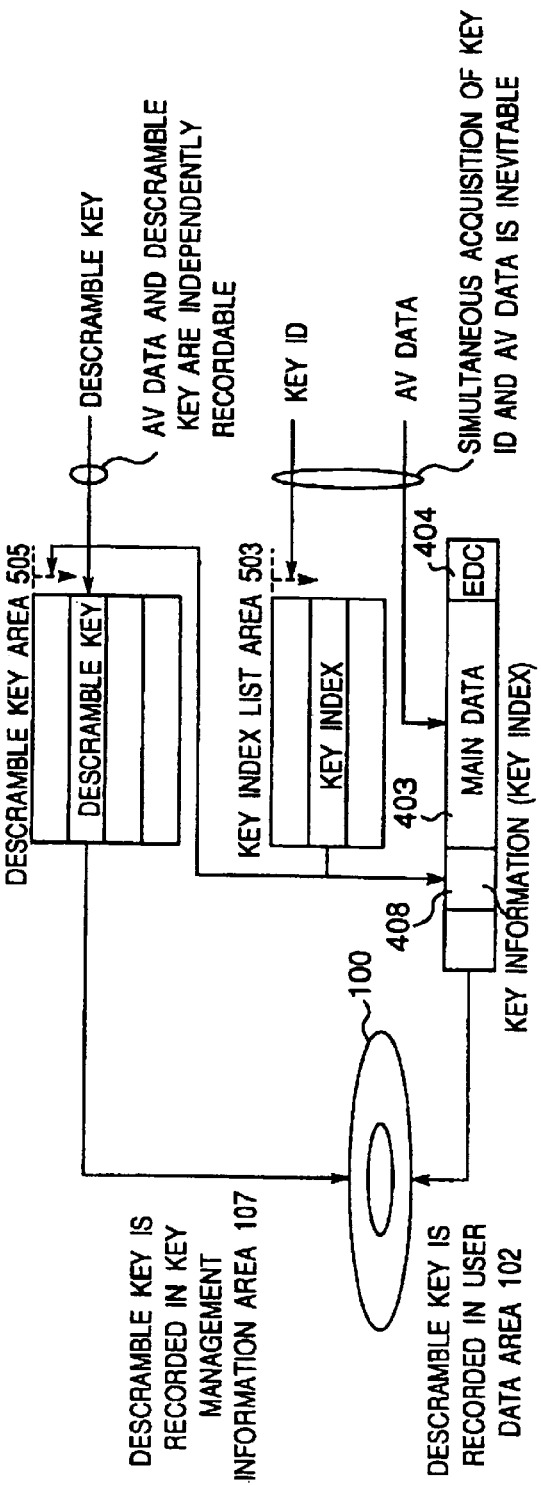
FIG. 6B is a block diagram showing a recording method for recording a key index to the descramble key and the AV data into the sector data 401 shown in FIG. 1 according to the first preferred embodiment.

On the other hand, in the case of FIG. 6B, the main data 403 and the key index, which is the key information 408 for referring to the descramble key area for recording the necessary information for descrambling the main data 403, are recorded in the same sector data 401, and the descramble key is recorded in an area which is designated by the key index. When the AV data are recorded, the key ID indicating which key among the keys used in the recorded content can descramble is acquired, and the key information 408 is acquired. The key information 408 is a key index corresponding to the key ID from the key index list that is included in the content information, which is recorded together with the main data 403. The recording of the descramble key is performed when the descramble key is obtained to be recorded in the descramble key area that is shown by the key index corresponding to the key ID. As a result, AV data and the descramble key corresponding to the AV data can be recorded independently. That is to say, the recording of AV data and the acquisition or purchase of the key can be carried out independently so that the acquisition or the purchase of the key is not necessarily required when the AV data are recorded. It therefore becomes possible for the user to utilize a method for recording the content and acquiring the key when the content is actually reproduced.

FIG. 14 shows a configuration view of a descramble area management table according to a modified preferred embodiment of the first preferred embodiment. In the above-mentioned preferred embodiments, in order to correlate the encrypted content with the descramble key for descrambling its cipher, the cases in which the key index is recorded for referring the descramble key to the same sector data 401 are described. However, the descramble area management table shown in FIG. 14, which manages the corresponding relationships between the address range of the sectors in which the encrypted content is recorded and the descramble key, may be used. This descramble area management table represents the address range of the sector in which the encrypted content is recorded with the starting address and the completion address, and when the data of the sector is reproduced, the descramble key is referred to and then the encrypted content is descrambled.

In order to acquire the recorded content and the descramble key which is used for the recorded content, the content ID that makes the content identifiable is utilized. As shown in FIG. 5, in the content information which is recorded in the content management list within the content information area 502 which is recorded on the optical disk, the content ID and the list of the descramble key used for the content are recorded. By having a list configuration where a plurality of descramble keys can be used for one piece of content, such services are made available so that a part of the content or a part of the software can be sold.

In the modified preferred embodiment described above with reference to FIG. 13, when the data where the descramble key to which the error detection code such as a check sum or a cyclic redundancy check code is added thereto is scrambled by the disk identification information and is copied unjustly onto another disk, the descramble key can be detected as an error by being descrambled with different disk identification information. In such a case, it is also possible to acquire a descramble key that is scrambled by disk identification information which is recorded on the optical disk, and to form a disk which can be reproduced correctly by replacing that descramble key with the acquired descramble key.

The key management information area 107 shown in FIG. 1 is recorded in a lead-in area 101 which is rewritable. Generally, the user data area 102 comprises a user area which is accessible from a drive apparatus of a personal computer, and a spare area for the defect sector on an optical disk. Moreover, for the conventional READ command and WRITE command, only the user area can be accessible as a logical continuous area. By placing the key management information in the lead-in area 101, direct access from the drive apparatus of the personal computer or the like can be prevented so that acquiring a key for descrambling the scrambled AV data or the like from the personal computer can be made impossible.

Second Preferred Embodiment

FIG. 7 shows a block diagram illustrating a configuration of an optical disk recording and reproducing apparatus of the second preferred embodiment according to the present invention. This optical disk recording and reproducing apparatus is provided for recording contents of AV data such as image data or music data which require copyright protection for the optical disk 100 according to the first preferred embodiment.

Referring to FIG. 7, reference numeral 701 denotes an optical disk of the first preferred embodiment, reference numeral 702 denotes an optical head which is an optical pickup that is constituted by a semiconductor laser and optical elements, and reference numeral 703 denotes a recording and reproducing control circuit for controlling the operation of the semiconductor laser of the optical pickup 702 and for binarizing the reproduced signals. Reference numeral 704 denotes a modulating and demodulating circuit for digitally modulating digital data to be recorded and digitally demodulating the binarized reproducing signals, and reference numeral 705 denotes an error detecting and correcting circuit for error detection and correction processing of errors caused by scratches, dust or the like on the optical disk 701 and for performing error correction code generation processing which is required for the error detection and correction processing. Reference numeral 706 denotes a buffer memory of a RAM that is used for a working memory and a data buffer memory of the error detecting and correcting circuit 705, reference numeral 707 denotes a descramble circuit for descrambling scrambled recorded AV data, and reference numeral 708 denotes an MPEG decoding circuit for expanding compressed recorded dynamic image data or the like. Reference numeral 709 denotes an output circuit for D/A converting expanded image data so as to generate and output video signals and audio signals, reference numeral 710 denotes a control CPU for controlling the entire operation of the optical disk recording and reproducing apparatus, and reference numeral 711 denotes a communication circuit for acquiring a descramble key for descrambling the cipher placed in the contents. Reference numeral 712 denotes a data receiving circuit for receiving digital data of the encrypted content such as image data and music data from a communication terminal apparatus such as a set-top box.

A data recording operation of the optical disk recording and reproducing apparatus of FIG. 7 constituted as described above will now be described. The digital data of the encrypted contents such as image data or music data that are transmitted from the communication terminal apparatus such as a set-top box or an MPEG encoder are temporarily stored in the buffer memory 706 after being received by the data receiving circuit 712. The error detecting and correcting circuit 705 generates error detection and correction code that are required for the error detection and correction process caused by scratches or dust on the optical disk 701 in the digital data of the stored contents so as to reconfigure the record data. For the error detection and correction code, a code such as a well-known Reed-Solomon code is used. In this case, the reconstituted record data includes digital data of content and error detection and correction code. The modulating and demodulating circuit 704 uses a modulation system such as an 8/16 modulation system upon recording, and digitally modulates the record data. Also, the recording and reproducing control circuit 703 modulates the intensity of the power of the laser beam that is outputted from the optical head 702 according to the record data modulated digitally so that the laser is irradiated onto the optical disk 701 so as to record the record data onto the optical disk 701.

Figure 8:
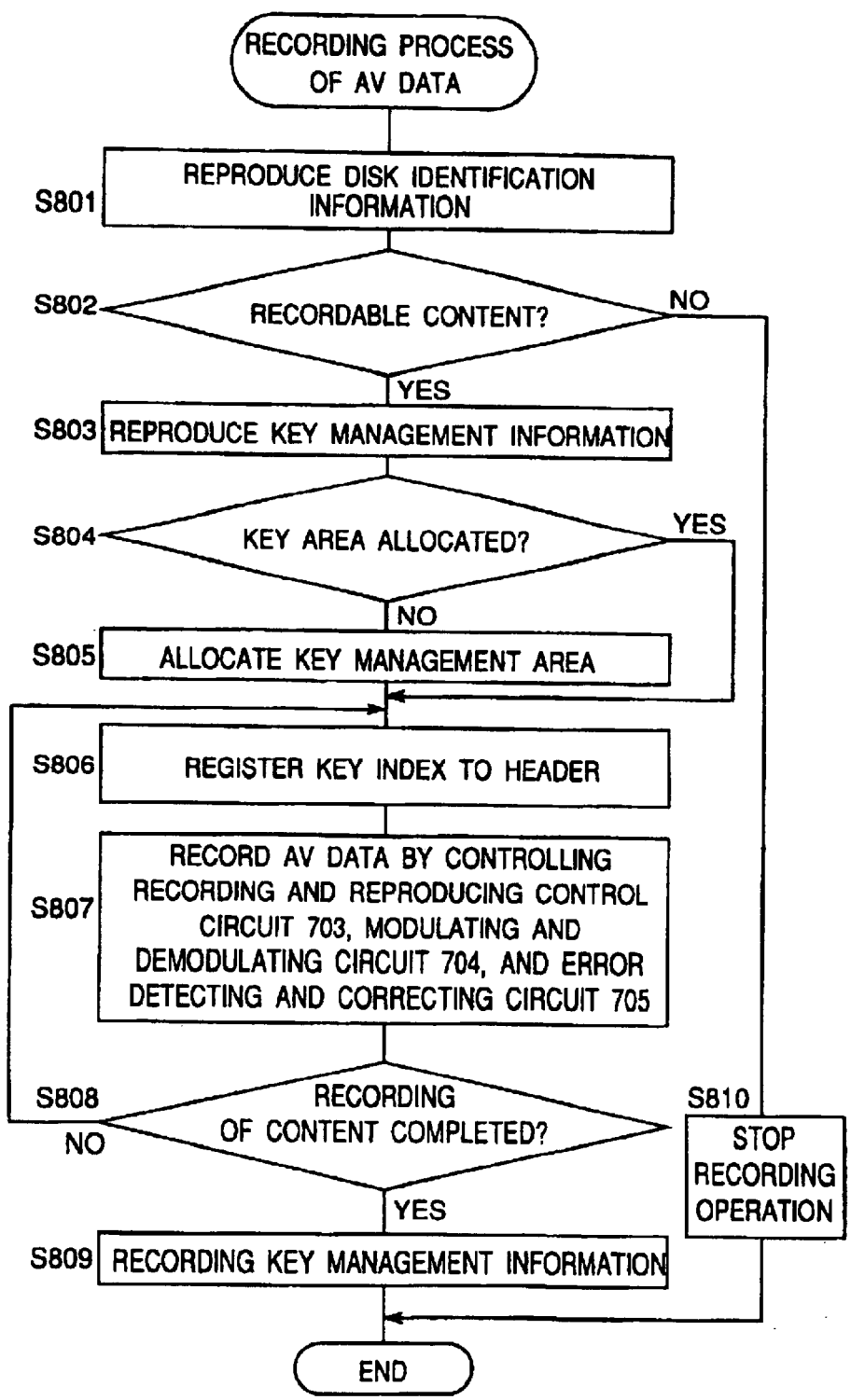
FIG. 8 is a flowchart showing a recording process of AV data which is performed by a control CPU 710 of the optical disk recording and reproducing apparatus shown in FIG. 7.

FIG. 8 shows a flowchart indicating an AV data recording process that is carried out by the control CPU 710 of the optical disk recording and reproducing apparatus shown in FIG. 7.

Referring to FIG. 8, first of all, in step S801, the disk identification information of the lead-in area 101 is reproduced prior to recording of the AV data from the optical disk 701. Then, in step S802 it is determined whether or not the digital data of the contents to be recorded at the present time are recordable from the type or class of data that is recordable in the user data area 102 which are recorded in the disk identification information. In the case of YES in step S802, the recording operation proceeds to step S803, while in the case of NO, the recording operation is stopped in step S810, whereupon the recording process of the AV data is completed.

In step S803, the data of the sector where the key management information is recorded in the lead-in area 101 is reproduced, and in step 5804 it is determined whether or not an area is allocated for the key information that is required for recording the contents in the reproduced key management information. In the case of NO in step S804, after allocating an area for recording the key information in the key management information area 107, the recording operation proceeds to step S806. On the other hand, in the case of YES in step S804 the recording operation proceeds directly to step S806.

In the case where the content is recorded, the control CPU 710 of the optical disk recording and reproducing apparatus receives the record data of the encrypted content and information with respect to the descramble key for descrambling the cipher via the data receiving circuit 712 from the communication terminal apparatus. In this case, the information with respect to the key is the key itself that is used for the contents or a key ID for indicating to which key the information corresponds from among the keys that are used in the entire contents. In the case where the key ID is received, in step S806, the received key ID is converted into a key index, which is a pointer for indicating an area where a descramble key corresponding to the key ID is recorded, and the converted descramble key is placed in a header area of the sector where the data of the contents to be decrypted with the descramble key is recorded. Then, in step S807, the control CPU 710 carries out the following record data processing by controlling the recording and reproducing control circuit 703, the modulating and demodulating circuit 704, and the error detecting and correcting circuit 705. In this record data processing, the codes for the error detection and correction are added to the sector data which is desired to be recorded. Then, the sector data with such codes added thereto are digitally modulated by using a modulation system, such as a well-known 8/16 modulation system, so that the optical head 702 is controlled to locate at a predetermined recording position, and the intensity of the laser beam is modulated according to the record data that is digitally modulated. By doing this, the record data is recorded on the optical disk 701, and in addition, in step S808, it is determined whether or not the recording of the contents has been completed. In the case of NO, i.e., recording of the contents has not been completed, the recording process goes back to step S806 so as to repeat the above-mentioned processing. In the case of YES in step S808, the updated key management information is recorded in the key management information area 107 on the optical disk 701 in step S809, and then, the recording process of the AV data is completed.

Figure 9:
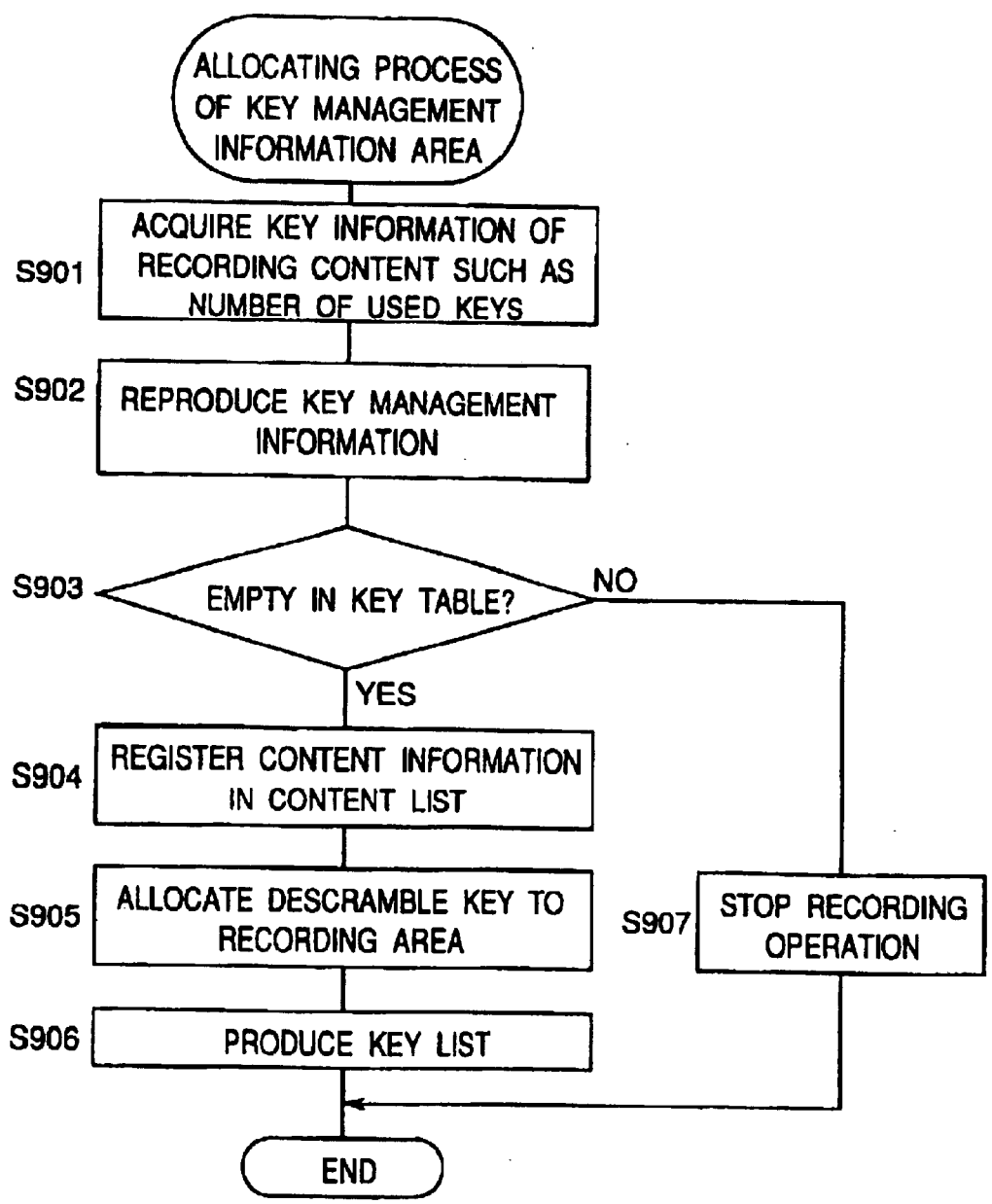
FIG. 9 is a flowchart showing an allocating process of a key management information area which is performed by the control CPU 710 of the optical disk recording and reproducing apparatus shown in FIG. 7.

FIG. 9 shows a flowchart illustrating an allocating process of the key management information area that is carried out by the control CPU 710 of the optical disk recording and reproducing apparatus shown in FIG. 7. This allocating process is provided for allocating areas for recording a descramble key prior to recording data of the content.

Referring to FIG. 9, in step S901, the information with respect to the key of the content recorded from an electronic program guide or the like (including the number of used descramble keys) is acquired, for example, and then, in step S902, the key management information within the key management information area 107 that is recorded in the optical disk 701 is reproduced. Then, in step S903, empty areas of the descramble key area 505 are searched from the key status area 506 so as to determine whether or not the descramble key that is used in the content to be recorded can be recorded. In the case of NO in step S903, the recording operation is stopped in step S907, and then, the allocating process is completed. On the other hand, in the case of YES in step S903, the contents to be recorded are registered in the content list within the content information area 502 so that recording areas are allocated by setting area reservation flags in corresponding key status areas so as to reserve an area that is required for the recording of a descramble key in the descramble key area 505 in step S905. In addition, in step S906, a key index indicating allocated areas for recording descramble keys are formed as a key list, and then, after a pointer set as the content information is allocated, the allocation process is completed.

Figure 10:
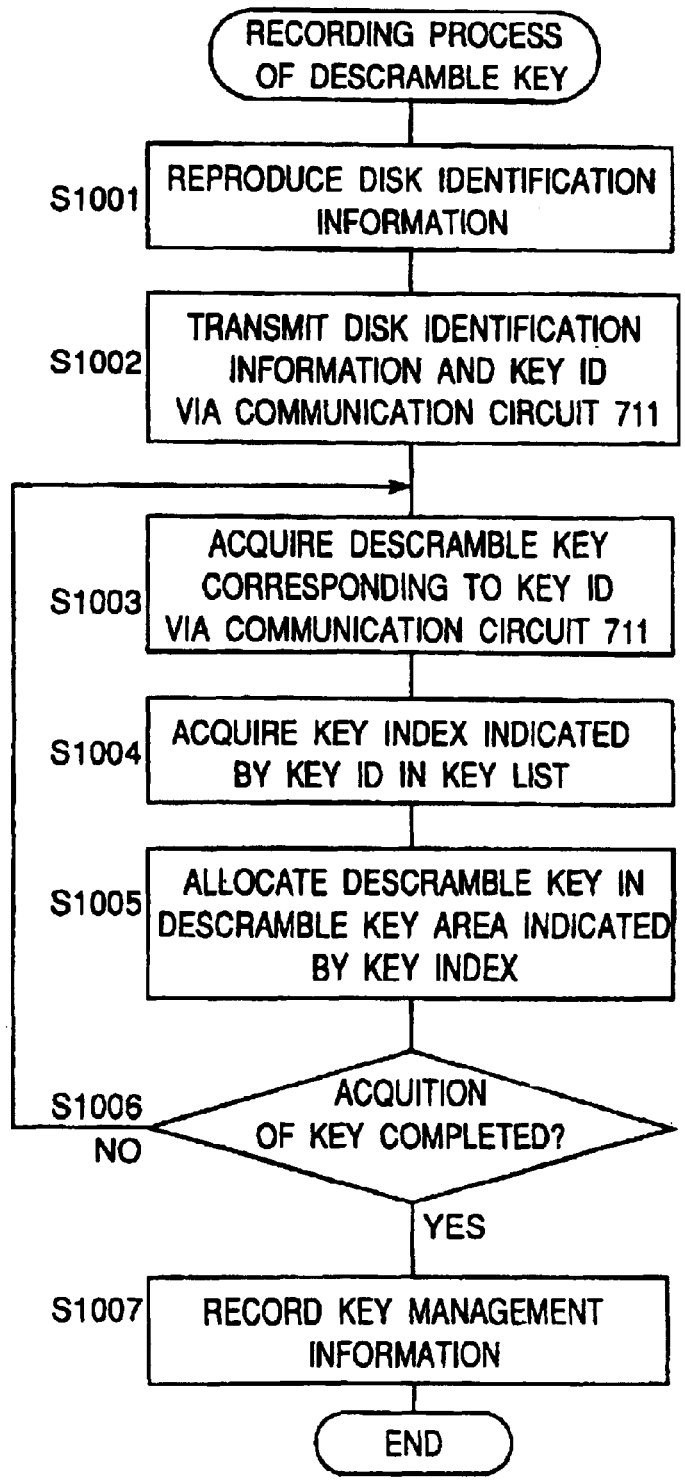
FIG. 10 is a flowchart showing a recording process of a descramble key which is performed by the control CPU 710 of the optical disk recording and reproducing apparatus shown in FIG. 7.

FIG. 10 shows a flowchart illustrating a recording process of the descramble key that is carried out by the control CPU 710 of the optical disk recording and reproducing apparatus shown in FIG. 7. This recording process is provided for recording a descramble key that is acquired from a key management center in the optical disk 701.

Referring to FIG. 10, first of all, in step S1001, after the disk identification information of the lead-in area 101 on the optical disk 701 is reproduced, the disk identification information and the key ID for identifying keys that are required for the descrambling of the desired content are transmitted to the key management center via the communication circuit 711 so as to acquire a descramble key from the key management center in step S1002. In the key management center, a descramble key that is required for the descrambling of the content from the given key ID are selected so that the descramble key is encrypted by using the information, such as the transmitted disk identification information, and is then returned.

After the descramble key corresponding to the key ID is acquired via the communication circuit 711 from the key management center in step S1003, the data of the key management information area 107 is reproduced so that the key index for indicating an area for recording the descramble key is acquired from the key index list that is indicated by key ID from among the data within the reproduced key management information area 107 in step S1004. Then, in step S1005, the descramble key that is acquired above is allocated in the descramble key area that is indicated by the key index, and an acquired flag for indicating a key that is acquired in the corresponding key status area 506 is set. In addition, in step S1006, whether or not the acquisition of all the keys are completed is determined, and then, in the case of NO in step S1006, the above-mentioned process is repeated by returning to step S1003. On the other hand, in the case of YES in step S1006, the updated key management information is recorded in the key management information area 107 in step S1007, and then, the descramble key recording process is completed.

Next, the data reproducing operation of the optical disk recording and reproducing apparatus of the second embodiment will be described with reference to FIG. 7. The digital data that is recorded on the optical disk 701 is reproduced as follows. A laser beam from the semiconductor laser from the optical head 702 is irradiated onto the optical disk 701, so that, at that time, the reflected light which is reflected on the optical disk 701 is entered into the recording and reproducing control circuit 703 via the optical head 702. The recording and reproducing control circuit 703 generates and outputs a generated reproduced binarized signal to the modulating and demodulating circuit 704 by carrying out amplification and by a binarizing process after photoelectrically converting the entered reflected light. The modulating and demodulating circuit 704 digitally demodulates the digitally modulated signal into a digital signal by using a modulating system such as a well-known 8/16 modulating system upon recording, and then, the modulating and demodulating circuit 704 outputs the resultant digital signal to the error detecting and correcting circuit 705. Then, the error detecting and correcting circuit 705 uses the buffer memory 706 as a working memory so as to carry out detecting and correcting processes of the errors that are caused by scratches or dust on the optical disk 701. This error detecting and correcting process is carried out by decoding, for example, with a well-known Reed-Solomon code.

The reproduced data which are processed for error detection and correction are outputted to the descramble circuit 707 for carrying out the descramble process. The descramble circuit 707 uses the descramble key of the key management information area 107 that is reproduced prior to the data reproduction in advance, and performs a descramble process for the reproduced data, which is then outputted to the MPEG decoding circuit 708. Then, the MPEG decoding circuit 708 expands the compressed dynamic image data and music data, and then, the expanded data is outputted to the output circuit 709 by the MPEG decoding circuit 708. In addition, the output circuit 709 D/A converts the inputted expanded data into video and audio signals, and outputs the resultant video and audio signals to upper-level apparatuses such as a television set, an audio device or the like.

Figure 11:
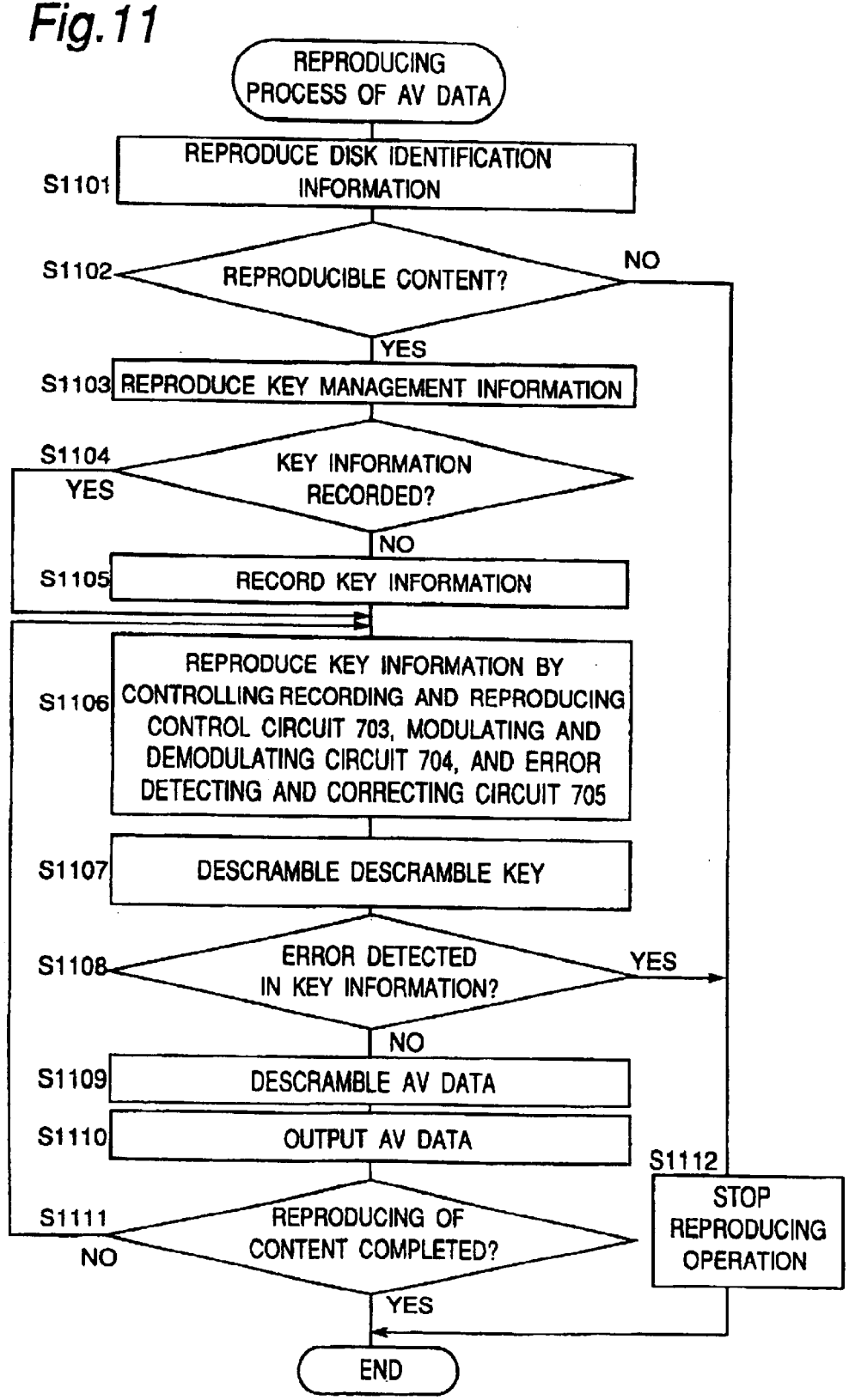
FIG. 11 is a flowchart showing a reproducing process of AV data which is performed by the control CPU 710 of the optical disk recording and reproducing apparatus shown in FIG. 7.

FIG. 11 shows a flowchart illustrating a reproduction process of AV data that is carried out by the control CPU 710 of the optical disk recording and reproducing apparatus shown in FIG. 7.

Referring to FIG. 11, first of all, in step S1101, prior to the recording of the AV data from the optical disk 701, the disk identification information within the lead-in area 101 is reproduced, and in step S1102, it is determined whether or not the content that is desired to be reproduced at present is reproducible from the types of reproducible data that are recorded in the disk identification information. In the case of NO in step S1102, the reproducing operation is stopped in step S1112, and then, the reproducing process of the AV data is completed. On the other hand, in the case of YES in step S1102, the data in the sector where the key management information is recorded within the key management information area 107 of the leadin area 101 are reproduced, and it is determined whether or not the key information that is required for the reproduction of the content has been recorded in the key management information that is reproduced in step S1104. In the case of YES in step S1104, the reproducing information proceeds to step S1106 directly. On the other hand, in the case of NO in step S1104, in step S1105, a descramble key is acquired via the communication circuit 711 from the key management center which manages the keys, and the descramble key is recorded in the key management information area 107 on the optical disk 701. Then, the reproducing operation proceeds to step S1106.

Next, in step S1106, the control CPU 710 makes the optical head 702 move to the user data area of the optical disk 701, and controls the recording and reproducing control circuit 703, the modulating and demodulating circuit 704 and the error detecting and correcting circuit 705 so that the AV data are reproduced. Then, in step S1107, the descramble key that is required for the descrambling of the sector data is acquired from the descramble key area 505 that is indicated by the key index included in the header of the reproduced sector. Then, in step S1108, the scrambled information for the descramble key is decoded by descrambling by means of the disk identification information. In addition, in step S1108, by checking the error detection code that is added to the descramble key, it is determined whether or not the descramble key has an error. In the case of YES in step S1108, the contents are judged as obtained irregularly (or the contents are copied irregularly), the reproducing operation is stopped in the step S1112, and then, the reproducing process of the AV data is completed.

On the other hand, in the case of NO in step S1108, the data of the content is descrambled by the descramble key in S1109, and the descrambled AV data is outputted to the MPEG decoding circuit 708 in step S1110. Then, the control CPU 710 MPEG-expands the descrambled AV data through a predetermined MPEG system by controlling the MPEG decoding circuit 708 and the output circuit 709, and then, the MPEG-expanded AV data is D/A converted into video signals and audio signals to be outputted to upper-level devices such as a television set, an audio device or the like. Then, in step S1111, it is determined whether or not the reproduction of the content is completed. In the case of NO in step S1111, the reproducing operation returns to step S1106 so as to repeat the above-mentioned process. On the other hand, in the case of YES in step S1111, the reproducing process of the AV data is completed.

In the case where an error is detected in step S1109, the content is regarded as being obtained irregularly, for example, the content is regarded as being copied irregularly, and the reproducing operation is stopped. However, the key information may be acquired from the key management center which manages the keys via the communication circuit 711 and recorded in the key management information area 107 on the optical disk 701 by carrying out the process of step S1105 in the same way as the case where a key is not recorded. By doing this, even the copied AV data can become reproducible by obtaining the key in a regular procedure.

Figure 12:
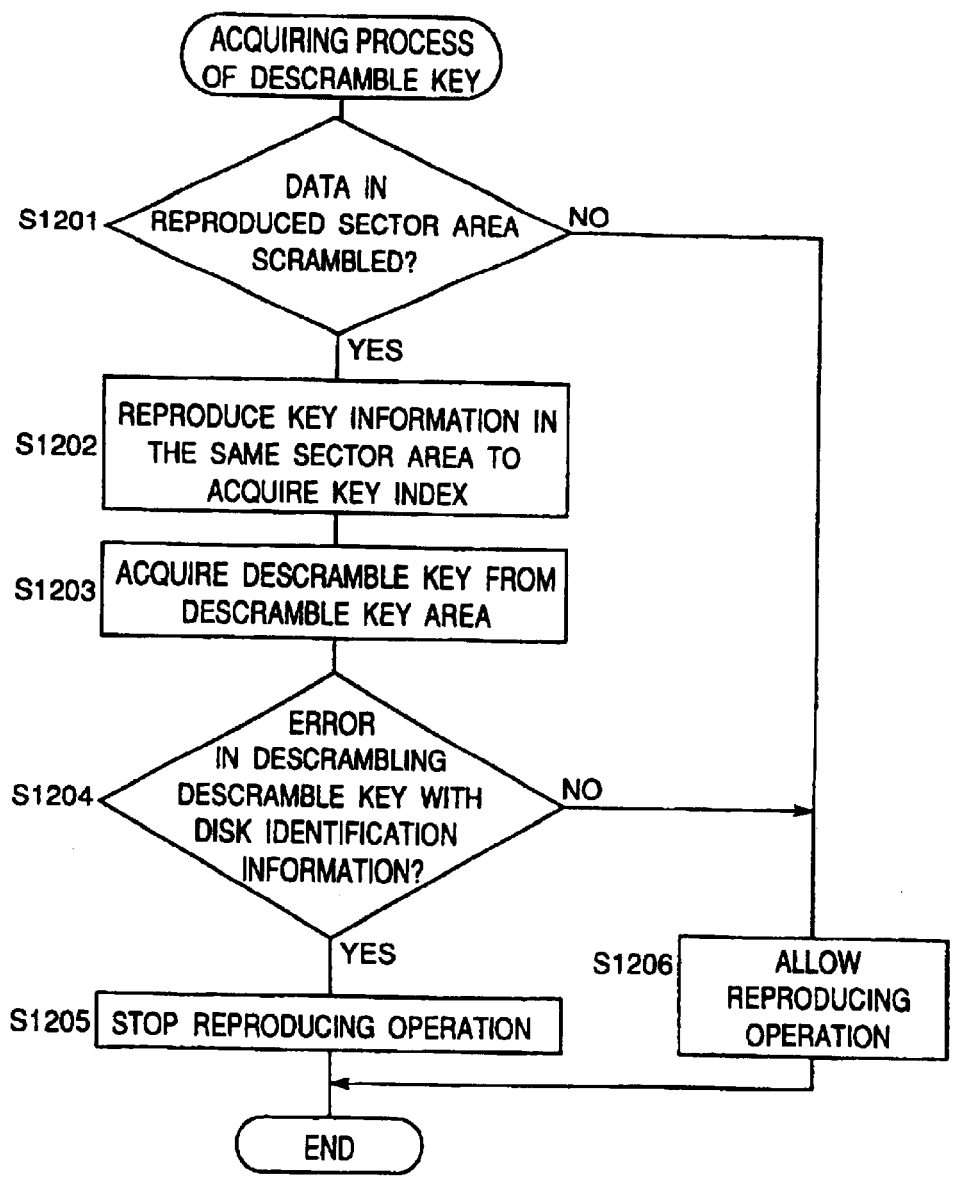
FIG. 12 is a flowchart showing an acquiring process of a descramble key which is performed by the control CPU 710 of the optical disk recording and reproducing apparatus shown in FIG. 7.

FIG. 12 shows a flowchart illustrating an acquiring process of a descramble key that is carried out by the control. CPU 710 of the optical disk recording and reproducing apparatus shown in FIG. 7. This acquiring process is provided for reproducing descramble keys from the reproduced key index, and this acquiring process is carried out prior to the reproducing process of the AV data as shown in FIG. 11.

Referring to FIG. 12, first of all, in step S1201, it is determined whether or not the data in the reproduced sector area is scrambled by the scramble control information. In the case of NO in step S1201, the acquiring process proceeds to step S1206. On the other hand, in the case of YES in step S1201, a key index is acquired by reproducing key information that is recorded in the same sector area as the above-mentioned sector area in step S1202, and then, the descramble key that is indicated by the above-mentioned key index is acquired from the descramble key area 505 in step S1203. Afterwards, in step S1204, the acquired descramble key is descrambled by using the disk identification information, and it is determined whether or not an error exists in the descramble key by checking the error detection code. In the case of YES in step S1204, the reproducing operation is stopped in step S1205, and the acquiring process of the descramble key is completed. On the other hand, in the case of NO in step S1204, the reproducing operation proceeds to step S1206. When the reproduced sector is not scrambled or when an error is not found to exist as a result of descrambling the descramble key by the disk identification information, permission for the reproducing operation is granted in step S1206, the data of the reproduced sector is outputted, and then, the acquiring process of the descramble key is completed.

As described above, in the optical disk and in the optical disk recording and reproducing apparatus of the preferred embodiments according to the present invention, the recording and reproducing operations can be controlled by the user by using disk identification information for read-only that are made at a disk manufacturing stage. In addition, by scrambling a part of the data by using the above-mentioned disk identification information, normally reproducing data on the disk where the user data area is physically copied can be prevented. Also, by allocating the descramble key that is required for the data descrambling in a different area from the area for the data, the recording of the content and the recording of the descramble key can be carried out independently. Thus, by recording the contents and by acquiring the descramble key if necessary, for example, when the data of the content are reproduced, the content can be maintained in a reproducible state or status. At this time, by scrambling the descramble key with the disk identification information, an irregular usage through physical copying can be explicitly prevented in the same way as that described above. In addition to this, a disk that is copied irregularly could become an optical disk which can be reproduced normally by formally acquiring the descramble key that is scrambled with the disk identification information of the optical disk from the key management center and by recording the acquired descramble key in the optical disk.

Although already encrypted data of the content that is inputted to the optical disk recording and reproducing apparatus are described above, by providing a circuit for encrypting the content within the optical disk recording and reproducing apparatus, the same effects can be obtained by encrypting the data of the inputted contents and by recording that data on the optical disk.

Although in the second preferred embodiment, by encrypting only the descramble key which is required for decrypting the encrypted content by using the disk identification information, copying between the disks having different disk identification information is prevented, copying can be prevented by encrypting the content itself by using the disk identification information. In addition, by encrypting the disk identification information by using a secret key, it becomes possible to make the irregular decrypting of the content that is recorded on the disk more difficult.

Advantageous Effects of First and Second Preferred Embodiments

An optical disk of the first and second preferred embodiments according to the present invention records the disk identification information by carrying out the recording operation and the reproducing operation into the user data area for each optical disk in a read-only area which is not rewritable. Therefore, the optical disk of the first and second preferred embodiments can control the recording operation and the reproducing operation of the contents onto the optical disk by the user by using the information that is recorded upon manufacturing the optical disk.

An optical disk of the preferred embodiments according to the present invention can prevent the disk identification information from being copied so as to make the correct decoding and reproduction of the data impossible even in the case where the user data area information is copied by the user onto a different recording-type of optical disk by recording, the encrypted data in the user data area of the optical disk with a key of the disk identification information of read-only which is impossible to be rewritten.

An optical disk of the first and second preferred embodiments according to the present invention makes it possible to carry out independently (a) an acquisition of the data which needs copyright protection such as movies and music, and (b) an acquisition of the descramble key for decrypting the encryption by recording the encrypted data and the descramble key for decrypting the encryption in different sector areas. In addition, by encrypting and recording the descramble key with a key of the disk identification information, even in the case where the user data area information is copied onto another recording-type optical disk by the user, the disk identification information cannot be copied, and a correct decoding and reproduction of the data becomes impossible. Further, by acquiring and recording the encrypted descramble key with a key of the disk identification information on the optical disk where it is copied, a correct decoding and reproduction of the data can be made possible.

Third Preferred Embodiment

Figure 16:
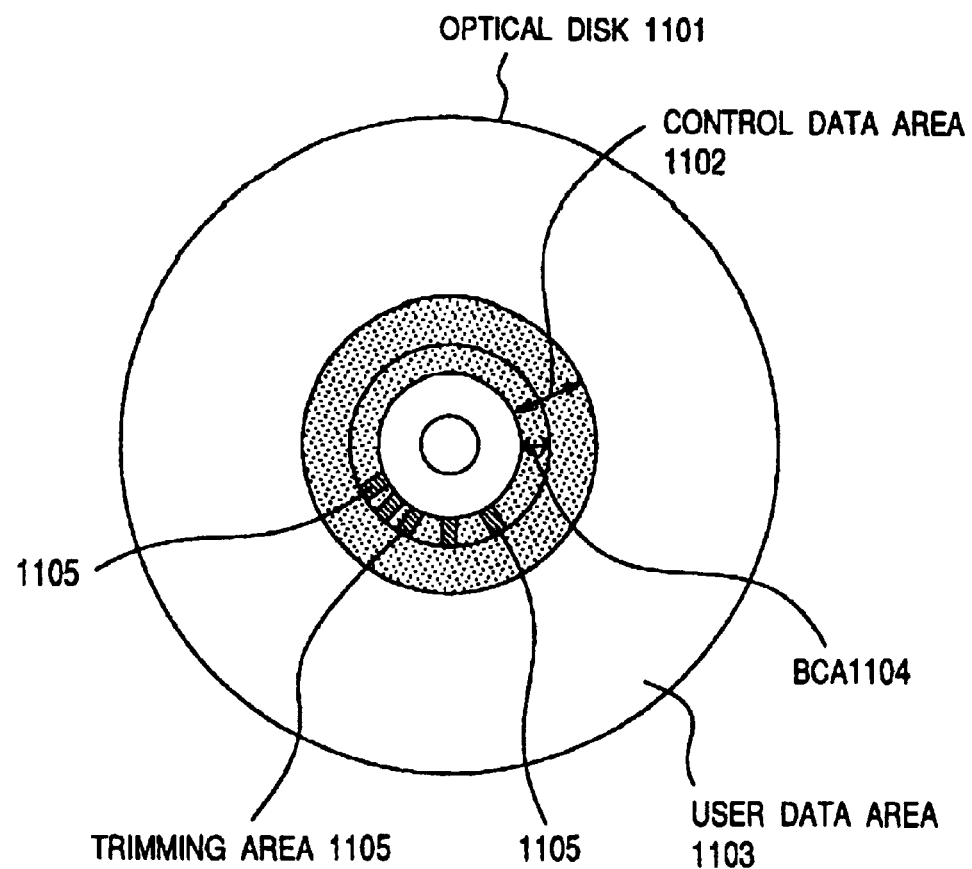
FIG. 16 is a plan view showing a data recording area of an optical disk 1101 of a third preferred embodiment according to the present invention.

Next, an encrypted content recording and reproducing method of a third preferred embodiment according to the present invention will be described with reference to the drawings. FIG. 16 shows a plan view illustrating a data recording area of an optical disk 1101 of the third preferred embodiment according to the present invention.

Referring to FIG. 16, reference numeral 1101 denotes a recording medium which can record digital data, and which is a recording-type optical disk such as a rewritable or non-rewritable optical disk, reference numeral 1102 denotes a control user data area in which disk information is recorded in a form of minute concavo-convex pits, and reference numeral 1103 denotes a user data area in which the user records data by irradiating a light beam of a laser onto the optical disk. Reference numeral 1104 denotes an BCA in which disk ID is recorded. In the BCA 1104, a recording film on minute concavo-convex pits in an inner periphery section of the control user data area 1102 is trimmed by partially irradiating a laser beam of a pulse laser such as a YAG laser or the like onto the recording film so that a plurality of trimming areas 1105 are formed in an elongated shape in the radius direction to thereby record a disk ID which is the descrambled identification information.

Figure 17:
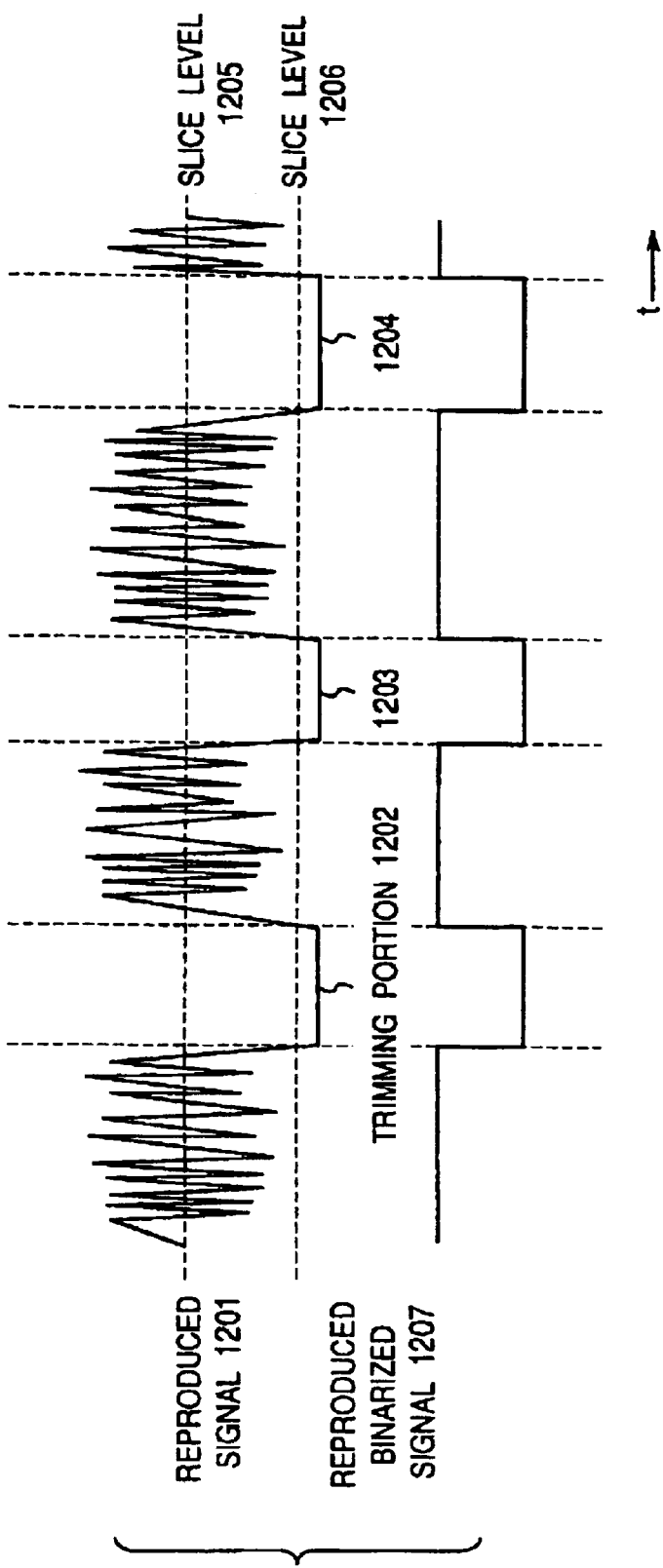
FIG. 17 is a waveform diagram showing signal waveforms of a reproduced signal 1201 and a reproduced binarized signal 1207 in a BCA reproducing circuit 1401 according to the third preferred embodiment.
Figure 18:
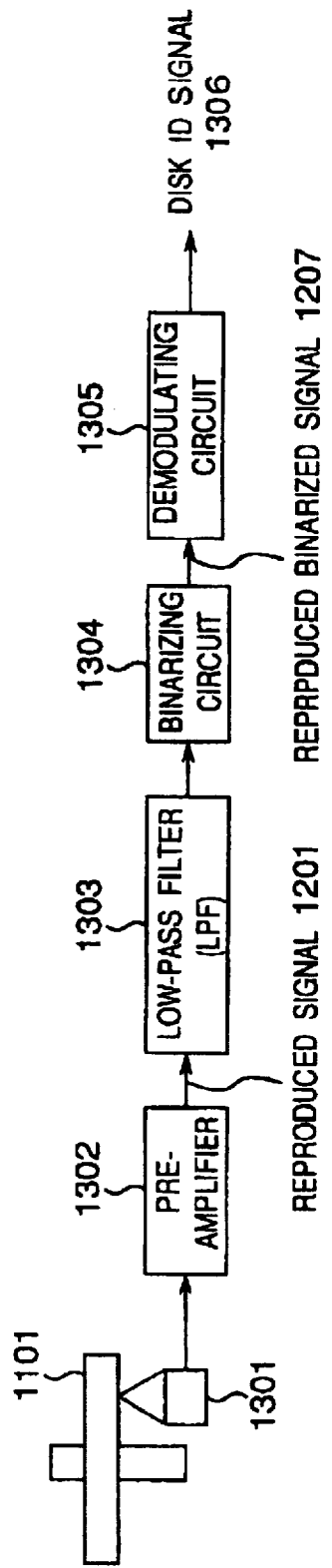
FIG. 18 is a block diagram showing a configuration of the BCA reproducing circuit 1401 according to the third preferred embodiment.

FIG. 17 is a waveform diagram showing a signal waveform of a reproduced signal 1201 and a reproduced binarized signal 1207 in a BCA reproducing circuit 1401 according to the third preferred embodiment. FIG. 18 shows a block diagram illustrating a configuration of the BCA reproducing circuit 1401 according to the third preferred embodiment. FIG. 17 shows a reproducing signal 1201 when data of the BCA 1104 is reproduced In FIG. 18, reference numeral 1301 denotes an optical pickup, reference numeral 1302 denotes a pre-amplifier, reference numeral 1303 denotes a low-pass filter (LPF), reference numeral 1304 denotes a binarizing circuit, and reference numeral 1305 denotes a demodulation circuit.

Referring to FIG. 18, a laser beam that is outputted from the optical pickup 1301 irradiates the BCA 1104 of the optical disk 1101, and the reflected light is photoelectrically converted by the optical pickup 1301. Thereafter, an electric signal which has been photoelectrically converted is amplified by the pre-amplifier 1302 so as to obtain a reproduced signal 1201. In this case, the reproduced signal 1201 shown in FIG. 17 has a level corresponding to the concavo-convex pits of the control user data area 1102, and in this reproduced signal 1201, each of reference numerals 1202, 1203 and 1204 denotes a trimming portion where signals in a form of concavo-convex pits drop out when the recording film is removed by the trimming process by the pulse laser. This trimming process is carried out by the manufacturer of the optical disk.

Referring back to FIG. 18 for a description of the BCA reproducing circuit 1401, the reproduced signal 1201 is inputted to the low-pass filter 1303, which then removes the modulated signal that is formed by the concavo-convex pits. Thereafter, the low-pass filter 1303 outputs a resultant signal to the binarizing circuit 1304. The reproduced signal that is inputted into the binarizing circuit 1304 is binarized by using a slice level 1206 which is a level that is significantly lower than the slice level 1205, instead of the normal slice level 1205 which binarizes a signal of control user data area 1102 so as to obtain the reproduced binarized signal 1207. The reproduced binarized signal 1207 that is outputted from the binarizing circuit 1304 is demodulated by a demodulation circuit 1305 so as to obtain the disk ID signal 1306.

As described above, by adding the disk identification information for identifying an optical disk, management of the optical disk can be easily implemented. Also, by recording the BCA 1104 in a form of concavo-convex pits, the information for identifying the optical disks within the BCA 1104 can be prevented from being easily falsified. In addition, since the control user data area 1102 and the BCA 1104 shown in FIG. 16 are adjacent to one another, the data of the BCA 1104 can be continuously reproduced when the data of the control user data area 1102 are reproduced, or the data of the control user data area 1102 can be continuously reproduced when the data of the BCA 1104 are reproduced. Therefore, it becomes possible to accelerate the process for obtaining the information of the BCA 1104 for identifying optical disks quickly by the CPU when, for example, the optical disk is started up, and for recording the encrypted content.

Although the BCA 1104 of the third preferred embodiment is formed so as to trim the recording film in a form of concavo-convex pits in the inner periphery section of the control user data area 1102, the recording film, which constitutes an optical disk of recording type that is either a rewritable or non-rewritable optical disk, is easily affected by heat as compared with the reflecting film that is formed on a read-only optical disk. By trimming the inner periphery section of the control user data area 1102, the user data area 11103 can be protected from the heat that is emitted upon trimming as compared with the case where the outer periphery section is trimmed. Also, the reason why the BCA 1104 is formed on the inner peripheral side of the control user data area 1102 is that a margin should be taken into consideration in the case where the diameter of the spot of a laser beam changes due to the instability of a focusing servo circuit of the laser device.

The data that are recorded in the BCA 1104 before trimming may be recorded in the control user data area 1102. The data that are recorded in the BCA 1104 are also recorded in the control user data area 1102, and this leads to the above-described data of the control user data area 1102 being protected from the trimming. In addition, when the data that are recorded in the BCA 1104 are recorded continuously and repetitively from the BCA 1104 to the control user data area 1102, the position of the BCA 1104 can be predicted by finding the above-described data of the control user data area 1102.

Figure 19:
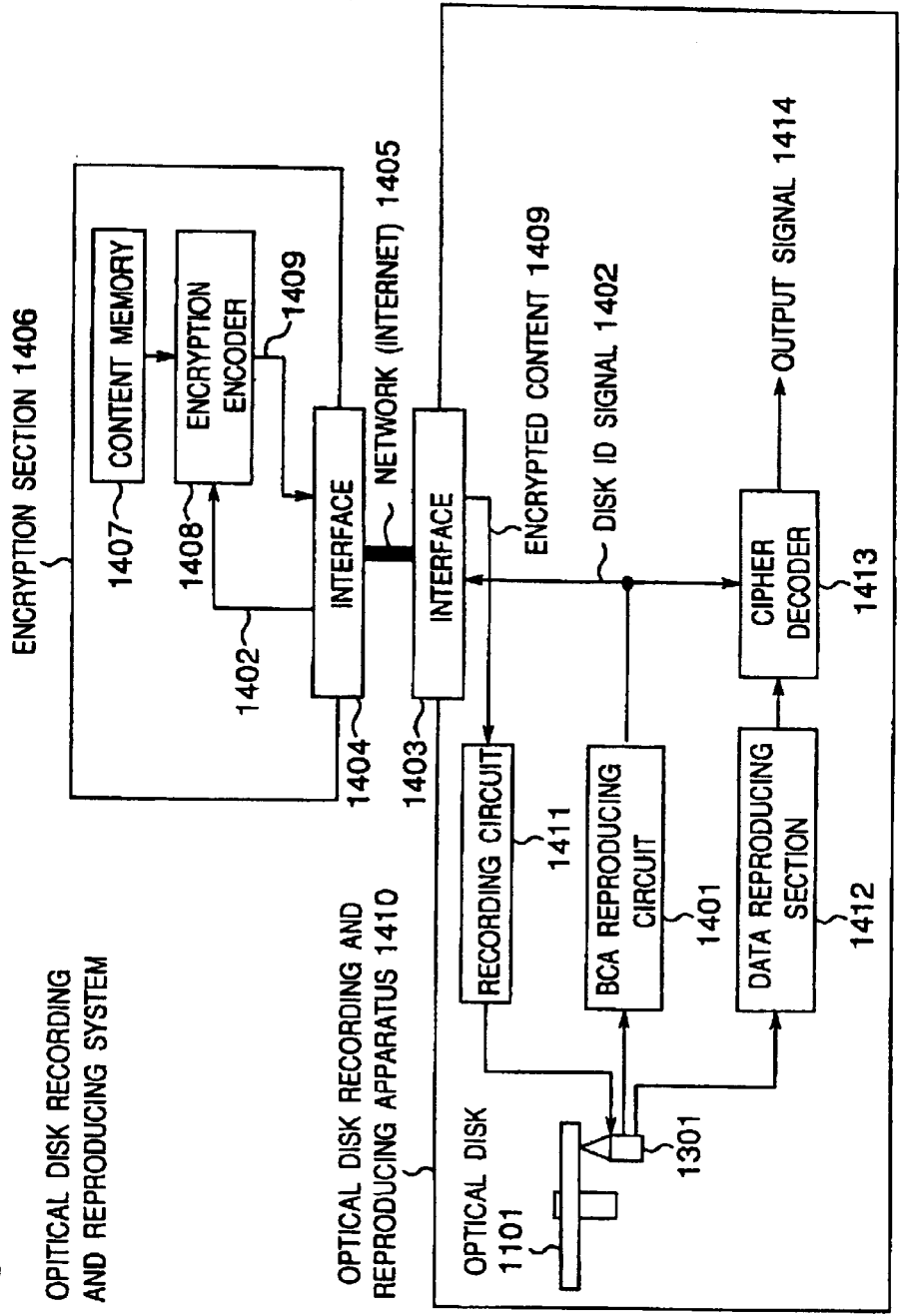
FIG. 19 is a block diagram showing a configuration of an optical disk recording and reproducing system according to the third preferred embodiment.

Next, the procedure for recording the encrypted content by the disk ID through a network on an optical disk 1101 having the above-mentioned BCA 1104 will be described. In the third to fifth preferred embodiments, a network means, for example, the Internet, the public telephone line or other communication lines such as leased lines or circuits. FIG. 19 shows a block diagram illustrating a configuration of an optical disk recording and reproducing system according to the third preferred embodiment, and illustrates an apparatus configuration for recording encrypted contents on an optical disk of recording type 1101, which is either a rewritable or non-rewritable optical disk having the above-mentioned BCA 1104.

Referring to FIG. 19, an optical disk recording and reproducing system is constituted by comprising an optical disk recording and reproducing apparatus 1410 and an encryption section 1406 that are connected to each other through a network 1405 such as the Internet. The optical disk recording and reproducing apparatus 1410 comprises an optical pickup 1301, a BCA reproducing circuit 1401, the Internet (interface) 403, a recording circuit 1411, a data reproducing section 1412, and an encryption decoder 1413. Also, the encryption section 1406 comprises an interface 1404, a content memory 1407, and an encryption encoder 1408.

First of all, a laser beam that is outputted from the optical pickup 1301 irradiates, for example, the BCA 1104 of the RAM type optical disk 1101, and then, after the reflected light is photoelectrically converted by the optical pickup 1301, a reproduced signal which has been photoelectrically converted is inputted to the BCA reproducing circuit 1401. The BCA reproducing circuit 1401 reproduces a disk ID signal 1402 within the BCA based on the inputted reproduced signal, outputs the reproduced disk ID signal 1402 to the encryption decoder 1413, and also simultaneously outputs the same disk ID signal 1402 to the encryption encoder 1408 of the encryption section 1406 via the interface 1403 and 1404 as well as the network 1405. The encryption encoder 1408 encrypts data of the content or scrambles data of the content for image and speech sound so that the disk ID signal 1402 becomes a decipher key for decrypting the encryption on the optical disk 1101 where the data of the content within the content memory 1407 is recorded.

In the third preferred embodiment, a process of encrypting the content 1407 by using the disk ID signal 1402 as a cipher key means the same as the encrypting process. Also, in the third preferred embodiment, encrypting and decrypting are considered as a relationship between a lock and a key so that closing the lock with the key is referred to as encrypting and opening the lock with the key is referred to as decrypting. Accordingly, encrypting and decrypting differ in actual operation from each other; however, the keys for encrypting and for decrypting are the same as each other. The content 1407 is denoted by C, the disk ID signal 1402 is denoted by BCAS, the encrypted content 1409 is denoted by C[BCAS], and the operation for the encrypting process is denoted by *. Accordingly, the following equation can be represented:

$$C*BCAS=C[BCAS) \tag{1}$$

The content 1409 that is encrypted by the encryption section 1406 is sent to a recording circuit 1411 of the recording and reproducing apparatus 1410 via the interface 1403 and 1404 as well as the network 1405. The recording circuit 1411 digitally modulates the data of the inputted content in a predetermined manner, and records the data of the content onto the optical disk 1101 by modulating the intensity of the laser beam from the optical pickup 1301 corresponding to the digitally modulated data and irradiating the laser beam onto the optical disk 1101.

Next, when the above-described content that is encrypted and recorded on the optical disk 1101 is reproduced, a laser beam that is outputted from the optical pickup 1301 irradiates the area where the above-described encrypted content of the user data area 1103 is recorded, and, after the reflected light is photoelectrically converted by the optical pickup 1301, the reproduced signal which has been photoelectrically converted is inputted to the data reproducing section 1412. The data reproducing section 1412 A/D converts the inputted reproduced signal into digital data, and outputs the digital data to the encryption decoder 1413. On the other hand, a laser beam from the optical pickup 1301 is irradiated onto the BCA 1104 of the optical disk 1101, and, after the reflected light is photoelectrically converted by the optical pickup 1301, the reproduced signal which has been photoelectrically converted is inputted to the BCA reproducing circuit 1401. The BCA reproducing circuit 1401 A/D converts the inputted reproducing signal so as to generate the disk ID signal 1402, and then, the disk ID signal 1402 is outputted to the encryption decoder 1413.

The encryption decoder 1413 uses the inputted disk ID signal 1402 as a key for decrypting the data of the encrypted content. At this time, when the content is regularly recorded on the optical disk 1101, the key for decrypting the encrypted content that is recorded on the optical disk 1101 is the disk ID signal 1402 of the optical disk 1101, and the disk ID signal 1402 that is outputted from the BCA reproducing circuit 1401 upon reproduction is also the disk ID signal (BCAS) of the optical disk 1101. Accordingly, the content which is either decrypted or descrambled is outputted from the encryption decoder 1413 as an output signal 1414. When the operation for the decoding process is denoted by #, the following equation can be represented:

$$C[BCAS]\#BCAS=C \tag{2}$$

In this case, when the data of the content is image data, the image data such as an MPEG signal is expanded so as to obtain data of an image signal.

As described above, the encrypting of the third preferred embodiment has a disk ID as a key, and since only one disk ID exists corresponding to one optical disk, there is an advantageous effect such that the same encrypted content can be recorded only on that optical disk. That is to say, when the above-described content 1407 is attempted to be copied and reproduced onto another optical disk which has another disk ID of ID2 from a regular optical disk which has, for example, a disk ID of ID1, ID2 is outputted as the disk ID signal 1402 from the BCA reproducing circuit 401. However, the encrypted content is encrypted with a disk ID signal of ID1, and therefore, the encrypted content cannot be decoded by the encryption decoder 1413.

The encrypting encoder 1408 is not located at a supplying source of the content, and is located on the side of the recording and reproducing apparatus in the network, then it may be formed in a form of an IC card or the like on which the encrypting encoder 1408 is mounted. Also, since the above-mentioned optical disk 1101 is encrypted by using only the disk ID, data can be reproduced with an arbitrary optical disk recording and reproducing apparatus having the BCA reproducing circuit 1401 and the encryption decoder 1413.

Fourth Preferred Embodiment

Figure 20:
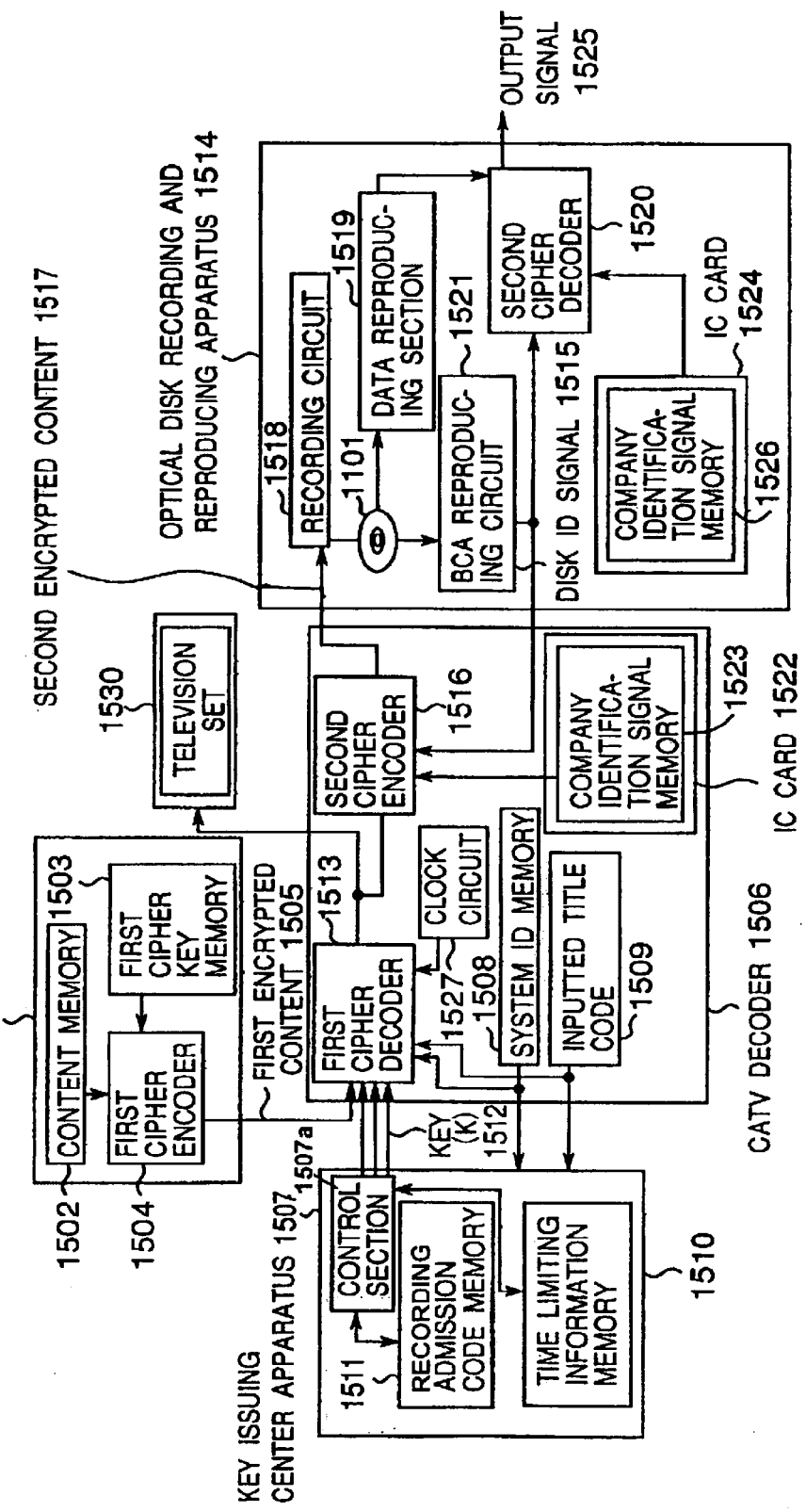
FIG. 20 is a block diagram showing a configuration of an optical disk recording and reproducing system of a fourth preferred embodiment according to the present invention.

Next, an encrypted content recording method of the fourth preferred embodiment according to the present invention will be described with reference to the drawings. FIG. 20 is a block diagram illustrating a configuration of an optical disk recording and reproducing system of a fourth preferred embodiment according to the present invention, which shows an apparatus configuration for recording encrypted content on a recording-type optical disk which is either a rewritable or non-rewritable optical disk having a BCA. In the following description of the fourth preferred embodiment, a description of the same elements that were described with respect to the third preferred embodiment are omitted.

Referring to FIG. 20, the optical disk recording and reproducing system according to the fourth preferred embodiment comprises a CATV company apparatus 1501, a key issuing center apparatus 1507, a CATV decoder 1506, an optical disk recording and reproducing apparatus 1514, and a television set 1530. In this case, the CATV company apparatus 1501 comprises a content memory 1502 for storing data of contents such as movie software, a first cipher key memory 1503 for storing a first cipher key, and a first cipher encoder 1504. Also, the key issuing center apparatus 1507 comprises a control section 1507a for controlling the operation of the key issuing center apparatus 1507, a time limiting information memory 1510 for storing time limiting information, and a recording admission code memory 1511 for storing a limiting admission code. In addition, the CATV decoder 1506 comprises a system ID memory 1508 for storing a system ID of the CATV decoder 1506, a first cipher decoder 1513, a second cipher encoder 1516, and a company identification signal memory 1523 that is provided within an IC card 1522. Furthermore, the optical disk recording and reproducing apparatus 1514 comprises a recording circuit 1518, a data reproducing section 1519, a BCA reproducing circuit 1521, a second cipher decoder 1520, and a company identification signal memory 1526 that is provided within an IC card 1524.

First of all, the first cipher encoder 1504 of the CATV company apparatus 1501 encrypts the data of the content, such as movie software, that is stored in the content memory 1502 by using a first cipher key that is stored in the first cipher key memory 1503 so as to generate a first encrypted content 1505. Then, the generated first encrypted content 1505 is transmitted to the first cipher decoder 1513 of the CATV decoder 1506 for each user via the network. When the data that is stored in the content memory 1502 of the CATV company apparatus 1501 is denoted by C, the first cipher key stored in the first cipher key memory 1503 is denoted by FK, and the first encrypted content 1505 is denoted by C [FK]. Then, the following equation can be represented:

$$C*FK=C[FK] \qquad (3).$$

The CATV decoder 1506 transmits, via the network to the key issuing center apparatus 1507, (a) a system ID for the CATV decoder 1506 that is stored in the system ID memory 1508; and (b) a title code 1509 that is inputted by using, for example, a keyboard (not shown) of the CATV decoder 1506, which is added in advance to the above-mentioned content that is desired to be recorded on the audio-type or RAM-type optical disk 1101. In this case, the title code 1509 may be inputted by being selected according to the TV screen of the television set 1530, the title code 1509 may be inputted directly using the keyboard or may be inputted from a remote controller or the like. Accordingly, the title code 1509 may be obtained by a user's acquisition in his own way, or the title code 1509 may be transmitted to the CATV decoder 1506 together with the first encrypted content 1505. The title code 1509 may be sent in advance at a different time than the transmission time of the first encrypted content 1505 in a form such as a program guide.

Based on the system ID of the CATV decoder 1506 and the title code 1509 of the above-mentioned content, the control section 1507a of the key issuing center apparatus 1507 refers to the time limiting information that is stored in the time limiting information memory 1510 and the recording admission code that is stored in the recording admission code memory 1511, and transmits a key (K) 1512 corresponding to these data of the recording admission code and the time limiting code, together with the recording admission code and the time limiting code, via the network to the first cipher decoder 1513 of the CATV decoder 1506. The time limiting information allows the same content to be distinguished from among the cases where the same content is broadcasted a plurality of times at different times. When the first decipher key is denoted by FK, the system ID of the CATV decoder 1506 is denoted by DID, the time limitation information is denoted by TIME, the recording admission code is denoted by COPY, and the title code 1509 of the content is denoted by T.

Then, the key (K) satisfies the relationship that is indicated by the following equation:

$$FK=K*T*DID*TIME*COPY \qquad (4).$$

It is determined whether the recording admission code that is stored in the record permission (admission) code memory 1511 is permitted only for watching and listening, or for both of watching and listening, and recording, based on a judgment result when the CATV company apparatus 1501, for example, judges whether or not the broadcast content is a new work or an old work.

The first cipher decoder 1513 of the CATV decoder 1506 decrypts the first encrypted content 1505 when the first decipher key (FK), the key (K) 1512, the title code 1509 of the above-mentioned content, the system ID, the record permission code and the time limitation information satisfy the abovementioned relationship, and the present time information outputted from the clock circuit 1527 satisfies the condition of the time limitation information. In this case, when the above-mentioned encrypted content are an image signal, the descrambled image signal is outputted from the first cipher decoder 1513 to the television set 1530, and then, the user can watch an image of the image signal and listen to an audio signal corresponding to the image signal. In this case, the decrypting process of the first cipher decoder 1513 is expressed by the following equation:

$$C[FK] \# (K*T*DID*TIME*COPY) \qquad (5)$$
$$= C[FK] \# FK$$
$$= C.$$

When the record permission code permits only watching and listening, the content data can be recorded on the optical disk 1101. However, when both of watching and listening, and recording are permitted, the content data can be recorded on the optical disk 1101. Therefore, this method will be described as follows.

The BCA reproducing circuit 1521 of the optical disk recording and reproducing apparatus 1514 reproduces the data of the BCA 1104 of the optical disk 1101 so as to obtain the disk ID signal 1515, and outputs the disk ID signal to the second cipher encoder 1516 of the CATV decoder 1506. The second cipher encoder 1516 of the CATV decoder 1506 encrypts the data of the content outputted from the first cipher decoder 1513 by using the disk ID signal 1515 as the second cipher key so as to generate a second encrypted content 1517, and outputs the generated second encrypted content 1517 to the recording circuit 1518 of the optical disk recording and reproducing apparatus 1514. It is to be noted that the above-mentioned encrypting of the second cipher decoder 1516 is limited to the time when the first encrypted content is decrypted and outputted from the first cipher decoder 1513. The content which is the output signal from the first cipher decoder 1513 is denoted by C, the disk ID signal 1515 which is the second cipher key is denoted by BCAS, and the second encrypted content 1517 is denoted by C [BCAS]. Then, the following equation can be represented:

$$C*BCAS=C[BCAS] \qquad (6).$$

The second encrypted content 1517 that is outputted to the recording circuit 1518 of the optical disk recording and reproducing apparatus 1514 is modulated by using, for example, a well-known 8/16 modulation system to the recording circuit 1518, and then, the modulated signal is recorded in the user data area 1103 on the optical disk 1101 by the optical pickup (not shown). When the above-mentioned content that is encrypted and recorded on the optical disk 1101 is reproduced, the laser beam that is outputted from the optical pickup is irradiated onto an area where the above-mentioned encrypted content is recorded on the optical disk 1101 so that the reflected light enters the optical pickup. The above-mentioned optical pickup photoelectrically converts the entered reflected light into a reproduced electric signal, and then, the reproduced signal which has been photoelectrically converted is outputted to the data reproducing section 1519. The data reproducing section 1519 A/D converts the inputted reproduced signal into a digital reproduced signal, and then, the digital reproduced signal is outputted to the second cipher decoder 1520.

On the other hand, a laser beam that is outputted from the optical pickup is irradiated onto the BCA 1104 of the optical disk 1101 so that the reflected light enters the optical pickup.

The above-mentioned optical pickup photoelectrically converts the inputted reflected light into a reproduced electric signal, and then, the reproduced signal which has been photoelectrically converted is outputted to the BCA reproducing circuit 1521. The BCA reproducing circuit 1521 generates the disk ID signal 1515 based on the inputted reproduced signal, and the generated disk ID signal is outputted to the second cipher decoder 1520. In response to the disk ID signal 1515, the second cipher decoder 1520 decrypts the reproduced encrypted content outputted from the data reproducing section 1519 by using the inputted disk ID signal 1515 as a key. At that time, in the case where the content is regularly recorded on the optical disk 1101, the key for decrypting the encrypted content that is recorded on the optical disk 1101 is the disk ID of the optical disk 1101, and the disk ID signal 1515 that is outputted from the BCA reproducing circuit 1521 is also the disk ID signal (BOAS) of the optical disk 1101. Therefore, the second cipher decoder 1520 can normally carry out the decrypting process. Accordingly, the data of the content that are decrypted or descrambled are outputted from the second cipher decoder 1520 as an output signal 1525. In this case, the decrypting process of the second cipher decoder 1520 can be expressed in the following equation. When the data content is an image signal, the second cipher decoder 1520 expands, for example, an MPEG signal to reproduce an original image signal, and then, outputs the image signal.

$$C[BCAS]\#BCAS=C \qquad (7)$$

The above-mentioned optical disk 1101 is encrypted by using only the disk ID signal (BCAS) 1515, and therefore, it is possible to reproduce content data by an arbitrary optical disk recording and reproducing apparatus comprising a BCA reproducing circuit 1521 and the second cipher decoder 1520. Although the encryption encoders 1504 and 1516 perform encryption and the encryption decoders 1513 and 1520 perform decryption in the above description, encrypting and decrypting may be performed by a configuration such that programs for encryption algorithms and decryption algorithms are included in the program that is carried out by the CPU which is the control section within each of the apparatuses 1501, 1506 and 1514.

Although, in the fourth preferred embodiment, the second cipher encoder 1516 of the CATV decoder 1506 encrypts the content by using the disk ID signal 1515 as the second cipher key, the content may be encrypted as follows. For example, the IC card 1522 prepared for each CATV company apparatus 1501 may be mounted on the CATV decoder 1506, and the company identification signal that is recorded within the company identification signal memory 1523 of the IC card 1522 and the disk ID signal (BCAS) that is reproduced by the BCA reproducing circuit 1521 may be combined to be used as the second cipher key for encrypting the content by the second cipher encoder 1516. The content of the output signal from the first cipher decoder 1513 is denoted by C, the disk ID signal 1515 which is the first second cipher key is denoted by BCAS, the company identification signal 1523 which is the second cipher key is denoted by CK, and the second encrypted content 1517 is denoted by C [BCAS, CK]. Then, the encrypting process of the second cipher encoder 1516 is expressed by the following equation:

$$C*BCAS*CK=C[BCAS, CK] \qquad (8).$$

Next, when the content that is encrypted and recorded on the optical disk 1101 is reproduced, a laser beam that is outputted from the optical pickup is irradiated onto an area in which the above-described encrypted content has been recorded on the optical disk 1101 so that the reflected light enters the optical pickup. The optical pickup photoelectrically converts the entered reflected light to a reproduced signal, which is then outputted to the data reproducing section 1519. The data reproducing section 1519 A/D coverts the inputted reproduced signal into a digital reproduced signal, which is then outputted to the second cipher decoder 1520. On the other hand, a laser beam that is outputted from the optical pickup is irradiated onto the BCA 1104 of the optical disk 1101 so that the reflected light enters the optical pickup. The optical pickup photoelectrically converts the entered reflected light into a reproduced signal, which is outputted to the BCA reproducing circuit 1521. The BCA reproducing circuit 1521 reproduces the disk ID signal 1515 based on the inputted reproduced signal, and then, the disk ID signal 1515 is outputted to the second cipher encoder 1516 and the second cipher decoder 1520.

In addition, the company identification signal that is stored in the company identification signal memory 1526 of the IC card 1524 mounted on the optical disk recording and reproducing apparatus 1514 is inputted to the second cipher decoder 1520. The company identification signal may not be recorded within the company identification signal memory 1526 of the IC card 1524, for example, upon installation of a recording program of the optical disk recording and reproducing apparatus 1514, but instead, the company identification signal may be recorded in a memory (not shown) that is connected to a CPU of a control section of the optical disk recording and reproducing apparatus 1514. Alternatively, the company identification signal may be inputted by using a keyboard (not shown) of the optical disk recording and reproducing apparatus 1514.

The second cipher decoder 1520 decrypts the encrypted content by using the inputted disk ID signal 1515 and the company identification signal as decipher keys. At this time, in the case where the user of the CATV decoder 1506 contracts formally with a particular CATV company having the CATV company apparatus 1502, and the content 1502 is regularly recorded on the optical disk 1101, the first decipher key for the encrypted content that are encrypted and recorded on the optical disk 1101 is just the disk ID signal (BCAS) of the optical disk 1101 which will be reproduced exactly at that moment, and the second cipher key is the company identification signal (CK) that is stored in the company identification signal memory 1526 of the IC card 1524 supplied from the contracted CATV company. Accordingly, the outputted signal 1525 of the decoded or descrambled contents is outputted from the second cipher decoder 1520. In this case, the decrypting process of the second cipher decoder 1520 is expressed in the following equation. When the content is an image signal, for example, an MPEG signal is extended by the second cipher decoder 1520, and then, an output signal 1525 of the image signal is outputted.

$$C[BCAS*CK]\#(BCAS*CK)=C \qquad (9)$$

Since the content of the above-described optical disk 1101 is encrypted by using the disk ID signal 1515 and the company identification signal, it is possible to carry out reproduction by an arbitrary optical disk recording and reproducing apparatus comprising the BCA reproducing circuit 1521 and the second cipher decoder 1520 if the contract is made with the CATV company which supplies the above-mentioned content. On the contrary, if the contract is not made with above-mentioned CATV company, the company identification signal cannot be obtained, and the content therefore cannot be reproduced, which thereby makes it possible to distinguish the contracted user from non-contracted user.

Also, since in the fourth preferred embodiment each user sends a disk ID signal from the optical disk recording and reproducing apparatus 1514 to the CATV decoder 1506 that is located at his or her own home to encrypt image data or the like, it is not necessary for the CATV apparatus 1501 to change encrypted content that is individually delivered to each user. Therefore, the system for broadcasting can be simplified to supply the same content to a mass audience at a low cost. In addition, according to the fourth preferred embodiment, recording on only one RAM-type optical disk can be permitted for each user having the CATV decoder 1506.

Although the case where the content is broadcasted from a head end of the cable television system is described in the fourth preferred embodiment, the present invention is not limited thereto, and the present invention can be applied to broadcasting by using a radio wave.

Fifth Preferred Embodiment

Figure 21:
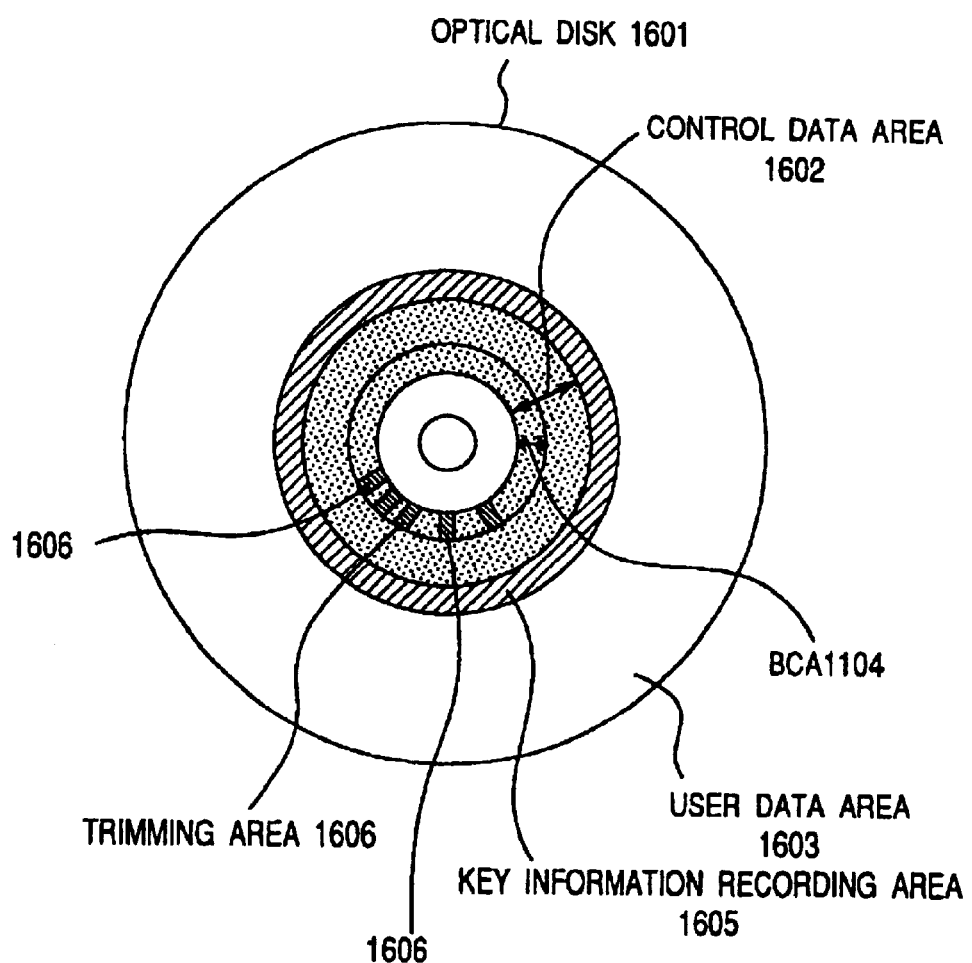
FIG. 21 is a plan view showing a data recording area of an optical disk 1601 of a fifth preferred embodiment according to the present invention.
Figure 22:
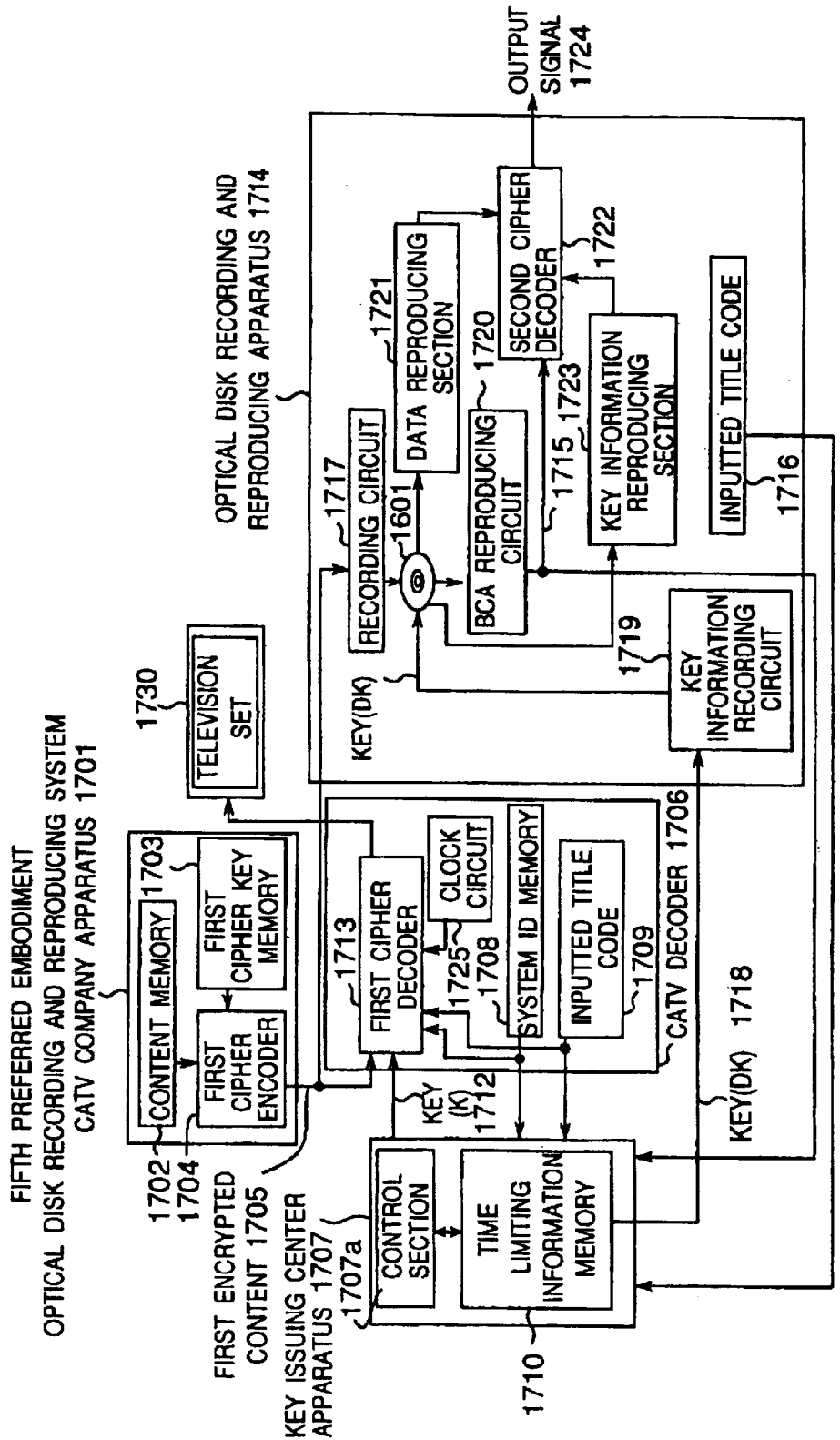
FIG. 22 is a block diagram showing a configuration of an optical disk recording and reproducing system according to the fifth preferred embodiment.

A method for recording and reproducing encrypted content of a fifth preferred embodiment according to the present invention will be described with reference to the drawings. FIG. 21 shows a plan view illustrating a data recording area of an optical disk 1601 of the fifth preferred embodiment according to the present invention, and FIG. 22 is a block diagram showing a configuration of an optical disk recording and reproducing system according to the fifth preferred embodiment. In the fifth preferred embodiment, the description of the elements which are common with the third and the fourth preferred embodiments are omitted in the following description.

Referring to FIG. 21, reference numeral 1601 denotes a recording-type optical disk which is either a rewritable type or non-rewritable type of optical disk, reference numeral 1602 denotes a control user data area in which disk information is recorded in a form of concavo-convex pits, reference numeral 1603 denotes a user data area into which the user records the data (recording data) by irradiating a light beam from a laser onto the optical disk, and reference numeral 1604 denotes an BCA in which a disk ID is recorded.

In the BCA 1604, a plurality of trimming areas 1606 having an elongated shape in the radius direction are formed by partially trimming a recording film on concavo-convex pits in the inner peripheral section of the control user data area 1602 by using a pulse laser such a YAG laser or the like. The trimming is carried out by the disk manufacturer. Also, by adding the disk ID to the data recorded in the BCA 1604, the management of the optical disk can be easily implemented. In addition, by recording the data of the BCA 1604 on the concavo-convex pits, the information for identifying the optical disk which is recorded in the BCA 1604 can be prevented from easily being falsified.

In addition, by arranging the control user data area 1602 and the BCA 1604 so as to be adjacent to each other, the data of the BCA 1604 can be reproduced continuously when the data of the control user data area 1602 are reproduced, or the data of the control user data area 1602 can be reproduced continuously when the data of the BCA 1604 are reproduced. Therefore, it becomes possible to accelerate the process for obtaining or acquiring information of the BCA 1604 so as to identify the optical disk quickly by the CPU, for example, when the optical is disk is started up and for recording the encrypted contents.

Although the BCA 1604 of the fifth preferred embodiment is formed by trimming the recording film on the concavo-convex pits in the inner periphery section of the control user data area 1602, the recording film which constitutes an optical disk of recording type that is either a rewritable type or non-rewritable-type of optical disk is easily affected by heat, as compared with the reflecting film which is formed on a read-only optical disk. By trimming the inner periphery section of the control user data area 1602, the recording data of the user data area 1603 can be protected from heat that is generated upon trimming as compared with that when the outer periphery section is trimmed. The reason why the BCA 1604 is formed on the inner peripheral side of the control user data area 1602 is that a margin is taken into consideration when the diameter of the beam spot from a laser beam fluctuates due to instability of a focusing servo circuit of a laser device. The data recorded in the BCA 1604 before trimming maybe recorded in the control user data area 1602. The data recorded in the BCA 1604 can be recorded in the control user data area 1602 so that the above-mentioned data of the control user data area 1602 can be protected upon trimming.

In addition, when the above-mentioned data is recorded continuously and repetitively from the BCA 1604 to the control user data area 1602, the position of the BCA 1604 can be predicted by finding out the above-mentioned data in the control user data area 1602. Also, the data in the key information recording area 1605 is recorded by irradiating a light beam in the same way as that of the user data area 1603.

In a manner similar to that of the fifth preferred embodiment, by arranging the control user data area 1602 and the key information recording area 1605 so as to be adjacent to each other, the data in the key information recording area 1605 can be reproduced continuously when the data of the control user data area 1602 are reproduced or the data of the control user data area 1602 can be reproduced, continuously when the data of the key information recording area 1605 are reproduced. Therefore, it becomes possible to accelerate the process for obtaining the information of the BCA 1604 to identify the optical disk quickly by a CPU when, for example, the optical disk is started up and for reproducing the encrypted content.

Referring to FIG. 22, the optical disk recording and reproducing system according to the fifth preferred embodiment comprises a CATV company apparatus 1701, a key issuing center apparatus 1707, a CATV decoder 1706, an optical disk recording and reproducing apparatus 1714, and a television set 1730. In this case, the CATV company apparatus 1701 comprises a content memory 1702 for storing the content such as movie software, a first cipher key memory 1703 for storing a first cipher key, and a first cipher encoder 1704. Also, the CATV decoder 1706 comprises a system ID memory 1708, a first cipher decoder 1713, and a clock circuit 1725 for outputting the present time information. Further, the key issuing center apparatus 1707 comprises a control section 1707a for controlling the operation of the key issuing apparatus 1707 and a time limiting information memory 1710. Further, the optical disk recording and reproducing apparatus 1714 comprises a recording circuit 1717, a key information recording circuit 1719, a BCA reproducing circuit 1720, a data reproducing section 1721, a second cipher decoder 1722 and a key information reproducing section 1723.

First of all, the first cipher encoder 1704 of the CATV company apparatus 1701 encrypts data of the content such as movie software which is stored in the content memory 1702 by using the first cipher key 1703 so as to generate a first encrypted content 1705, and the first cipher encoder 1704 transmits the generated first encrypted content 1705 to the first cipher decoder 1713 of the CATV decoder 1706 of each user through the network. The content that is stored in the content memory 1702 is denoted by C, the first cipher key that is stored in the first cipher key memory 1703 is denoted by FK, and the first encrypted content 1705 is denoted by C [FK]. Then, the following equation can be represented:

$$C*FK=C[FK] \qquad (10).$$

The CATV decoder 1706 transmits, to the control section 1707a of the key issuing center apparatus 1707 via the network, a system ID that is stored in the system ID memory 1708 of the CATV decoder 1706, and a title code 1709 of the above-mentioned content which user wishes to watch and listen to, where the title code 1709 is inputted by using, for example, a keyboard (not shown). The above-mentioned title code 1709 may be inputted by selecting according to the screen of the television set 1730, the title code 1709 may be inputted directly by using the keyboard, or the title code 1709 may be inputted from the remote controller or the like. Accordingly, the title code 1709 may be obtained by a user in his own way, the title code 1709 may be sent from the CATV decoder 1706 together with the first encrypted content, or the title code 1709 may be sent in advance at a different time from that of the first encrypted content in a form of program guidance or the like.

Based on the system ID of the CATV decoder 1706 and the title code 1709 of the above-mentioned content, the control section 1707a of the key issuing center apparatus 1707 generates the corresponding key (K) 1712 with reference to the corresponding time limitation information that is stored in the time limitation information memory 1710, and then, transmits the generated key (K) 1712 to the first cipher decoder 1713 of the CATV decoder 1706 via the network. The time limitation information makes it possible to distinguish from among the cases where the same content is broadcasted a plurality of different times. The first decipher key is denoted by FK, the system ID of the CATV decoder 1706 is denoted DID, the time limitation information is denoted by TIME, and the title code 1709 of the content is denoted by T, the key (K) 1712 satisfies the relationship represented by the following equation:

$$FK=K*T*DID*TIME \qquad (11).$$

The first cipher decoder 1713 can decrypt the first encrypted content 1705 if the first decipher key (FK), the above-mentioned key (K) 1712 transmitted from the key issuing center apparatus 1701, the title code (T) 1709 of the above-mentioned content, the system ID (DID), and the time limitation information (TIME) satisfy the above-mentioned relationship, and if the time limitation information (TIME) satisfies the condition of the present time information from the clock circuit 1725. In this case, when the first encrypted content 1705 is an image signal, the descrambled image signal is outputted to the television set 1730 from the first decipher decoder 1713 so that the user can watch and listen to the content on the television set 1730. In this case, the decrypting process of the first cipher decoder 1713 is expressed as follows:

$$C[FK]\#(K*T*DID*TIME)$$

$$C[FK]\#FK$$

$$C \qquad (12)$$

Next, the method for recording the above-mentioned content on the optical disk 1601 will be described. When the content is recorded on the optical disk 1601, the first encrypted content 1705 which has not been decrypted by the CATV decoder 1706 is transmitted to the recording circuit 1717 of the optical disk recording and reproducing apparatus 1714 from the first cipher encoder 1704 of the CATV company apparatus 1701. The recording circuit 1717 digitally modulates data of the received first encrypted content 1705 by using a modulation system such as a well-known 8/16 modulation system, and the modulated digital data are recorded on the optical disk 1601 by the optical pickup (not shown). Accordingly, it is necessary for the first encrypted content 1705 to be decrypted so as to reproduce the above-mentioned content that are encrypted and recorded on the optical disk 1601.

The optical disk recording and the reproducing apparatus 1714 transmits, to the control section 1707a of the key issuing center apparatus 1707 via the network, the disk ID signal 1715 of the optical disk 1601 that is reproduced by the BCA reproducing circuit 1720 and the title code 1716 of the above-mentioned content, which is inputted by using, for example, a keyboard (not shown) and which the user wishes to reproduce. As to the timing for sending the disk ID, the disk ID may be sent when the key issuing center apparatus 1707 is accessed, or the disk ID may be sent together with the title code when listening and watching the content.

Although, as a method for transmitting the disk ID, a method for sending the output signal from the BCA reproducing circuit 1720 directly to the key issuing center apparatus 1707 by reproducing the BCA 1604 of the optical disk 1601 as shown in FIG. 22 is disclosed above, the present invention is not limited thereto, and the following method maybe used. For example, the data of the BCA 1604 is reproduced before access to the key issuing center apparatus 1707 when starting up the disk, and the data of the BCA 1604 is stored in a memory (not shown) of the optical disk recording and reproducing apparatus 1714 or the CATV decoder 1706, and then, the data of the BCA 1604 is transmitted to the control section 1707a of the key issuing center apparatus 1707 at the above-mentioned timing. In addition, when the disk ID can be recognized visually in some form such as a label, a keyboard may be used for inputting the disk ID. When the label is a bar code, a bar code reader may be used for reading out the disk ID.

The control section 1707a of the key issuing center apparatus 1707 generates a key (DK) 1718 corresponding to the disk ID signal 1715 of the optical disk 1601 and the title code 1716 of the content, and transmits the generated key (DK) 1718 to the key information recording circuit 1719 of the optical disk recording and reproducing apparatus 1714. In this case, the first decipher key is denoted by FK, the disk ID signal 1715 of the optical disk 1601 is denoted by BCAS, and the title code 1716 of the content is denoted by T, whereby the key (DK) satisfies the relationship of the following equation:

$$FK = DK * BCA * T \qquad (13)$$

The key (DK) that is inputted into the key information recording circuit 1719 of the optical disk recording and reproducing apparatus 1714 is digitally modulated by using a modulating system such as the well-known 8/16 modulation system or the like, and then, the modulated digital data is recorded in the key information recording area 1605 on the optical disk 1601 by the optical pickup (not shown). The key (DK) may be recorded a plurality of times in the key information recording area 1605. By recording the same key a plurality of times, the key (DK) can be protected when the recording film of the key information recording area 1605 deteriorates or when the optical disk 1601 gets scratched, and as a result, the content can be decrypted only when the data of either one of the keys (DK) can be reproduced.

Although, in the fifth preferred embodiment, the key information recording area 1605 is provided on the inner peripheral side of the user data area 1603, the key information recording area 1605 may be provided on the outer peripheral side of the user data area 1603, or the key information recording area 1605 may be provided both on the inner periphery and the outer peripheral sides. By providing the key information recording area 1605 on the outer peripheral side, it becomes possible to record more keys (DK). Also, by dispersedly providing a plurality of key information recording areas, the key (DK) can be protected by the other key information recording areas even in the case where one key information recording area cannot be reproduced.

On the other hand, a laser beam that is outputted from the optical pickup is irradiated onto the area of the optical disk 1601 on which the above-described content is recorded so that the reflected light enters into the optical pickup. The optical pickup photoelectrically converts the entered reflected light into a reproduced electric signal, and the reproduced signal which has been photoelectrically converted is outputted to the data reproducing section 1721. In response to this, the data reproducing section 1721 A/D converts the inputted reproduced signal into encrypted digital data, which is outputted to the second cipher decoder 1722. In addition, a laser beam that is outputted from the optical pickup is irradiated onto the BCA 604 of the optical disk 1601, and then, the reflected light enters the optical pickup. The optical pickup photoelectrically converts the inputted reflected light into a reproduced electric signal, and the reproduced signal which has been photoelectrically converted is outputted to the BCA reproducing circuit 1720. In response to this, the BCA reproducing circuit 1720 reproduces the disk ID signal 1715 based on the inputted reproduced signal, which is outputted to the encryption decoder 1722. In addition, a laser beam that is outputted from the optical pickup is irradiated onto the key information recording area 1605 of the optical disk 1601 so that the reflected light enters the optical pickup. The optical pickup photoelectrically converts the entered reflected light into a reproduced electric signal, and outputs the reproduced signal to the key information reproducing section 1723. In response to this, the key information reproducing section 1723 generates data of a key (DK) based on the inputted reproduced signal, which is outputted to the second cipher decoder 1722.

When the content is reproduced immediately after access to the key issuing center apparatus 1707, the key information recording circuit 1719 may directly input the key (DK) to the second cipher decoder 1722 before recording the same key (DK) in the key information recording area 1605. By doing this, the time until the reproduction is started can be shortened. The cipher decoder 1722 decrypts the encrypted content by using the decipher key including the inputted disk ID signal 1715, the key (DK) and the title code 1716 of the above-described content. The decrypting process of the second cipher decoder 1722 is expressed in the following equation. When the content is an image signal, an MPEG signal is, for example, expanded so that an output signal 1724 of the image signal is outputted from the second cipher decoder 1722.

$$C[FK] \# (DK * BCA * T) \qquad (14)$$
$$= C[FK] \# FK$$
$$= C$$

In the fifth preferred embodiment, when a user fee is imposed when the key signal is received from the control section 1707a of the key issuing center apparatus 1707, a fee is separately imposed when listening and watching the content, and the content that is recorded on the optical disk 1601 is reproduced for the first time, which avoids the fee imposition only upon recording the content data on the optical disk 1601. Accordingly, it becomes possible to lower the imposed fee, (a) for the users who wish to listen and watch content, but do not need to record content data on the optical disk 1601, or (b) for the users who wish to record content data on the optical disk 1601, but who do not need to listen and watch content upon broadcasting, as compared with the case in which a fee is imposed once for both listening or watching and recording on the optical disk 1601.

Also, since a fee is not imposed for only recording on the optical disk 1601, the user can determine whether or not the user receives the key for reproducing the optical disk 1601 to listen and watch again after listening and watching. Although, in the above-mentioned fifth preferred embodiment, a method for receiving the key (DK) from the control section 1701a of the key issuing center apparatus 1707 via the network is used, the present invention is not limited thereto. For example, the title and the disk ID number of the content may be orally conveyed over the phone or the like, and be inputted by using a keyboard after being received orally.

Next, the case will be described where the optical disk 1601, on which the key (DK) is recorded in the key information recording area 1605, is reproduced after access to the key issuing center apparatus 1707 is completed. First of all, a laser beam that is outputted from the optical pickup is irradiated onto the area of the optical disk 1601 where the above-mentioned content is recorded, and then, the reflected light is inputted to the data reproducing section 1721 via the optical pickup which carries out the photoelectric conversion. In response to this, the data reproducing section 1721 outputs the data of the encrypted content to the second cipher decoder 1722. On the other hand, a laser beam that is outputted from the optical pickup is irradiated onto the BCA 1604 of the optical disk 1601 so that the reflected light is inputted into the BCA reproducing circuit 1720 via the optical pickup which carries out the photoelectric conversion. In response to this, the BCA reproducing circuit 1720 generates the disk ID signal 1715 based on the inputted reproduced signal, which is outputted to the second cipher decoder 1722.

In addition, the laser beam that is outputted from the optical pickup is irradiated onto the key information recording area 1605 of the optical disk 1601 so that the reflected light is inputted into the key information reproducing section 1723 via the optical pickup which carries out the photoelectric conversion. In response to this, the key information reproducing section 1723 generates data of the key (DK) based on the inputted reproduced signal, which is outputted to the second cipher decoder 1722. The second cipher decoder 1722 decrypts the encrypted content outputted from the data reproducing section 1721 by using the decipher key including the inputted disk ID signal 1715, the key (DK) and the title code 1716 of the above-mentioned content. The decoding process of the second cipher decoder 1722 is expressed in the following equation. When the content is an image signal, an MPEG signal is, for example, expanded, and the image signal of the expanded MPEG signal is outputted from the second cipher decoder 1722.

$$C[FK] \# (DK * BCA * T) \quad (15)$$
$$= C[FK] \# FK = C$$
$$= C$$

By recording the data of the key (DK) once in the key information recording area 1605, the above-mentioned encrypted content can always be reproduced without any access to the key issuing center apparatus 1707. Also, since all of the decipher keys that are required for the decrypting process are recorded on the optical disk 1601, the above-mentioned optical disk 1601 can be reproduced by an arbitrary optical disk recording and reproducing apparatus comprising the BCA reproducing circuit 1720, the key information reproducing section 1723 and the second cipher decoder 1722.

In addition, in the case where the above-mentioned encrypted content is attempted to be reproduced after being copied onto the optical disk 1601 with a different disk ID, a disk ID signal that is different from that of the above-mentioned optical disk 1601 is outputted from the BCA reproducing circuit 1720, and therefore, the encrypted content cannot be decrypted, which thereby prevents the content from being reproduced after being copied. Even in this case, however, by conveying the title and the disk ID of the content to the key issuing center through the network or orally, the decipher key may be received after the fee is imposed. In this way, even if the encrypted content is copied onto another optical disk 1601, content cannot be reproduced irregularly, and a fee is always imposed when the optical disk 1601 on which the encrypted content is copied, is reproduced, which thereby leads to the protection of the copyright for the content.

Figure 23:
FIG. 23 is a table showing a configuration of an ID adding table according to the fifth preferred embodiment.

FIG. 23 shows a table showing a configuration of the table with IDs according to the fifth preferred embodiment, where the table shows keys (K) that are inputted into the first cipher decoder 1713 and keys (DK) that are inputted into the key information recording circuit 1719 in a rearranged form for different system IDs and different disk IDs.

Referring to FIG. 23, T1, T2 and T3 denote title codes for different contents, and FK1, FK2 and FK3 denote decipher keys for decoding encrypted contents having the title codes of T1, T2 and T3, respectively. DID1, DID2 and DID3 denote system IDs for different CATV decoders 1706, and BCAS1, BCAS2 and BCAS3 denote disk IDs for different optical disks 1601. In this case, keys (Kmn) that are inputted into the CATV decoder 1706 are determined so as to satisfy the following equation:

$$FKn=Kmn*Tn*DID*TIMEn \quad (16).$$

Also, the keys (DKmn) that are inputted to the optical disk recording and reproducing apparatus 1714 are determined so as to satisfy the following equation:

$$FKn=DKmn*BCAm*Tn \quad (17).$$

As shown in FIG. 23, not only in the case of different content but also in the case of the same content, the key information that is acquired from the key issuing center apparatus 1707 for each different CATV decoder 1706, for each different optical disk and for each different broadcasting time is set so as to be different from each other, and then, this leads to protection of the copyright in detail. In the same way, since the key information differs when the system IDs, the disk IDs and the time information are different from the others even for the same content, it is not necessary for the CATV company apparatus 1701 to change the encrypted content for each user, therefore, one encrypted content maybe prepared for one content. Therefore, the system for broadcasting can be simplified, and it becomes possible to supply the content to a mass audience at a low cost.

Although, in the fifth preferred embodiment, the case described where the content is broadcasted from a head end of the cable television, the present invention can be applied to broadcasting by using a radio wave.

Advantageous Effects of Third to Fifth Preferred Embodiments

An optical disk according to the present preferred embodiments comprises (a) a first information area for recording first disk information therein, (b) a second information area for recording therein second disk information for identifying individual, and (c) a user data area in which recording information is possible by irradiating a light beam onto the user data area. Accordingly, by adding the above-mentioned information for identifying optical disks to an optical disk according to the prior art, the management of optical disks can be easily implemented. In this case, the above-mentioned second information area is preferably recorded in the above-mentioned first information area, and can be reproduced by the optical pickup for reproducing the above-mentioned first information area. In the above-mentioned second information area, data of the second information is recorded by partially eliminating or removing the recording film within the above-mentioned first information area so that a plurality of trimming areas having an elongated shape in the radius direction are formed, and this can prevent the above-mentioned second disk information from being easily falsified.

According to a method for recording encrypted content of the present preferred embodiments, when the data of the content is recorded on the user data area of an optical disk comprising (a) a first information area for recording the first disk information therein, (b) a second information area for recording therein the second disk information for identifying individual disks, and (c) a user data area in which recording information is recorded by irradiating a light beam onto the user data area, the data of the content is encrypted and the encrypted data is recorded so that the data of the content can be decrypted and reproduced by an operation or calculation using at least the above-mentioned second disk information. Accordingly, by encrypting the content using the identification information of an optical disk which exists only in one particular optical disk, there is such a specific advantageous effect that irregular copying of the content can be prevented so as to protect the copyright.

An optical disk according to the present preferred embodiments has a key information recording area for recording therein key information for decrypting encrypted and recorded content within the user data area. Accordingly, in a system which needs key information for decrypting the encrypted and recorded content, there is such a specific advantageous effect that it is not necessary to input key information each instance of reproduction after recording the key information once in the key information recording area.

Furthermore, according to a method for recording encrypted content of the present preferred embodiments, when the content is recorded in the user data area of an optical disk comprising (a) a first information area for recording the first disk information therein, (b) a second information area for recording therein the second disk information for identifying individual disks, (c) a user data area in which information is recorded by irradiating a light beam onto the user data area, and (d) a key information recording area for recording therein key information for decrypting the data of the encrypted and recorded content within the user data area, the data of the content is encrypted and the encrypted content is recorded so that the data of the content can be decrypted and reproduced by the operation using at least the above-mentioned second disk information and the above mentioned key information. Accordingly, even if the data of the encrypted content are copied onto another optical disk, the data thereof cannot be reproduced irregularly, and a fee is always imposed whenever the optical disk on which the data of the encrypted content are copied is reproduced, which thereby leads to the protection of the copyright.

In this case, the first disk information is preferably formed in a form of micro concavo-convex pits, and the second disk information for identifying optical disks is recorded on the concavo-convex pits. Therefore, the second disk information can be easily prevented from being falsified. Moreover, the first disk information and the second disk information are preferably formed to be adjacent from each other. In this case, when the above-mentioned first disk information is reproduced, the second disk information can be reproduced continuously, or when the second disk information is reproduced, the first disk information can be reproduced continuously. Therefore, it becomes possible to accelerate the process for recording the encrypted content after obtaining or acquiring the second disk information for identifying disks quickly by a CPU when, for example, the optical disk is started up.

According to a method for recording encrypted data of the present preferred embodiments, since key information differs for each different system ID, each disk ID and each time information even with the same content, it is not necessary for the CATV company apparatus 701 to change the encrypted content for each user, and then, the CATV company apparatus 701 may only prepare one encrypted content for one content. This leads to the system for broadcasting being simplified, and it thereby becomes possible to supply the content to a mass audience at a low cost.

Modified Preferred Embodiments of Third and Fifth Preferred Embodiments

Figure 24:
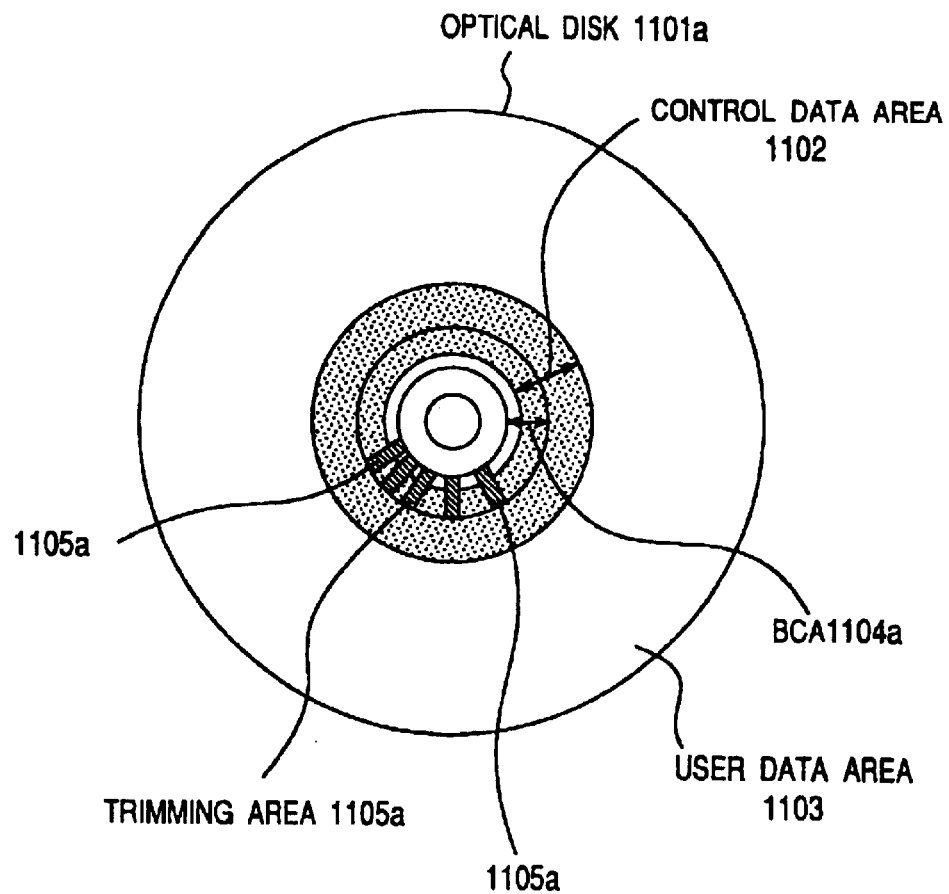
FIG. 24 is a plan view showing a data recording area of an optical disk 1101a according to a modified preferred embodiment of the third preferred embodiment.
Figure 25:
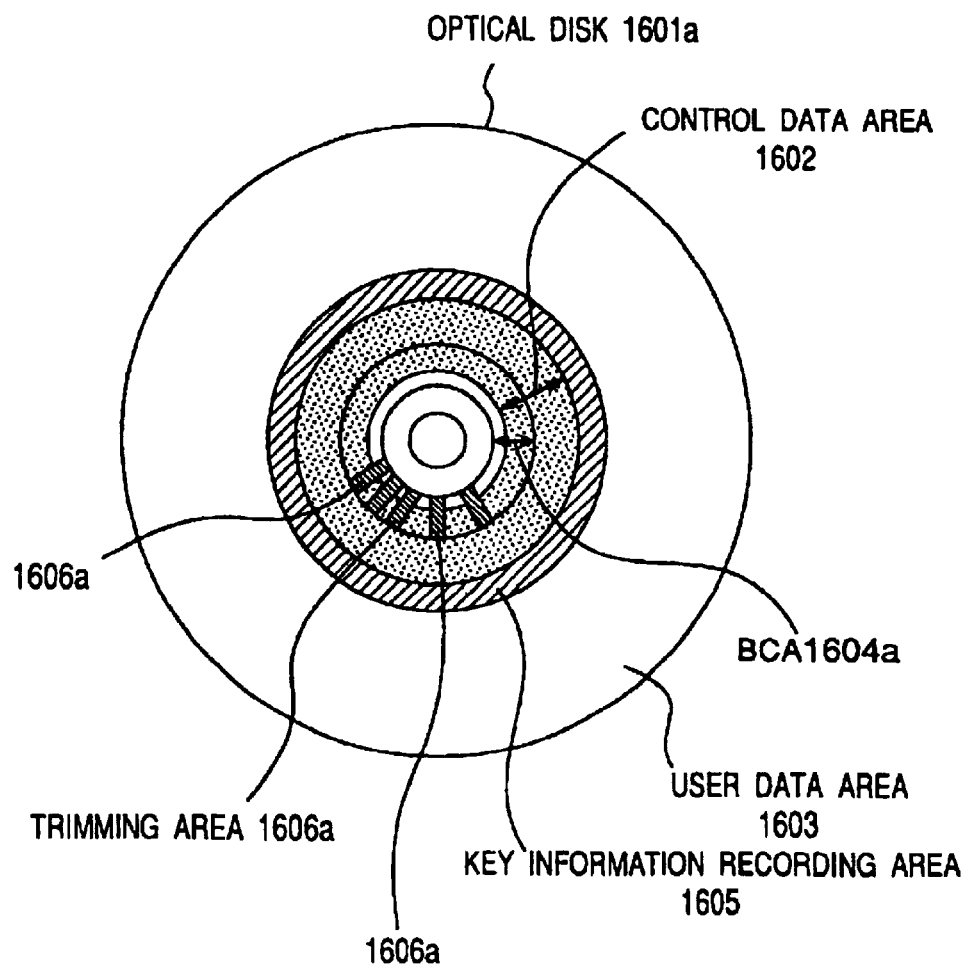
FIG. 25 is a plan view showing a data recording area of an optical disk 1601a according to a modified preferred embodiment of the fifth preferred embodiment.

Although in the above-mentioned third and fifth preferred embodiments, as shown in FIGS. 16 and 21, trimming areas 1105 and 1606 are formed in the BCAs 1104 and 1604 which are located in the inner periphery section within the control user data areas 1102 and 1602, respectively, the present invention is not limited thereto. As shown in FIGS. 24 and 25 which illustrate the data recording areas of the optical disks 1101a and 1601a according to the modified preferred embodiments of the third and the fifth preferred embodiments, respectively, the trimming areas 1105a and 1606a may be formed by trimming the recording film so as to protrude or project into the inner peripheral side of the optical disk from the control user data areas 1102 and 1602. That is to say, the BCAs 1104a and 1604a are not included in the control user data areas 1102 and 1602, respectively, but are formed and allocated so as to protrude or project into the inner side of the control user data areas 1102 and 1602 from the inner peripheral section of the control user data areas 1102 and 1602. In these modified preferred embodiments, the reason why the BCAs 1104a and 1604a are formed in this way is that the margin is taken into consideration where the diameter of the beam spot of the laser beam fluctuates due to the instability of the focusing servo circuit of the laser device. In the present modified preferred embodiments, the user data areas 1103 and 1603 exist outside of the control user data areas 1102 and 1602. Therefore, the trimming areas 1105a and 1606a are allocated and formed so as to protect the data recorded in those user data areas 1103 and 1602 from being destroyed.

Sixth Preferred Embodiment

Figure 26:
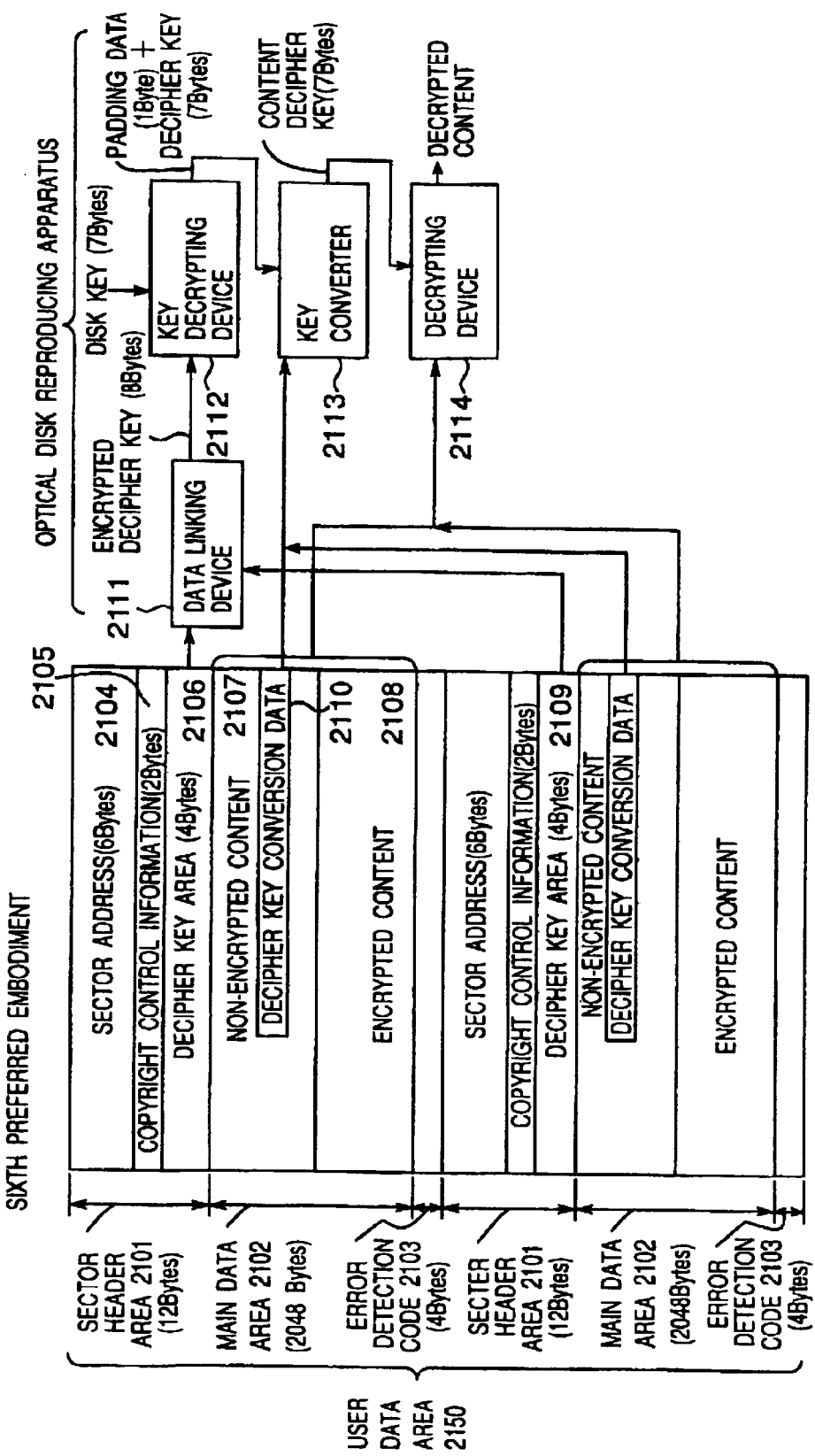
FIG. 26 is a block diagram showing a configuration of a user data area 2150 on the optical disk, and a configuration of an optical disk reproducing apparatus for decrypting an encrypted content from data in the user data area 2150 according to a sixth preferred embodiment of the present invention.

FIG. 26 shows a block diagram illustrating a configuration of a user data area within an optical disk and a configuration of an optical disk reproducing apparatus for decrypting an encrypted content from data in the user data area according to a sixth preferred embodiment of the present invention. In the sixth preferred embodiment, the optical disk is, for example, a recording-type optical disk such as a DVD-RAM.

As shown in FIG. 26, a user data area 2150 comprises a sector header area 2101, a main data area 2102, and an error detection code 2103. In the sector header area 2101, a sector address 2104 for indicating a sector position, and copyright control information 2105 for recording the copyright control information (including a scramble flag, copy control information or the like) with respect to the data recorded in the main data area 2102 are recorded. The sector head area 2101 includes a decipher key area 2106 for decrypting encryption information when such information has been embedded or encrypted in the data of the main data area 2102. Also, the main data area(s) 2102 is/are divided into an area in which non-encrypted content 2107 is recorded and an area in which the encrypted content 2108 is recorded, and the non-encrypted content 2107 includes control information for subsequent data such as synchronizing patterns in the MPEG or all types of control information. In addition, the encrypted content 2108 includes content data that are required for copyright protection primarily such as AV data or the like which have been encrypted.

The decipher key for reproducing the following main data area 2102 is divided into a plurality of divided decipher keys with a predetermined size (hereinafter referred to as divided decipher keys), which are then registered in the decipher key area 2106. For example, in the case where the decipher key is 8 bytes for one decipher key area of 4 bytes, the decipher key of 8 bytes is divided into two divided decipher keys each of 4 bytes so that the two divided decipher keys are recorded in decipher key areas 2106 and 2109 of two logically continuous sectors after dividing the decipher key of 8 bytes into divided decipher keys each of 4 bytes. When reproducing data of such a user data area, a plurality of divided decipher keys are acquired from the decipher key areas 2106 and 2109 of the logically continuous plurality of sectors (each sector which is not available due to defects is skipped), and the acquired divided decipher keys of the required number are linked or connected by a data linking device 2111 so as to obtain the encrypted decipher key that is required for the reproduction (8 bytes). A decrypting process is carried out for the data that are recorded in the main data area 2102 of the sector where the encrypted decipher keys (8 bytes) could be obtained by a decrypting device 2114 in accordance with the contents of each unit of copyright control information 2105.

In addition, to further enhance the intensity of the encryption, it is possible to encrypt the decipher key, or by adding the decipher key conversion data which is the information in the data to the key so as to not have a constant result of the encryption, it becomes possible to provide different encryption results even for the same cipher key. More concretely, as shown in FIG. 26, the encrypted decipher key that is outputted from the data linking device 2111 is inputted to the key decrypting device 2112, and then, by using a predetermined disk key, the key decrypting device 2112 decrypts the inputted encrypted decipher key into the padding data (I byte) which are dummy data and the decipher key (7 bytes), which are then outputted to the key converter 2113. In this case, the disk key is acquired by decrypting, for example, an encrypted disk key that is recorded in the optical disk by using a secret key which is a predetermined master key by the disk key decrypting device (not shown). Also, the key converter 2113 converts data of the decipher key conversion data 2110 that are read out from the main data area 2102 through a predetermined conversion operation such as an operation utilizing multiplication, division or predetermined weighting coefficients by using the decipher key outputted from the above-mentioned key decrypting device 2112, and then, generates and outputs a content decipher key (7 bytes) to the decrypting device 2114. Then, the decrypting device 2114 generates and outputs the data of the decrypted content by decrypting the data of the content that are read out from the main data area 2102 using the content decipher key (7 bytes) outputted from the above-mentioned key converter 2113. As the decipher key conversion data 2110, it is preferable to utilize the data such as data whereby the irregular usage of the data such as falsifying the copy generation management information or the analog macro-vision control flag can be immediately detected.

Figure 27:
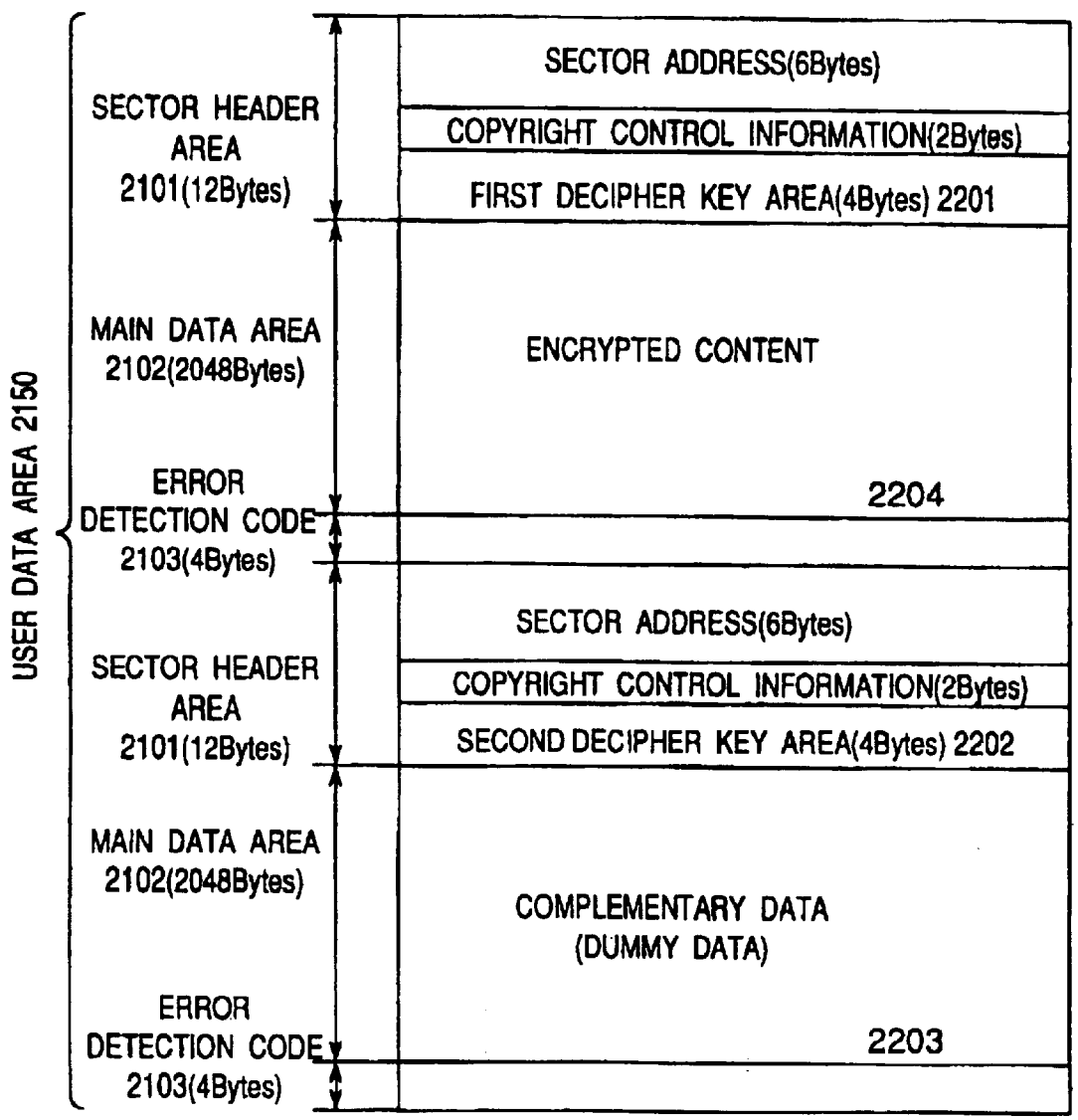
FIG. 27 is a block diagram showing an arrangement of copyright control information and decipher key into a user data area, and an arrangement of an encrypted content into a main data area 2102 in the optical disk according to the sixth preferred embodiment.

FIG. 27 is a block diagram showing an arrangement of the copyright control information and the decipher key in the user data area and an allocation of the encrypted content in the main data area of an optical disk according to the sixth preferred embodiment. In an example of the user data area 2150 illustrated in FIG. 27, the decipher key area is arranged so as to be divided into the first decipher key area 2201 having a division decipher key of 4 bytes and the second decipher key area 2202 having a division decipher key of 4 bytes. Therefore, in spite of the size of the encrypted content that are recorded in those two sectors, a plurality of sectors (2 sectors in FIG. 27) are utilized. In this case, dummy data is recorded in the unused area as complementary data. In an example of FIG. 27, complementary data 2203 for one sector is recorded in the case that the encrypted content 2204 exits only for one sector.

Figure 28:
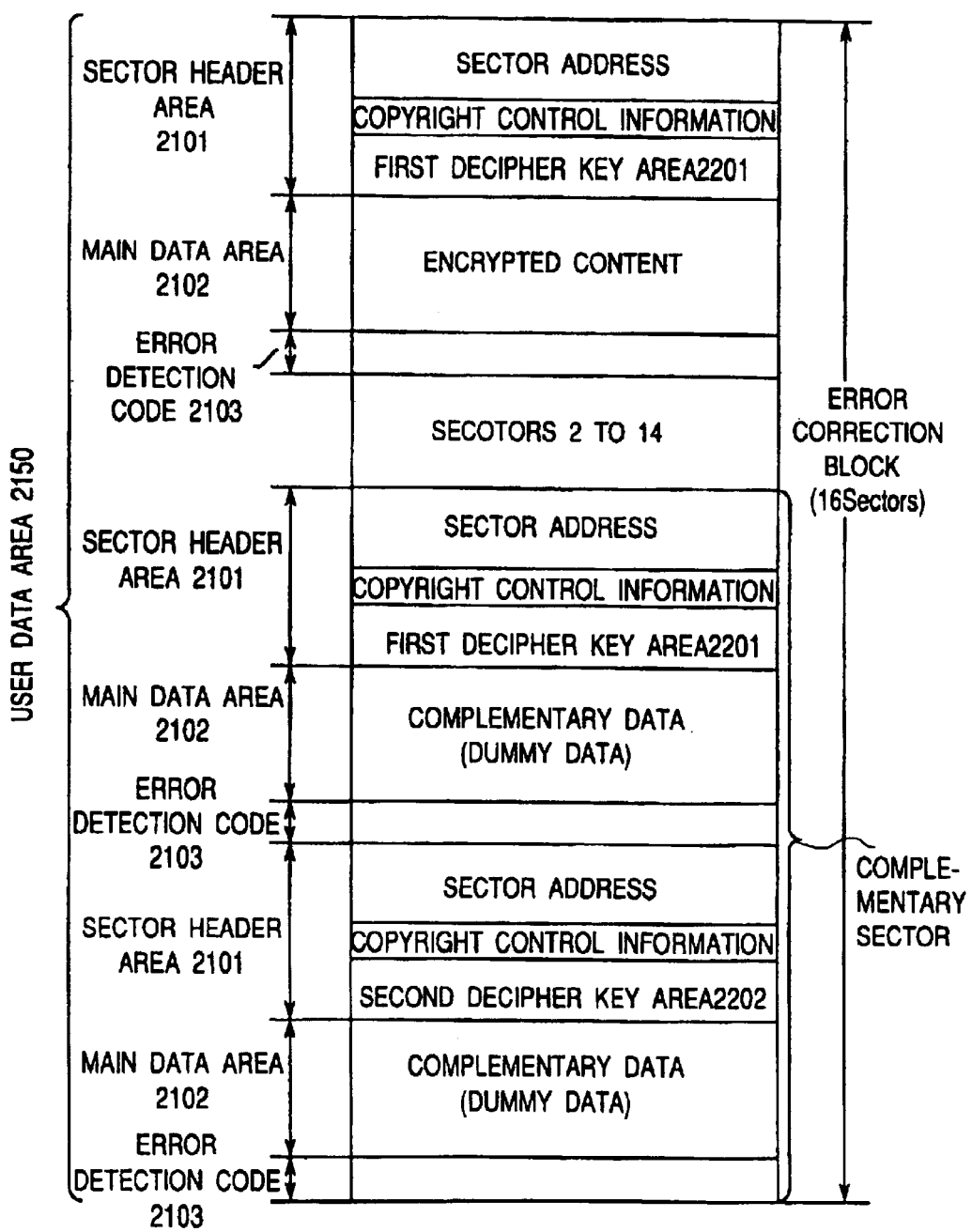
FIG. 28 is a block diagram showing an arrangement of a case where a unit for error correction is applied for a plurality of sectors in the optical disk according to the sixth preferred embodiment.

FIG. 28 is a block diagram showing an arrangement of the case where the unit of error correction is located over a plurality of sectors in an optical disk according to the sixth preferred embodiment. For example, in the case where the optical disk is a DVD, the ability of error correction is enhanced by using a unit block (hereinafter referred to an ECC block) of error correction code of 16 sectors. Therefore, when data recording or reproducing is carried out, it is necessary to perform the recording process by using the ECC block unit. In the case where the decipher key is divided into an arbitrary number of divided decipher keys which are then recorded, the case may exist where one decipher key is recorded in a plurality of error correction blocks. When reproducing the same, it is necessary to reproduce all of the plurality of divided decipher keys. Therefore, it is also necessary to reproduce not only data in the sector for recording the data of the encrypted content but also data in the ECC block immediately before a decipher key is recorded. An example of FIG. 28 is characterized in that the number of divisions when the decipher key is divided is set as a measure or factor of the number of sectors of the ECC blocks. As a result, a plurality of divided decipher keys cannot be recorded so as to located over a plurality of ECC blocks. In addition, as a decipher key used in one ECC block, only one type of decipher key is used, and in the case where the recorded AV data are not sufficient for an ECC block, the data of the sectors which are unnecessary upon reproduction can be prevented from being read out from the optical disk by arranging complementary data and complementary sectors.

Seventh Preferred Embodiment

FIG. 29 is a block diagram showing a configuration of a lead-in (rewritable) area 2401 and a user data area 2402 within an optical disk and a configuration of an optical disk reproducing apparatus for decrypting an encrypted content from data of the lead-in area 2401 and the user data area 2402 according to the seventh preferred embodiment of the present invention.

Referring to FIG. 29, in the same way as in that of the sixth preferred embodiment of FIG. 26, each of the lead-in area 2401 and the user data area 2402 is constructed from sectors having a sector header area 2101, the main data area 2102 and an error detection code 2103. In the sector header area 2101, there are recorded a sector address 2104 for indicating the position of the sector and copyright control information 2105 for recording copyright control information (including a scramble flag, copy control information or the like) with respect to the data that are recorded in the main data area 2102. Further, the sector header area 2101 includes a key index area 2403 for recording a key index for indicating the recording position of the decipher key (that is, the recording position of storing position in a decipher key table 2404 within the main data area 2102) for referring to a decipher key for decrypting in the case where the data of the main data area 2102 are encrypted. The decipher key for decrypting the encrypted content recorded in the user data area 2402 is recorded in a form of a decipher key table 2404 in the lead-in area 2401 which is rewritable in a form of a table. The decipher key that is recorded in the lead-in area 2401 is referred to by the key index that is recorded in the key index area 2403. In the same way as that of the sixth preferred embodiment illustrated in FIG. 26, the decipher key referred to as described above is decrypted into the padding data and the decipher key (or title key) by the key decrypting device 2112 using a predetermined disk key, and thereafter, the above-mentioned decrypted decipher key (or title key) is converted into a content decipher key by the key converter 2113 using the decipher key conversion data, and then, the converted content decipher key is outputted to the decrypting device 2114. The decrypting device 2114 decrypts the data of the encrypted content by using the content decipher key, and then, generates and outputs data of the decrypted content.

In an optical disk and an optical disk reproducing apparatus according to the seventh preferred embodiment constituted as described above, by recording a key index for reference in the key index area 2403 within the sector header area 2101, it becomes possible to allocate the decipher key size of the decipher key table 2404 independently from the size of the key index area 2403. Also, after allocating the size of the decipher key table 2404, by utilizing a plurality of decipher keys continuously from the decipher key table 2404 indicated by the key index within the key index area 2403, a decipher key of an arbitrary or free size can be used.

FIG. 30A is a block diagram showing a data configuration of the case where an initial value of a decipher key represents an unrecorded status in the main data area 2102 of the lead-in area 2401 within an optical disk according to the seventh preferred embodiment. Referring to FIG. 30A, as the initial value of the decipher key recorded upon formatting of the optical disk or the like, the data in the unrecorded status 2501 is recorded with an already known fixed value (for example, data such as all zeros) which are not used as a key to thereby indicate the unrecorded status of the decipher key.

FIG. 30B is a block diagram showing a data configuration of the case where a recorded status is represented with a decipher key status table in the main data area 2102 of the lead-in area 2401 within an optical disk according to the seventh preferred embodiment. Referring to FIG. 30B, in the same way as that of the decipher key illustrated in FIG. 30A, the decipher key status table 2502 in a form of table which can be referenced by an index is arranged in the lead-in area 2401, and the recorded status of the decipher key is described as follows as record status data 2503:

(1) 0×00: unused;

(2) 0×01: area reservation;

(3) 0×03: key recorded; and (4) otherwise: reserved.

In this case, Ox indicates a hexadecimal representation of the following symbols or numbers.

Figure 31:
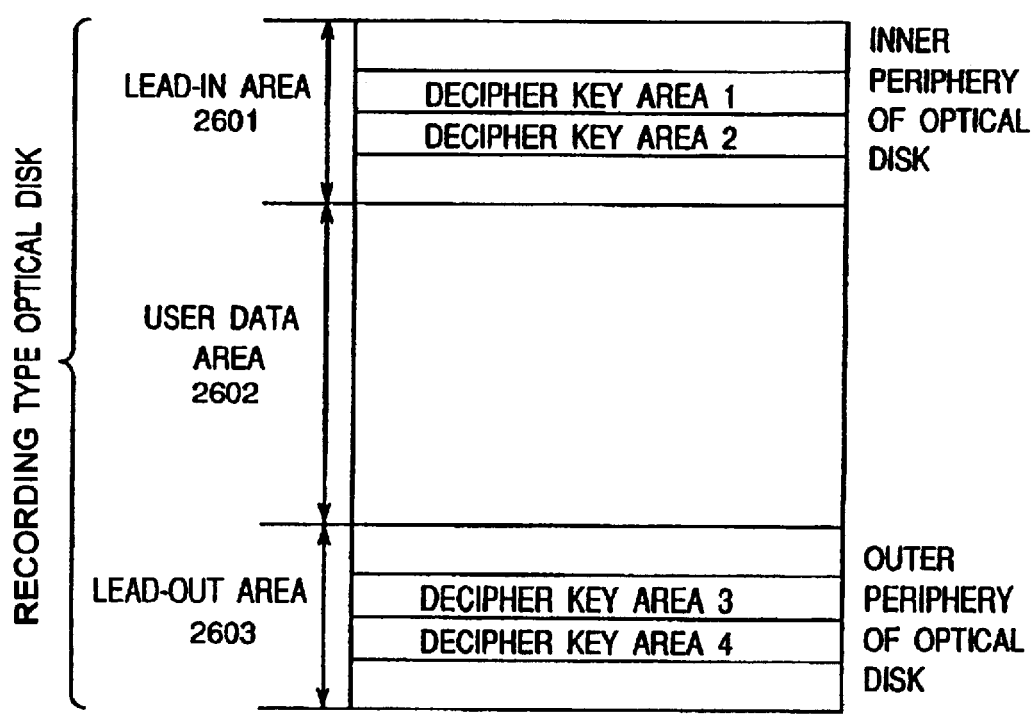
FIG. 31 is a block diagram showing an arrangement of a decipher key in the optical disk according to the seventh preferred embodiment.

FIG. 31 is a block diagram showing an allocation of decipher keys in an optical disk according to the seventh preferred embodiment. In an example of FIG. 31, an allocation of the decipher key area of the disk is devised so as to enhance the reliability of the decipher keys. Usually, defect management is carried out in the user data area 2602, and therefore, in the case where a write failure occurs, a replacement process for an area to be replaced or the like is carried out. In the lead-in area 2601, however, the defect management as described above is not carried out. Therefore, by occurrence of a write-in failure, a read-out failure or the like, the decipher key, which is required for producing the AV data, may be converted into an unusable status, and moreover, there may be the case where the optical disk itself may be converted into an unusable status. Accordingly, a total plurality of decipher keys are desired to be recorded over a plurality of different ECC blocks. In the case where a plurality of decipher keys are recorded in areas adjacent to each other, all of the entire plurality of decipher keys which have been recorded may not be read out due to scratches or dust. Therefore, as shown in FIG. 31, it is preferable to record in separate positions in a layout, such as the inner peripheral side and the outer peripheral side of the optical disk, respectively, for example, in the lead-in area 2601 and the lead-out area 2603.

In the seventh preferred embodiment of FIG. 29, the decipher key areas are allocated in the lead-in areas 2401 and 2601. This is because to enhance the safety when access is taking place from a drive unit of a personal computer or the like, with taking into consideration that the user data area 2602 is an accessible area by a conventional read command or write command. Accordingly, the same advantageous effects can be obtained by allocating these in the user data area 2602.

Eighth Preferred Embodiment

Figure 32:
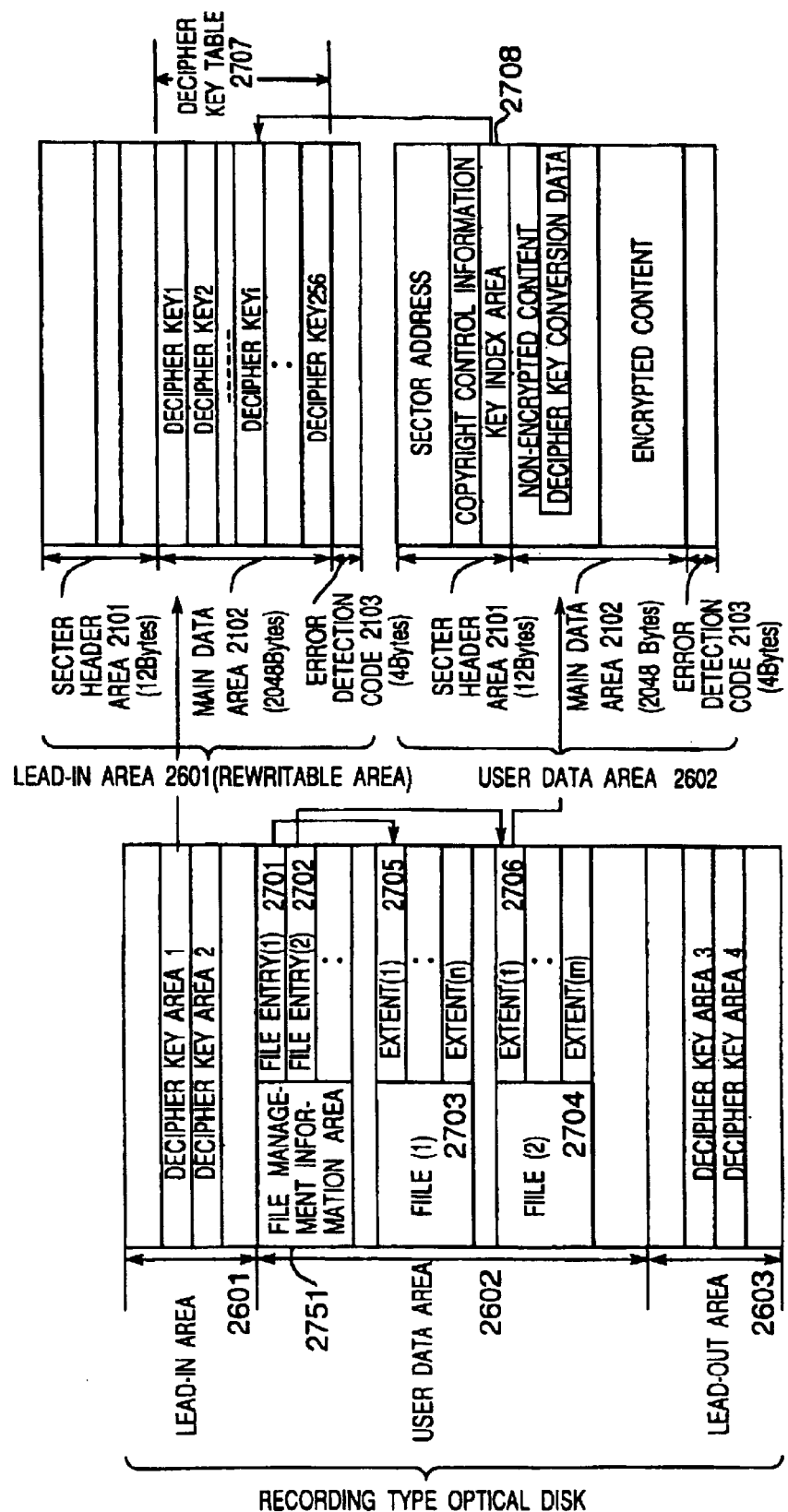
FIG. 32 is a block diagram showing a data configuration for managing data of an optical disk by a file management system of an eighth preferred embodiment according to the present invention.

FIG. 32 is a block diagram showing a data configuration when data of an optical disk is managed by a file management system of an eighth preferred embodiment according to the present invention. In an example of FIG. 32, based on a structure of the file system, a sector address for storing a desired file is managed.

In the structure of a file system which is prescribed or regulated in the ISO 13346 by the International Standardization Organization, a recording position of a file is managed by using the information called a file entry in order to utilize a rewritable-type optical disk. As shown in FIG. 32, for example, data of a recording position of a file (1) 2703 is stored as a file entry (1) 2701 within a file management information area 2751, and data of a recording position of a file (2) 2704 is stored as a file entry (2) 2702. Each file is constituted from extents 2705 and 2706 for managing a plurality of sector areas which are located so as to continue on the optical disk. The encrypted content as shown in the seventh preferred embodiment is recorded in the main data area 2102 indicated by the file entry on the optical disk, and the decipher key is recorded in the decipher key table 2707 within the lead-in area 2601. In the sector header area 2101 within the user data area 2602 where the encrypted content is recorded, a pointer for indicating a recording position for referring to a decipher key that is required for decrypting is recorded in the key index area 2708. Although, in the eighth preferred embodiment, the decipher key is managed and recorded using the file unit, the extent unit, the present invention is not limited thereto. The decipher key may be managed and recorded by using at least one of either of the file unit or the extent unit.

Figure 33:
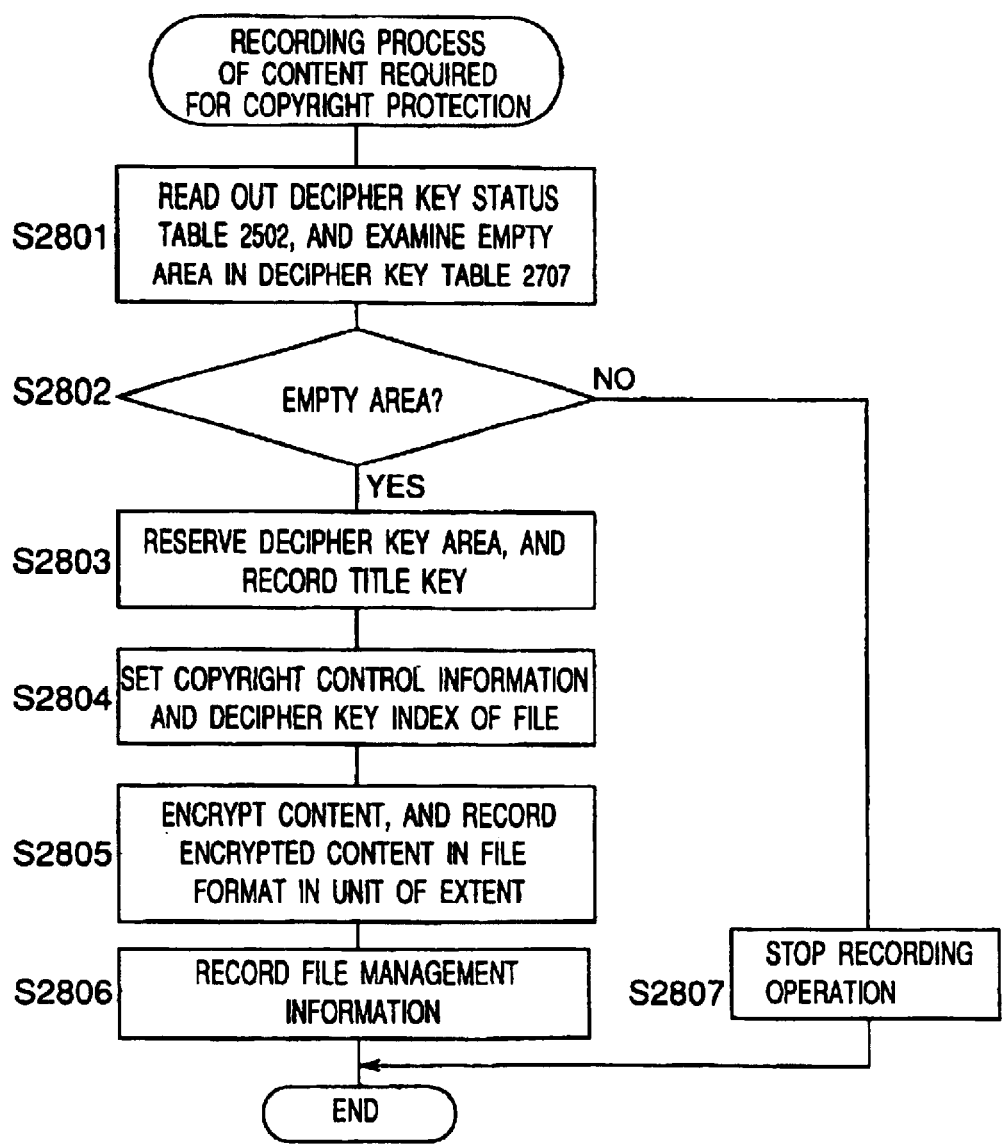
FIG. 33 is a flowchart showing a recording process of recording content that is required for copyright protection which is performed by the file management system according to the eighth preferred embodiment.

As described above in the optical disk, managed by the file system, the recording operation of the content required for copyright protection will be described with reference to FIG. 33. FIG. 33 shows a recording process of a content required for copyright protection carried out by a file management system according to the eighth preferred embodiment.

When recording the encrypted content, first of all, in step S2801, the decipher key status table 2502 illustrated in FIG. 30B is read out so as to check empty areas of the decipher key table 2707. Next, in step S2802, it is determined whether or not there is any empty areas of the decipher key table 2702, and in the case of NO, the recording process of the content is completed by stopping the recording operation in step S2807 because the decipher key for the encrypted content cannot be recorded. On the other hand, in the case of YES in step S2802, the acquired decipher key (or the title key) is recorded, and in the case where the decipher key cannot be acquired, the decipher key area is reserved. Next, in step S2804, the copyright control information of the recorded content (including information about whether or not encryption has been performed, information for indicating the type or class of encryption or the like) and the key index to be recorded in the key index area 2708 are set, and thereafter, the content is encrypted in step S2805 and then the encrypted content is recorded on the optical disk in a file form using the extent unit. In this case, the same copyright control information and key index may be used by utilizing the file unit or they may be switched by utilizing the extent unit. That is to say, in steps S2804 and S2805, the unit to be processed is at least one of either the file unit or the extent unit. Finally, in step S2806, based on the information with respect to the recorded content, after the file management information for managing the above-mentioned recorded data is updated, the recording process of the content is completed.

Figure 34:
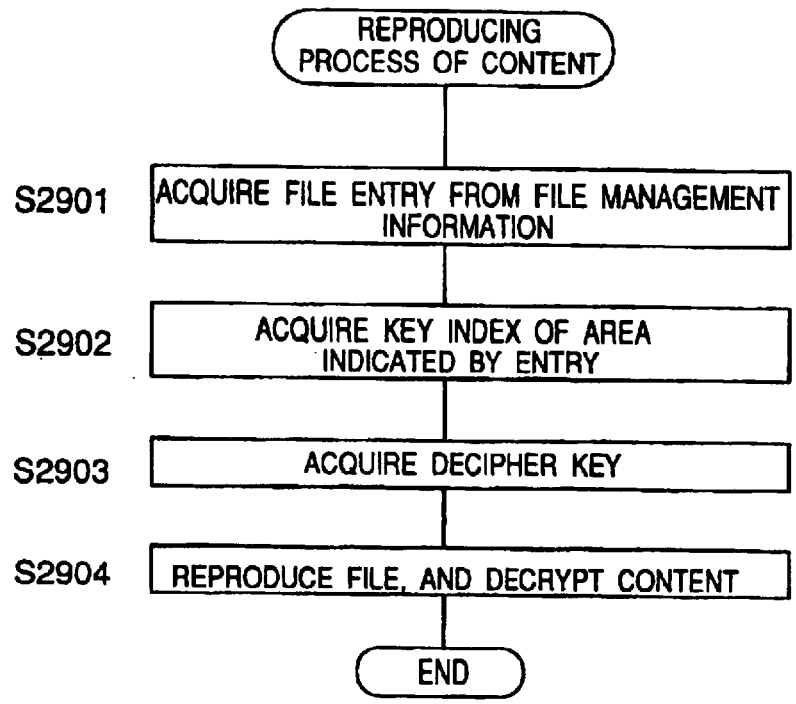
FIG. 34 is a flowchart showing a reproducing process of reproducing content which is performed by the file management system according to the eighth preferred embodiment.

FIG. 34 is a flowchart showing a reproducing process of content that is carried out by a file management system according to the eighth preferred embodiment. FIG. 34 shows a process for reproducing the content recorded in a form of file from the optical disk by the method shown in FIG. 33.

When carrying out a reproducing operation for the file, the key index is acquired for the areas shown by the file entry within the file management information area 2751 so as to find out or know the area in the decipher key table that is utilized by the reproduced file. More concretely, in step S2901, after the file entry of the file that is reproduced from the file management information 2751 is acquired by being read out and reproduced, the value of the key index area is read out in step S2902, and is then reproduced from the sector header area 2102 of the area shown by the file entry to be acquired. In the case where different ways of encrypting are conducted by utilizing the extent unit, the key index area in the sector header for each extent is read out. Then, in step S2903, the decipher key is read out, and is then reproduced so as to acquire the decipher key from the decipher key area of the decipher key table 2707 that is indicated by the acquired key index. In addition, in step S2904, the data of the content within the file is read out and reproduced from an area shown by the file entry, and then, data of the reproduced content is decrypted. In this case, when reproduction and the decrypting of the file of the content are completed, the reproducing process of the content is completed.

Figure 35:
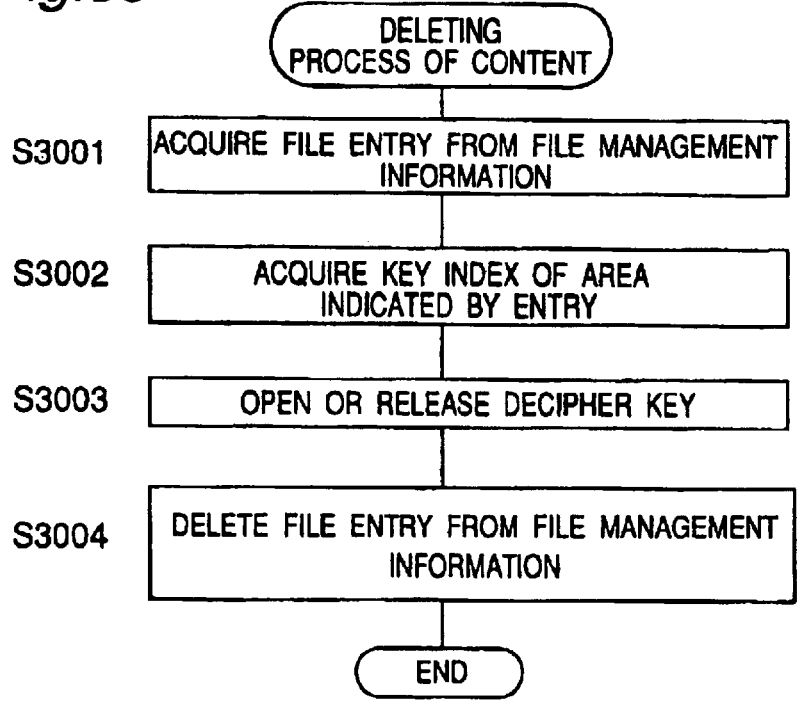
FIG. 35 is a flowchart showing a deleting process of deleting content which is performed by the file management system according to the eighth preferred embodiment.

FIG. 35 is a flowchart showing a deleting-process of content which is carried out by the file management system according to the eighth preferred embodiment, and FIG. 35 shows an operation for the deletion of data of content in a form of file which has been recorded by the method as shown in FIG. 33.

When the deleting operation of the file is carried out, the key index for the area shown by the file entry is acquired so as to find out or know the areas of the decipher key table 2707 that are used by the deleted file. More concretely, in step S3001, after acquiring the file entry of the deleted file from the file management information within the file management information area 2751, the value of the key index area is acquired from the sector header of an area that is indicated by the file entry in step S3002. In this case, when different ways of encrypting are conducted by utilizing the extent unit, data in the key index area in the sector header for each extent is read out. Then, in step S3003, after the decipher key is open or released (here, releasing or opening the decipher key means to delete the decipher key from the table) from the decipher key area of the decipher key table 2707 that is indicated by the acquired key index, and, in step S3004, the file entry for indicating the write-in position of the deleted file is deleted from the file management information. Then, the deleting process of the content is completed. Although only the file entry is deleted when the file is deleted in a conventional file system, the decipher key that is recorded in another area cannot be deleted since the decipher key and the record sector of the encrypted content are recorded in separate areas. In the above-mentioned preferred embodiments, prior to the deletion of the file entry, the management of the decipher key on the optical disk is carried out by deleting the decipher key for indicating the key index in the sector header area from the decipher key table 2707.

Ninth Preferred Embodiment

Figure 36:
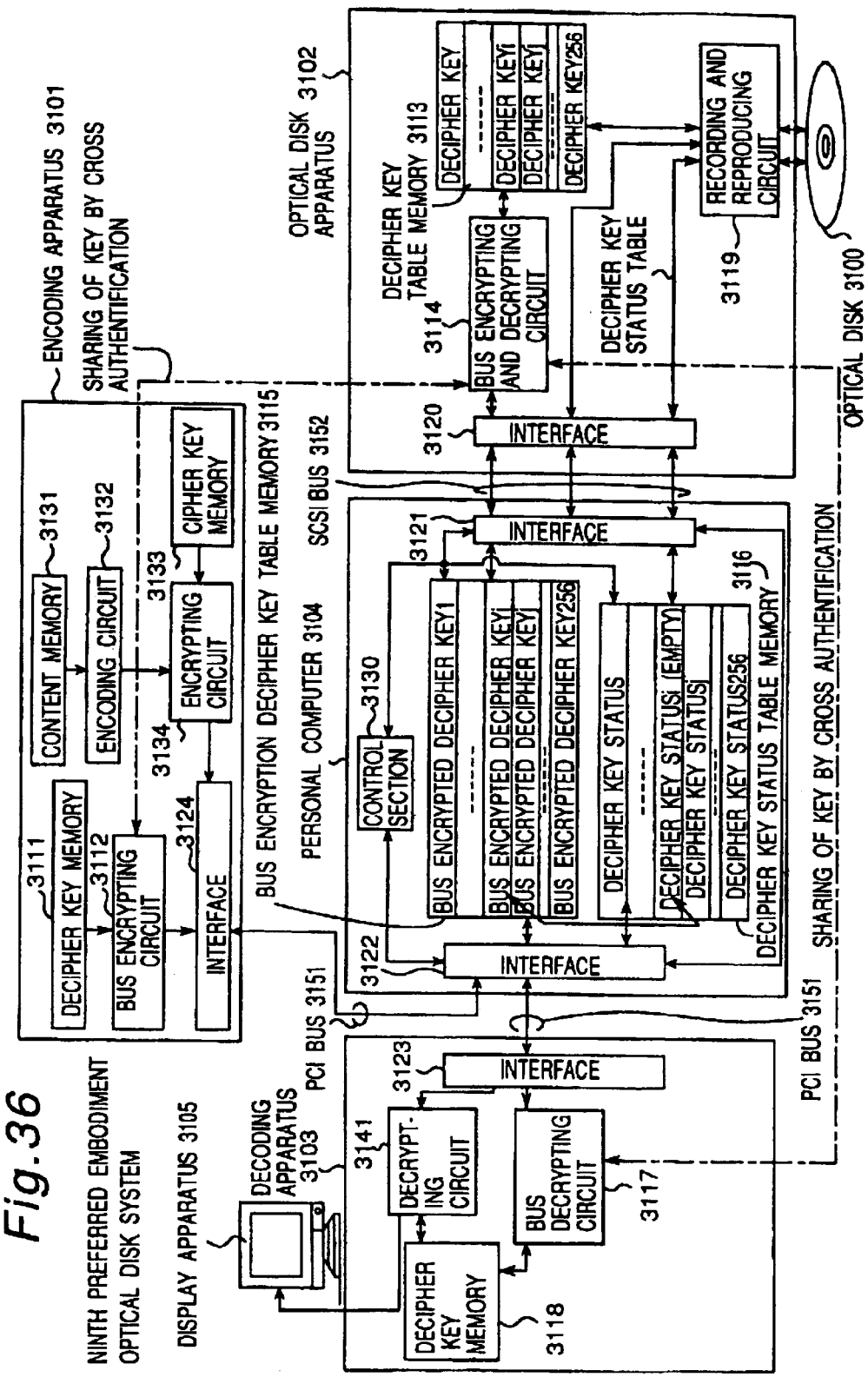
FIG. 36 is a block diagram showing a configuration of an optical disk system of a ninth preferred embodiment according to the present invention.

FIG. 36 is a block diagram showing a configuration of an optical disk system of a ninth preferred embodiment according to the present invention, and this optical disk system is a information processing system for recording and reproducing content that is required for copyright protection of the optical disk 3100. The optical disk system comprises an encoding apparatus 3101, an optical disk apparatus 3102, a decoding apparatus 3103, and a personal computer 3104.

The encoding apparatus 3101 comprises a content memory 3131 for storing data of content, an encoding circuit 3132 for encoding the above-mentioned data of the content in a form of MPEG format, a cipher key memory 3133 for storing the cipher key, an encrypting circuit 3134 for encrypting the data of the encoded content by utilizing the cipher key and generating and storing the decipher key in the decipher key memory 3111, a decipher key memory 3111 for storing the decipher key, a bus encryption circuit 3112 for bus-encrypting the decipher key, and an interface 3124 which is connected to the interface 3122 of the personal computer 3104 via a PCI bus 3151, where the interface 3124 transmits the data of the encrypted content and the decipher key. Also, the optical disk apparatus 3102 comprises a decipher key table memory 3113 for storing a plurality of decipher keys therein, a bus encrypting and decrypting circuit 3114, a recording and reproducing circuit 3119 for recording the data onto the optical disk 3100 and for reading out and reproducing the data from the optical disk 3100, and an interface 3120 which is connected to the interface 3121 of the personal computer 3104 via a SCSI bus 3152, where the interface 3120 carries out processes such as the transmission and reception of data or signals as well as signal conversion and protocol conversion. The SCSI bus 3152 may preferably be an ATAPI bus. In this case, bus encryption and bus decryption mean the cipher process and the decipher process, respectively, which is used for encrypting a cipher key or a decipher key and transmitting or receiving the same key on the PCI bus 3151 or the SCSI bus 3152.

In addition, the personal computer 3104 comprises a control section 3130 for controlling the operation of the personal computer 3104, a bus encryption decipher key table memory 3115 for storing a plurality of bus encryption decipher keys therein, a decipher key status table memory 3116 for storing data of a plurality of decipher key statuses (indicating a recording status or condition of a plurality of decipher key status, more concretely indicating non-usage or unused, area reservation, key recorded, reserved or the like) corresponding to the above-mentioned plurality of bus encryption decipher>keys, an interface 3121 which is connected to the interface 3120 or the optical disk apparatus 3102 via the SCSI bus 3152, where the interface 3121 carries out processes such as transmission and reception of the data and the signals as well as signal conversion and protocol conversion, and an interface 3122 which is connected to the interface 3123 of the decoding apparatus 3103 and the interface 3124 of the encoding apparatus 3101 via the PCI bus 3151, where the interface 3122 carries out processes such as transmission and reception of the data or the signals as well as signal conversion and protocol conversion. In addition, the decoding apparatus 3103 comprises an interface 3123 which is connected to the interface 3122 of the personal computer 3104, where the interface 3123 carries out processes such as the transmission and the reception of the data or the signals as well as signal conversion and protocol conversion, a bus decrypting circuit 3117 for bus-decrypting or bus-decoding the encryption decipher key received by the interface 3123, a decipher key memory 3118 for storing the decipher key therein, and a decryption circuit 3141 for decrypting or coding the data of the encrypted content that is received by the interface 3123 by using the decipher key of the decipher key memory 3118 as well as generating an image signal or a speech sound signal by carrying out the decoding process of the MPEG format, where the generated image signal and speech sound signal are outputted to a display apparatus 3105.

In the encoding apparatus 3101 of this optical disk system, the encoding circuit 3132 encodes the data of the content such as the AV data that are stored or inputted to the content memory 3131 in a form of the MPEG format, and the encrypting circuit 3134 encrypts the data of the above-mentioned encoded content by using the cipher key within the encrypting key memory 3133 which is generated so as to avoid an irregular usage of the content on a personal computer 3104. Then, the encoding circuit 3132 transmits the data of the encoded content to the optical disk apparatus 3102 via the interface 3124 and the personal computer 3104. In this case, the data of the encrypted content is transmitted to the recording and reproducing circuit 3119 via the PCI bus 3151, the interface 3122 and the interface 3121 of the personal computer 3104 and the interface 3120 of the optical disk apparatus 3102 from the interface 3124 of the encoding apparatus 3101. Then, the data of the encrypted content is recorded on the optical disk 3100 by the recording and reproducing circuit 3119 of the optical disk apparatus 3102. Also, the recording and reproducing circuit 3119 of the optical disk apparatus 3102 reproduces the data of the encrypted content that are recorded on the optical disk 3100, and then, transmits the data of the reproduced encrypted content to the decrypting circuit 3141 via the interface 3120, the interface 3121 and the interface 3122 of the personal computer 3104 and the interface 3123 of the decoding apparatus 3103. The decrypting circuit 3141 of the decoding apparatus 3103 decrypts the encryption for the data of the encrypted content, and carries out a decoding process of MPEG format, and then, outputs an image signal or a speech sound signal of the decoded content to a display apparatus 3105 and a speaker apparatus (not shown), respectively.

The encryption circuit 3134 of the encoding apparatus 3101 carries out the encryption for the data of the encoded content in a form of the MPEG format by using the cipher key within the cipher key memory 3133, and at the same time, generates and stores the decipher key that is required upon reproduction in the decipher key memory 3111. Although it is necessary to record the data of the encoded content and the decipher key on the optical disk 3100, in the case where the decipher key is handled as plain text on the personal computer 3104, there is such a possibility that the decoding of the data of the encrypted content may become easy by reading out the decipher key from the optical disk 3100. In order to avoid this, a mutual authorization is carried out between the encoding apparatus 3101 and the optical disk apparatus 3102 and a bus encryption is carried out by using a bus key which is mutually shared.

That is to say, more concretely, the decipher key that is stored in the decipher key memory 3111 is encrypted by a bus encryption circuit 3112 of the encoding apparatus 3101, and thereafter, the encrypted decipher key is stored in a bus encryption decipher key table memory 3115 of the personal computer 3104 via the interface 3124, the PCI bus 3151 and the interface 3122. On the other hand, in the bus encrypting and decrypting circuit 3114 of the optical disk apparatus 3102, the decoding of the encrypted decipher key which is reproduced by the recording and reproducing circuit 3119 from the optical disk 3100 is carried out, and thereafter, the decipher key which has been decrypted or decoded is stored in a decipher key table memory 3113. Also, the bus encrypting and decrypting circuit 3114 receives and bus-decrypts, for example, the updated and bus-encrypted decipher key via the interface 3121, the SCSI bus 3152 and the interface 3120 from the bus encryption decipher key table memory 3115, and stores the bus-decrypted decipher key in the decipher key table memory 3113. Thereafter, the bus-decrypted decipher key is recorded on the optical disk 3100 by the recording and reproducing circuit 3119.

After the decipher key status table is reproduced from the optical disk 3100 by the recording and reproducing circuit 3119, the decipher key status table is transferred to and stored in the decipher key status table memory 3116 via the interface 3120, the SCSI bus 3152 and the interface 3121. In addition, the decipher key status table that is updated by the personal computer 3104 is read out from the decipher key status table memory 3116, and then, is transferred to the recording and reproducing circuit 3119 via the interface 3121, the SCSI bus 3152 and the interface 3120. Thereafter, the recording and reproduced circuit 3119 records the received decipher key status table on the optical disk 3100. Accordingly, only the encrypted decipher key is handled on the personal computer 3104, which is located in the middle, by using the encryption decipher key table 3115 and the decipher key status table memory 3116, and this leads to establishment of more security.

Carrying out a bus-encryption of the decipher key in the same way between the optical disk apparatus 3102 and the decoding apparatus 3103 leads to the establishment of more security. That is to say, the bus decrypting circuit 3117 of the decoding apparatus 3103 bus-decrypts or bus-decodes the encrypted decipher key that is received from the personal computer 3104 via the interface 3123, and stores the bus-decrypted decipher key in the decipher key memory 3118. The decrypting circuit 3141 decrypts the data of the encrypted content by using the decipher key that is stored in the decipher key memory 3118.

As shown in the above-mentioned seventh preferred embodiment, in the case where the decipher key for decrypting the data of the encrypted content on the optical disk 3100 is recorded in the form of a table, the decipher key table that is reproduced by the optical disk apparatus 3102 is bus-encrypted by the bus encrypting and decrypting circuit 3114, and thereafter, the data of the bus encrypted decipher key table is transferred to the bus encrypted decipher key table memory 3115 of the personal computer 3104 via the interface 3120, and is stored therein. When the data of the content is recorded, the personal computer 3104 searches by retrieving an empty area of the decipher key table from the decipher key status table recorded in the optical disk 3100 in a form of plain text, and then, the bus encrypted decipher key that is transferred from the encoding apparatus 3101 is allocated to the searched empty area. In this case, when such an encryption is completed with the decipher key unit as a bus, encryption (for example, a block encryption with a unit of decipher key length), it is not necessary to decrypt and re-encrypt the decipher key upon allocation thereof to the decipher key block.

Since the decipher key table and the decipher key status table that are transferred and stored among the optical disk apparatus 3100, the optical disk apparatus 3102 and the personal computer 3104 are one piece of block data, respectively, they can be called a block data.

In the case when the content is reproduced, only the decipher key that is required for decrypting the content that is desired to be reproduced from the decipher key block that was reproduced from the optical disk apparatus 3102 is retrieved and taken out from the bus encrypted decipher key table memory 3115, and the retrieved decipher key is transferred to and stored in the decipher key memory 3118 via the bus decrypting circuit 3117 of the personal computer 3104 and the decoding apparatus 3103. Then, the decrypting circuit 3141 receives encrypted AV data that is reproduced from the optical disk 3100 by the recording and reproducing circuit 3119 of the optical disk apparatus 3102 via the personal computer 3104 and the interface 3123, and thereafter, the received encrypted AV data is decrypted by using the decipher key within the decipher key memory 3118, and the decrypted data is outputted as an image signal and a speech sound signal. In this case, in a manner similar to that of above-described case, when the content is recorded, it is not necessary to decrypt and re-encrypt the decipher key when the decipher key is taken out (retrieved) from the decipher key block when such an encryption is completed with a unit of decipher key as a bus encryption (for example, a block encryption with a unit of decipher key length). Furthermore, when the size of the decipher key is enlarged, the expansion of the decipher key area such as allocating a plurality of decipher keys can be carried out easily and safely on the personal computer 3104 without changing any configuration of the optical disk apparatus 3102.

Tenth Preferred Embodiment

Figure 37:
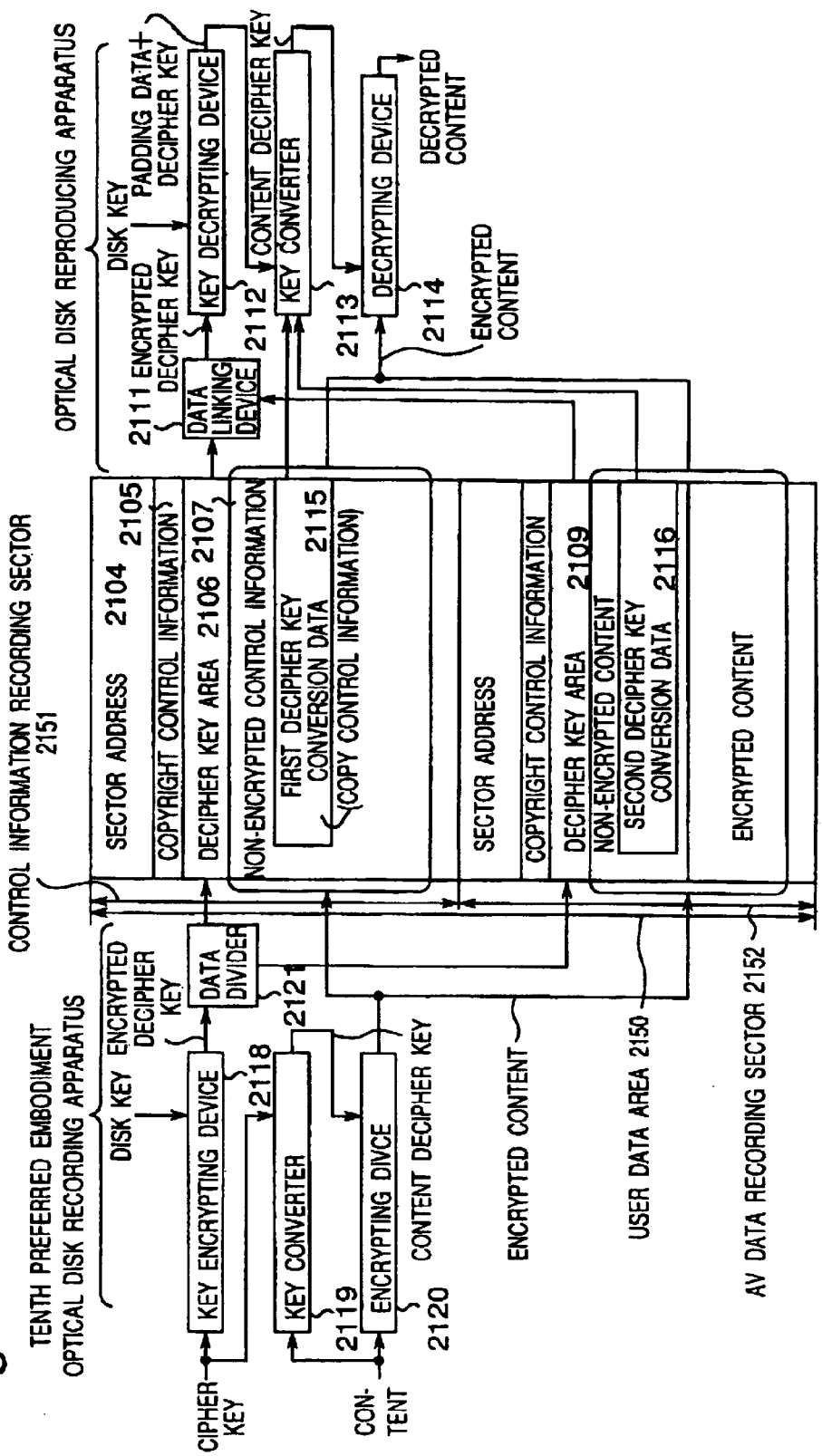
FIG. 37 is a block diagram showing a configuration of a user data area 2150 within an optical disk of a tenth preferred embodiment according to the present invention, a configuration of an optical disk recording apparatus for encrypting and recording a content into the user data area 2150, and a configuration of an optical disk reproducing apparatus for decrypting an encrypted content from data stored in the user data area 2150.

FIG. 37 is a block diagram showing a configuration of a user data area on an optical disk, a configuration of an optical disk recording apparatus for encrypting content and recording encrypted content in the user data area, and a configuration of an optical reproducing apparatus for decrypting an encrypted content from data in the user data area according to a tenth preferred embodiment of the present invention. This tenth preferred embodiment is characterized in that the configuration of the optical disk recording apparatus is added to that of the sixth preferred embodiment, and the configuration thereof will be described in detail.

In the optical disk recording apparatus, in order to enhance the intensity of the encryption so as not to have a constant encryption result, after obtaining or acquiring a content decipher key by performing a predetermined key conversion on the inputted cipher key such as multiplication, division or an operation (calculation), using a predetermined weighting coefficient by the key converter 2119 using the decipher key conversion data which is the information in the content, the data of the content is encrypted by using the content decipher key.

That is to say, when the content is recorded, the data of the content and the cipher key for encrypting the data of the content are inputted to the optical disk recording apparatus. In this case, the data of the content are inputted to the key converter 2119 and the encrypting device 2120, and the cipher key is inputted to the key encrypting device 2118 and the key converter 2119. The key converter 2119 performs an operation or calculation of a predetermined key conversion on the above-mentioned inputted cipher key by using the first and the second decipher key conversion data 2115 and 2116, which are respectively part of the information in the content, and then, generates and outputs a content decipher key to the encrypting device 2120. Then, the encrypting device 2120 encrypts the data of the above-mentioned inputted content by using the above-mentioned content decipher key, and then, records the encrypted content in an AV data recording sector 2152 within the user data area 2150 on the optical disk.

In this case, since the decipher key conversion data that are used in the optical disk reproducing apparatus are utilized, the second decipher key conversion data 2116, which is the information in the AV data and which is generally different in a unit of sector, copy generation management information included in the sector in which control information is recorded, and the first decipher key conversion data 2115 which is copy control information including an analog macro-vision control flag. By utilizing the former second decipher key conversion data, it becomes possible to recover the content decipher key for encrypting the data of the content for each sector by the key converter 2113 in accordance with the content of the second decipher key conversion data. Also, since the latter first decipher key conversion data is data for which irregular utilization can be easily detected upon falsification, such an advantageous effect can be obtained whereby it can readily be possible to prevent the data of the content from being decrypted when the first decipher key conversion data is falsified. More concretely, the cipher key is converted into a decipher key though a predetermined conversion operation by using the data in the reproduction control recording sector for recording reproduction control information that is used for reproduction control of the AV data as the first decipher key conversion data, and the converted decipher key is used as a content decipher key in the encrypting device 2120. In addition, by performing a predetermined conversion operation or calculation on the cipher key using the two pieces of decipher key conversion data including the first decipher key conversion data, which is data in the reproduction control recording sector, and the second decipher key conversion data, which is a part of non-encrypted content in the sector for recording the encrypted content therein, another content decipher key is calculated which may be used as a content decipher key in the encrypting device 2120.

On the other hand, the key encrypting device 2118 encrypts the above-mentioned inputted cipher key using a disk key that is inputted in the same way as that of the optical disk reproducing apparatus, and generates the encrypted decipher key. As compared with the size of this encrypted decipher key, each of the decipher key areas 2106 and 2109 in the sector header area is small. Therefore, the data divider 2121 divides the encrypted decipher key into a plurality of divided decipher keys, and then, records the respective divided decipher keys into different decipher key areas 2106 and 2109. In an example of FIG. 37, the encrypted decipher key is divided into two encrypted divided decipher keys, which are then recorded in the decipher key areas 2106 and 2109 of two continuous sectors. In this case, since the decipher key of a cipher key is encrypted by the key encrypting device 211.8, the security intensity of the encryption for the cipher key can be enhanced.

When the content is reproduced, the key converter 2113 performs an operation or calculation of a predetermined key conversion on the decipher key from the key decrypting device 2112 by using information of the above-mentioned first decipher key conversion data 2115 and the second decipher key conversion data 2116 so as to generate the content decipher key, which is then outputted to the decrypting device 2114. Also, the decrypting device 2114 decrypts the data of the encrypted content by using this content decipher key so as to obtain the decrypted content. In this case, the key converter 2113 may perform an operation or calculation of a predetermined key conversion on the decipher key from the key decrypting device 2112 by using only the information of the first decipher key conversion data 2115.

Eleventh Preferred Embodiment

Figure 38:
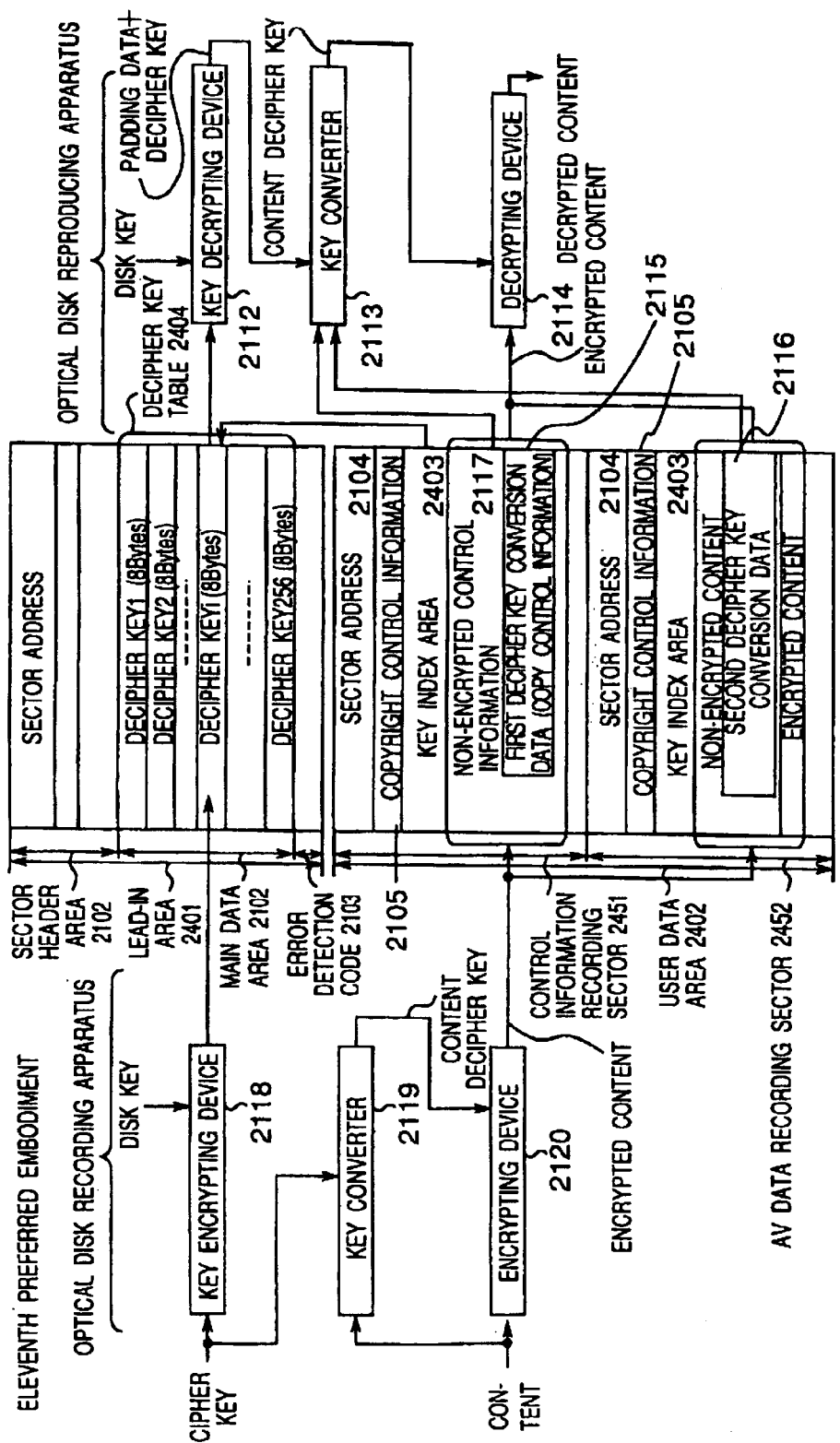
FIG. 38 is a block diagram showing a configuration of a user data area 2402 within an optical disk of an eleventh preferred embodiment according to the present invention, a configuration of an optical disk recording apparatus for encrypting and recording a content into the user data area 2402, and a configuration of an optical disk reproducing apparatus for decrypting an encrypted content from data of the user data area 2402.
Figure 39:
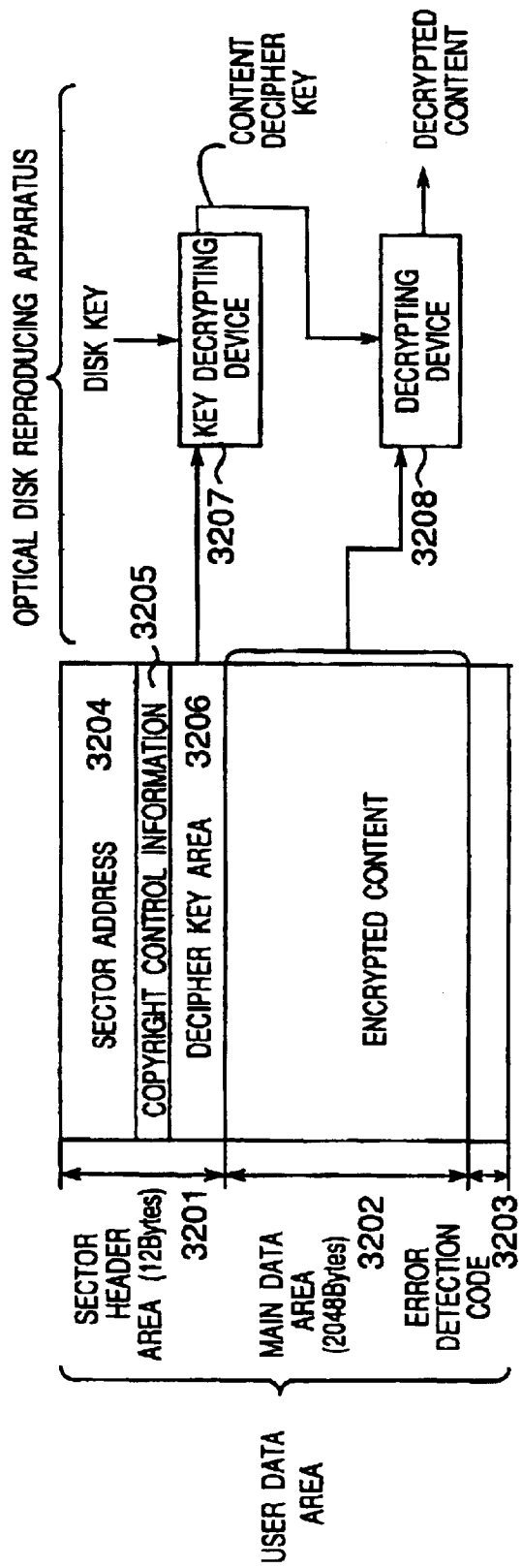
FIG. 39 is a block diagram showing a configuration of a user data area of a DVD-ROM, and a configuration of an optical disk reproducing apparatus for decrypting an encrypted content from data of the user data area according to the prior art.

FIG. 38 is a block diagram showing a configuration of a user data area on an optical disk, a configuration of an optical disk recording apparatus for encrypting content and recording encrypted content in the user data area, and a configuration of an optical disk reproducing apparatus for decrypting an encrypted content from the data of the user data area according to an eleventh preferred embodiment of the present invention. This eleventh preferred embodiment is characterized in that the configuration of the optical disk recording apparatus is added to optical disk recording apparatus of the seventh preferred embodiment, and the configuration thereof will be described in detail.

Referring to FIG. 38, the optical disk recording apparatus comprises a key encrypting device 2118 for encrypting a cipher key by using a predetermined disk key in the same way as that of the tenth preferred embodiment shown in FIG. 37, a key converter 2119 for operating or calculating a content decipher key through an operation of a predetermined key conversion on the cipher key by using the first and the second decipher key conversion data 2115 and 2116 in the content, and an encrypting device 2120 for encrypting the content using the abovementioned content decipher key. In this case, the decipher key that is outputted from the key encrypting device 2118 is recorded in the main data area 2102 within the lead-in area 2401. On the other hand, the optical disk reproducing apparatus comprises a key decrypting device 2112, a key converter 2113, and a decrypting device 2114 in the same way as the optical disk reproducing appartus of the seventh preferred embodiment shown in FIG. 29. In this case, the decipher key that is recorded in the main data area 2102 within the lead-in area 2401 is read out and is inputted to the key decrypting device 2112, which then decrypts the decipher key by using a predetermined disk key and which outputs the decrypted decipher key to the key converter 2113. Also, the key converter 2113 performs an operation or calculation of a predetermined key conversion on the decipher key from the key decrypting device 2112 by using the first and the second decipher key conversion data 2115 and 2116 to calculate the content decipher key, which is outputted to the decrypting device 2114.

Advantageous Effects of Sixth to Ninth Preferred Embodiments

As described above, an optical disk of recording type according to the present preferred embodiments divides and records the decipher key into decipher keys of the decipher key areas having a predetermined size arranged in the sector header area, or records the decipher key having a variable length in the decipher key area indicated by the key index area arranged in the sector header area, and then, an optical disk of recording type which can utilize a decipher key of an arbitrary or free length regardless of a decipher key area of a size prescribed in the sector header area can be provided. Therefore, in accordance with the copyright protection level for the recorded content, it becomes possible to utilize the encryption using an arbitrary key length.

Modified Preferred Embodiments

In the above-mentioned preferred embodiments, the above-mentioned disk identification information is preferably constituted by pre-pits which are non-rewritable, and the above-mentioned disk identification information has has a region identifier for representing a region in which the optical disk is used. Also, the above-mentioned disk identification information preferably has a data category identifier representing a type, class or kind of content which is recordable and reproducible on the optical disk. In addition, the above-mentioned disk identification information is, preferably, encrypted by using a secret key, and recorded in the disk identification information area upon manufacturing. Furthermore, the above-mentioned disk identification information preferably includes data for representing a type, class or kind of data which is recordable in the data recording and reproducing areas, or a type, class or kind of data which is reproducible from the data recording and reproducing area.

In the above-mentioned preferred embodiments, the above-mentioned optical disks preferably have a sector area for data of the content therein, and a descramble area management table for managing the corresponding relationship with the descramble key. The key management information area preferably includes a descramble key area for recording a descramble key encrypted using disk identification information as a key, a key information area having a descramble key status area for representing a recording status or state of the descramble key, a content information area for recording therein key information that is used upon the reproduction of the content that is recorded on the disk, and a key index area for recording therein a pointer for referring to a descramble key that is required for the reproduction of the content. In addition, in the sector recording the data of the content, there are preferably recorded the data of the above-mentioned content, and a pointer for indicating an area for recording the descramble key therein.

In the above-mentioned preferred embodiments, a reproducing circuit of the disk identification information of the optical disk recording and reproducing apparatus preferably comprises a circuit for decrypting disk identification information which has been encrypted by using a secret key. Also, in the optical disk recording and reproducing apparatus, the data that are encrypted with the disk identification information as a key are preferably data of content such as image data and music data. In addition, the disk identification information preferably represents a type, class or kind of data which is recordable in the data recording and reproducing area, and the reproducing circuit of the disk identification information determines whether or not the data is of recordable content by the type, class or kind of the above-mentioned data. Furthermore, the data which is decrypted by using the disk identification information as a key is preferably data of the content such as image data or music data. Also, the disk identification information preferably represents a type, class or kind of data which is reproducible from the data recording and reproducing area, and the reproducing circuit determines whether or not the data is of reproducible content based on the type, class or kind of the above-mentioned data.

In the above-mentioned preferred embodiments, the recording circuit of the content preferably records data of content such as encrypted image data and music data and the descramble key for decoding or decrypting encryption of the data of the above-mentioned content, in the same sector. Also, the reproducing circuit of the content preferably reproduces data of content such as encrypted image data and music data and the descramble key for decoding or decrypting encryption of the data of the above-mentioned content from the same sector.

In the above-mentioned preferred embodiments, a circuit or a method for allocating key areas preferably arranges a flag for reserved area in a descramble key status area for representing a recorded status of the descramble key, records information with respect to a key used upon reproduction of the data of the content, and records a key index for representing a recording area of the descramble key allocated for the data of the content. Also, a circuit or a method for arranging the descramble key preferably reproduces an index of a descramble key area used in the content from the content information area, arrange a descramble key into a descramble key area indicated in a key index corresponding to the recorded descramble key, and arrange a flag of recorded information in a descramble key status area indicated in the key index corresponding to the recorded descramble key.

In the above-mentioned preferred embodiments, the optical disk reproducing apparatus preferably reproduces disk identification information, searches whether or not content is reproducible, reproduces key management information, reproduces a sector in which data of content such as image data or music data have been recorded, and acquires a descramble key from the reproduced sector. In addition, the data of the reproduced content is preferably descrambled by the descramble key, and the descrambled data is outputted.

In the above-mentioned preferred embodiments, the method for recording data of content preferably records encrypted content so as to be able to be decoded and reproduced through an operation or calculation using at least the above-mentioned second disk information, when the content is recorded in the user data area of an optical disk having a first information area for recording first disk information therein, a second information area for recording therein second disk information for identifying individual disks and the user data area for recording information by irradiating a light beam onto the user data area.

In the above-mentioned preferred embodiments, the method for recording data of content is preferably to encrypt and record information so as to be decoded and reproduced by an operation or calculation using at least the second disk information and the key information, when recording the content in the above-mentioned user data area of the optical disk having a first information area for recording first disk information therein, a second information area for recording therein second disk information for identifying individual disks, a user data area for recording information by irradiating a light beam onto the user data area, and a key information recording area for recording key information for decoding or decrypting content that are encrypted and recorded within the user data area.

In the above-mentioned preferred embodiments, dummy data is recorded in a sector of an optical disk having a decipher key area for recording a plurality of divided decipher keys in a plurality of continuous sectors, preferably in the main data area in which a data size including the AV data is less than (main data size)×(number of divided decipher keys). Also, in the ECC block, the sector having a decipher key area for recording divided decipher keys that are divided into a plurality of continuous sectors is recorded (ECC block unit)/(number of divided decipher keys) times, and the dummy data is recorded in the main data area in which the data size including the AV data is less than (main data size)×(ECC block unit).

In the above-mentioned preferred embodiments, a decipher key for decrypting encryption which has been performed on data including the AV data is preferably divided into a plurality of divided decipher keys with a predetermined size, and the plurality of divided decipher keys are recorded in a plurality of decipher key areas in which the decipher key table continues. Also, the above-mentioned decipher key table is preferably recorded in the main data area within the rewritable lead-in area. In addition, information for representing the recording status or state of the decipher key table is preferably recorded in each decipher key area of the decipher key table as a fixed value. Furthermore, the decipher key table is recorded a plurality of times in the above-mentioned different ECC blocks that are arranged in the inner and the outer peripheries of the optical disk.

In the above-mentioned preferred embodiments, the encoding apparatus 3101 of a data encrypting apparatus, and the optical disk apparatus 3102 of an optical disk recording and reproducing apparatus, preferably share the bus key in a mutual authorization system. Also, the decoding apparatus 3103 of a data decoding apparatus, and an optical disk apparatus 3102 of an optical disk recording and reproducing apparatus preferably share the bus key in a cross authenticating system.

Although, in the above-mentioned preferred embodiment, an optical disk of recording type which can record data, and which is either write-once type or rewritable type including a RAM type or non-rewritable optical disk, is described, the present invention is not limited thereto. The present invention can be applied for a read-only type optical disk which can read out and reproduce the previously recorded data but which cannot newly record data. In the case of the read-only type optical disk, the data recording and reproducing area can be replaced with the data reproducing area which reads out and reproduces the data, and the data of the content or the data of other various control information is previously recorded upon manufacturing. In this case, the recording type optical disk includes CD-R, CD-RW, MO, MD, DVD-RAM and so forth. The read-only type optical disk includes music CD, CD-ROM, DVD-ROM and so forth.

Advantageous Effects of the Invention

As described above in detail, according to an optical disk of the present invention, disk identification information using which recording operation and reproducing operation are performed for each optical disk is recorded in a produce-only area which is non-rewritable, and the recording operation and the reproduction operation of the content onto or from the optical disk can be controlled by the user by utilizing the information that is recorded upon the manufacture of the optical disk.

Also, according to an optical disk of the present invention, data, which has been encrypted by using the read-only disk identification information which is impossible to be rewritten, as a key, is recorded in the user data area of the optical disk. Therefore, even in the case where the user data area is copied onto another optical disk of recording type by the user, the disk identification information cannot be copied so that correct decryption and reproduction of the data becomes impossible.

In addition, according to an optical disk of the present invention, encrypted data and a descramble key for decrypting encryption are recorded in sector areas which are different from each other, and it becomes possible to acquire data such as movies and music required for copyright protection and to acquire a descramble key for descrambling encryption independently. Moreover, by encrypting and recording the descramble key by using the disk identification information as a key, the disk identification information cannot be copied, which makes it impossible to correctly record and reproduce the data even if the user data area is copied onto another optical disk of recording type by the user. By acquiring and recording the descramble key which has been encrypted by using the disk identification information of the optical disk onto which the data are copied as a key, this makes it possible to correctly record and reproduce the data.

Moreover, an optical disk according to the present invention comprises a first information area for recording a first disk information therein, a second information area for recording a second disk information for identifying individual disks, and a user data area for recording information by irradiating a light beam onto the user data area. Accordingly, by adding information for identifying the above-mentioned optical disk to an optical disk according to the prior art, the management of optical disks can easily be implemented. In this case, the above-mentioned second information area is preferably recorded in the above-mentioned first information area, and data of the second information area can be reproduced by an optical pick up for reproducing the above-mentioned first information area. Also, the above-mentioned second information area is recorded by partially eliminating or removing a recording film within the above-mentioned first information area, so that a plurality of trimming areas having an elongated shape in the radius direction are formed, and therefore, easy falsification of the above-mentioned second disk information can be prevented.

In addition, according to an optical disk of the present invention, a decipher key is divided into a plurality of divided decipher keys which are then allocated in decipher key areas each having a predetermined size arranged in the sector header area, or a decipher key is recorded in the decipher key areas indicated by an key index area arranged in the sector header area. Accordingly, an optical disk of recording type can be provided which can utilize the decipher key having an arbitrary or free length, independently of the decipher key area having a prescribed size in the sector header area. Therefore, it becomes possible to use an encryption using an arbitrary key length in accordance with the level of copyright protection level for recorded content.

Although the present invention has been fully described in connection with the preferred embodiments thereof with reference to the accompanying drawings, it is to be noted that various changes and modifications will be apparent to those skilled in the art. Such changes and modifications are to be understood as being included within the scope of the present invention as defined by the appended claims unless they depart therefrom.

What is claimed is:

1. An optical disk of recording type on which data is recordable,
   wherein said optical disk has a sector structure comprising a plurality of sectors,
   wherein each of the plurality of sectors includes a sector header area and a main data area for recording encrypted data therein,
   wherein the sector header area includes a decipher key information area for recording therein at least one decipher key which is required for decrypting the encrypted data,
   wherein a size of the decipher key information area is smaller than a size of each decipher key,
   wherein the respective decipher keys which are required for decrypting the encrypted data are recorded in a decipher key table having a plurality of decipher keys,
   wherein indexes for indicating recorded positions of the decipher keys which are required for decrypting the encrypted data within the decipher key table are recorded in the decipher key information areas of the plurality of sectors, respectively, and
   wherein decipher key status areas for recording decipher key statuses of the respective decipher key areas of said decipher key table are recorded as information for representing a recorded status of the decipher key table.

2. The optical disk as claimed in claim 1, wherein each decipher key is divided into a plurality of divided decipher keys having a predetermined size, and
   wherein the plurality of divided decipher keys are recorded in respective decipher key information areas of a plurality of continuous sectors.

3. The optical disk as claimed in claim 2, wherein the number of the divided decipher keys corresponds to a number of the sectors which are included in error correction code blocks, and which are a plurality of sectors required for error correction.

4. The optical disk as claimed in claim 1, wherein said decipher key table is recorded over a plurality of different error correction code blocks.

5. The optical disk as claimed in claim 1, wherein the respective decipher keys are managed and recorded in at least one unit of a file unit managed in a file management area, and an extent unit comprising a plurality of continuous sectors on said optical disk.

6. An optical disk of recording type on which data is recordable,
   wherein said optical disk includes a main data area for recording data therein,
   wherein said main data area includes a non-encrypted area for recording data in a non-encrypted status, and an encrypted area for recording data in an encrypted status,
   wherein said non-encrypted area includes decipher key conversion data used for converting a decipher key into a converted decipher key, and
   wherein data in said encrypted area is encrypted by using the converted decipher key.

7. The optical disk as claimed in claim 6,
   wherein said main data area includes a control information recording sector for recording control information used for controlling data reproduction in a non-encrypted status, and a data recording sector for recording data in an encrypted status,
   wherein said control information recording sector includes decipher key conversion data used for converting the decipher key into the converted decipher key, and
   wherein data in the data recording sector is encrypted by using the converted decipher key.

8. The optical disk as claimed in claim 7,
   wherein said data recording sector includes a non-encrypted area for recording data in a non-encrypted status, and an encrypted area for recording data in an encrypted status, wherein said non-encrypted area of said data recording sector includes additional decipher key conversion data used for converting another decipher key into another converted decipher key, and wherein AV data in said encrypted area of said data recording sector is encrypted by using the another converted decipher key by using a second additional decipher key which is different from the additional decipher key.

9. The optical disk as claimed in claim 6, wherein the decipher key conversion data includes at least copying control information of data.

10. An optical disk recording method for recording data on an optical disk of recording type on which data is recordable, said method comprising:

reading out a decipher key status which is recorded on the optical disk, and judging whether or not there is an empty area for a decipher key based on the read-out decipher key status;

reserving a decipher key area and recording the decipher key in the reserved decipher key area when said judging of whether or not there is the empty area for the decipher key judges that there is the empty area for the decipher key;

setting copyright control information and a decipher key index in at least one unit of a file unit and an extent unit;

encrypting data by using the decipher key, and recording the encrypted data on the optical disk in at least one unit of a file unit and an extent unit; and recording optical disk file management information on the optical disk for managing data which is recorded on the optical disk.

11. An information processing system comprising:

a data encrypting apparatus for encrypting data by using a cipher key;

an optical disk recording and reproducing apparatus for recording a decipher key which is required for decrypting data on an optical disk of recording type, and for reproducing the recorded decipher key; and a control apparatus connected to said optical disk recording and reproducing apparatus and the data encrypting apparatus;

wherein said optical disk recording and reproducing apparatus comprises first recording and reproducing means for recording a decipher key table on the optical disk, and for reproducing the decipher key table from the optical disk, encrypting and decrypting means for
encrypting the decipher key,
transmitting the encrypted decipher key,
receiving the encrypted decipher key from said control apparatus, and
decrypting the encrypted decipher key, and second recording and reproducing means for recording a decipher key status table for indicating a recorded status of the decipher key on the optical disk, and for reproducing the decipher key status table from the optical disk;

wherein said data encrypting apparatus comprises
encrypting means for encrypting the decipher key, and for transmitting the encrypted decipher key to said control apparatus; and wherein said control apparatus comprises
receiving means for receiving the encrypted decipher key from said encrypting means of said data encrypting apparatus, and allocating means for searching for an empty area for the decipher key based on the reproduced decipher key status table, for allocating the received and encrypted decipher key into the searched empty area, and for transmitting the allocated and encrypted decipher key to said optical disk recording and reproducing apparatus, and wherein said encrypting and decrypting means of said optical disk recording and reproducing apparatus receives the allocated and encrypted decipher key from said allocating means of said control apparatus, and decrypts the received encrypted decipher key.

12. An information processing system comprising:

an optical disk reproducing apparatus for reproducing a decipher key table comprising data and a plurality of decipher keys which are required for decrypting data from an optical disk of recording type;

a control apparatus connected to said optical disk reproducing apparatus; and a data decrypting apparatus for decrypting data by using the plurality of decipher keys, wherein said optical disk reproducing apparatus comprises first reproducing means for reproducing the decipher key table from the optical disk, encrypting means for encrypting the reproduced decipher key table, and for transmitting the encrypted decipher key table to said control apparatus, and second reproducing means for reproducing a decipher key status table for indicating recorded statuses of the plurality of decipher keys from the optical disk;

wherein said control apparatus comprises receiving means for receiving the encrypted decipher key table from said optical disk reproducing apparatus, and searching means for searching for the encrypted decipher key which is required for decrypting data that is recorded on the optical disk from the received decipher key table based on the reproduced decipher key status table, and for transmitting the searched encrypted decipher key to said data decrypting apparatus; and wherein said data decrypting apparatus comprises first decrypting means for decrypting the encrypted decipher key, and for producing the decrypted decipher key, and second decrypting means for decrypting the encrypted data by using the decrypted decipher key, wherein said optical disk reproducing apparatus reproduces the encrypted data which is decrypted by said second decrypting means.

13. An optical disk recording apparatus for recording data on an optical disk of recording type on which data is recordable, wherein said optical disk includes a non-encrypted area and an encrypted area, and wherein said optical disk recording apparatus comprises:

recording means for recording data, including decipher key conversion data used for converting a decipher key into a converted decipher key, in the non-encrypted area in a non-encrypted status, and for recording encrypted data in the encrypted area, wherein the encrypted data is encrypted by using the converted decipher key.

14. The optical disk recording apparatus as claimed in claim 13, wherein said optical disk further includes a control information recording sector and a data recording sector, and wherein said recording means records, in a non encrypted status, control information used for controlling reproduction of data in said control information recording sector, converts a cipher key into a converted decipher key by using the decipher key conversion data, encrypts data by using the converted decipher key, and records the encrypted data in said data recording sector.

15. The optical disk recording apparatus as claimed in claim 14, wherein said recording means records, in a non-encrypted status, data including additional decipher key conversion data on said non-encrypted area of said data recording sector, converts the cipher key into a converted decipher key by using the decipher key conversion data included in the control information and the additional decipher key conversion data, encrypts data by using the converted decipher key, and records the encrypted data in said data recording sector.

16. An optical disk reproducing apparatus for reproducing data from an optical disk of recording type on which data is recordable, wherein said optical disk includes a non-encrypted area and an encrypted area, and wherein said optical disk reproducing apparatus comprises:

reproducing means for converting a decipher key into a converted decipher key by using decipher key conversion data which is recorded in said non-encrypted area, for decrypting data which is recorded in said encrypted area by using the converted decipher key, and for reproducing the decrypted data.

17. The optical disk reproducing apparatus as claimed in claim 16, wherein said optical disk further includes a control information recording sector and a data recording sector, and wherein said reproducing means reproduces control information which is used for controlling data reproduction from said control information recording sector, converts a decipher key into a converted decipher key busing decipher key conversion data included in the control information, decrypts data which is recorded in said data recording sector by using the converted decipher key, and reproduces the decrypted data.

18. The optical disk reproducing apparatus as claimed in claim 17, wherein said reproducing means reproduces additional decipher key conversion data which is recorded in said non-encrypted area of the data recording sector, converts the decipher key into a converted decipher key by using decipher key conversion data included in the control information and the reproduced further additional decipher key conversion data, decrypts data which is recorded in said data recording sector by using the converted decipher key, and reproduces the decrypted data.

19. An optical disk recording method for recording data in an optical disk of recording type on which data is recordable, wherein said optical disk includes a non-encrypted area and an encrypted area, and wherein said method comprises;

recording, in a non-encrypted status, data including decipher key conversion data used for converting a decipher key into a converted decipher key in the non-encrypted area;

and recording encrypted data in the encrypted area, wherein the encrypted data is encrypted by using the converted decipher key.

20. An optical disk reproducing method for reproducing data from an optical disk in which data is recordable, wherein the optical disk includes a non-encrypted area and an encrypted area, and wherein said method comprises:

converting a decipher key into a converted decipher key by using decipher key conversion data which is recorded in the non-encrypted area;

decrypting data which is recorded on in the encrypted area by using the converted decipher key; and reproducing the decrypted data.

21. An information processing system comprising:

a data encrypting apparatus operable to encrypt data by using a cipher key;

an optical disk recording and reproducing apparatus operable to reproduce a decipher key which is required for decrypting data on an optical disk of recording type, and to reproduce the recorded decipher key; and a control apparatus connected to said optical disk recording and reproducing apparatus and said data encrypting apparatus;

wherein said optical disk recording and reproducing apparatus comprises a first recording and reproducing unit operable to record a decipher key table on the optical disk, and to reproduce the decipher key table from the optical disk, an encrypting and decrypting unit operable to
encrypt the decipher key,
transmit the encrypted decipher key,
receive the encrypted decipher key from said control apparatus, and
to decrypt the encrypted decipher key; and a second recording and reproducing unit operable to record a decipher key status table for indicating a recorded status of the decipher key on the optical disk, and to reproduce the decipher key status table from the optical disk;

wherein said data encrypting apparatus comprises an encrypting unit operable to encrypt the decipher key, and to transmit the encrypted decipher key to said control apparatus; and wherein said control apparatus comprises a receiving unit operable to receive the encrypted decipher key from said encrypting unit of said data encrypting apparatus, and an allocating unit operable to search for an empty area for the decipher key based on the reproduced decipher key status table, to allocate the received and decipher key into the searched empty area, and to transmit the allocated and encrypted decipher key to said optical disk recording and reproducing apparatus, and wherein said encrypting and decrypting unit of said optical disk recording and reproducing apparatus is operable to receive the allocated and encrypted decipher key from said allocating unit of said control apparatus, and to decrypt the received encrypted decipher key.

22. An information processing system comprising:
an optical disk reproducing apparatus operable to reproduce a decipher key table comprising data and a plurality of decipher keys which are required for decrypting data from an optical disk of recording type;
a control apparatus connected to said optical disk reproducing apparatus; and
a data decrypting apparatus operable to decrypt data by using the plurality of decipher keys;
wherein said optical disk reproducing apparatus comprises
a first reproducing unit operable to reproduce the decipher key table from the optical disk,
an encrypting unit operable to encrypt the reproduced decipher key table and to transmit the encrypted decipher key table to said control apparatus, and
a second reproducing unit operable to reproduce a decipher key status table for indicating recorded statuses of the plurality of decipher keys from the optical disk;
wherein said control apparatus comprises
a receiving unit operable to receive the encrypted decipher key table from said optical disk reproducing apparatus; and
a searching unit operable to search for the encrypted decipher key which is required for decrypting data that is recorded on the optical disk from the received decipher key table based on the reproduced decipher key status table, and to transmit the searched encrypted decipher key to said data decrypting apparatus; and
wherein said data decrypting apparatus comprises
a first decrypting unit operable to decrypt the encrypted decipher key and to produce the decrypted decipher key, and
a second decrypting unit operable to decrypt the encrypted data by using the decrypted decipher key,
wherein said optical disk reproducing apparatus is operable to reproduce the encrypted data which is decrypted by said second decrypting unit.

23. An optical disk recording apparatus for recording data on an optical disk of recording type on which data is recordable,
wherein said optical disk includes a non-encrypted area and an encrypted area, and
wherein said optical disk recording apparatus comprises a recording unit operable to
record data, including decipher key conversion data used for converting a decipher key into a converted decipher key, in the non-encrypted area in a non-encrypted status, and
record encrypted data in the encrypted area, wherein the encrypted data is encrypted by using the converted decipher key.

24. The optical disk recording apparatus as claimed in claim 23,
wherein said optical disk further includes a control information recording sector and a data recording sector, and
wherein said recording unit is operable to
record, in a non encrypted status, control information which is used for controlling reproduction of data in said control information recording sector,
convert a cipher key into a converted decipher key by using the decipher key conversion data,
encrypt data by using the converted decipher key, and
record the encrypted data in said data recording sector.

25. The optical disk recording apparatus as claimed in claim 24,
wherein said recording unit is operable to
record, in a non-encrypted status, data including additional decipher key conversion data on said non-encrypted area of said data recording sector,
convert the cipher key into a converted decipher key by using the decipher key conversion data included in the control information and the additional decipher key conversion data, to encrypt data using by the converted decipher key, and
record the encrypted data in said data recording sector.

26. An optical disk reproducing apparatus operable to reproduce data from an optical disk of recording type on which data is recordable,
wherein said optical disk includes a non-encrypted area and an encrypted area, and
wherein said optical disk reproducing apparatus comprises:
a reproducing unit operable to
convert a decipher key into a converted decipher key by using decipher key conversion data which is recorded in said non-encrypted area,
decrypt data which is recorded in said encrypted area by using the converted decipher key, and
reproduce the decrypted data.

27. The optical disk reproducing apparatus as claimed in claim 26,
wherein said optical disk further includes a control information recording sector and a data recording sector, and
wherein said reproducing unit is operable to
reproduce control information which is used for controlling data reproduction from said control information recording sector,
convert a decipher key into a converted decipher key by using decipher key conversion data included in the control information,
decrypt data which is recorded in said data recording sector by using the converted decipher key, and reproduce the decrypted data.

28. The optical disk reproducing apparatus as claimed in claim 27, wherein said reproducing unit is operable to
reproduce additional decipher key conversion data which is recorded in said non-encrypted area of said data recording sector,
converts the decipher key into a converted decipher key by using decipher key conversion data included in the control information and the reproduced additional decipher key conversion data,
decrypt data which is recorded in said data recording sector by using the converted decipher key, and reproduce the decrypted data.

* * * * *

UNITED STATES PATENT AND TRADEMARK OFFICE
CERTIFICATE OF CORRECTION

PATENT NO. : 6,938,162 B1  Page 1 of 1
APPLICATION NO. : 09/560563
DATED : August 30, 2005
INVENTOR(S) : Takahiro Nagai et al.

It is certified that error appears in the above-identified patent and that said Letters Patent is hereby corrected as shown below:

Column 8, line 21, please replace "encryptedby," with --encrypted by,--.
Column 25, line 31, please replace "C[BCAS)," with --C[BCAS],--.
Column 21, line 14, please delete "." after "control" and before "CPU".
Column 28, line 33, please delete "." after "C".
Column 50, line 64, please replace "211.8," with --2118,-- after "device" and before "the".

IN THE CLAIMS

Column 57, line 21, please add --,-- after "area" and before "when".
Column 59, line 44, please replace "busing" with --by using-- before "decipher".
Column 59, line 55, please delete "further" after "reproduced" and before "additional".
Column 59, line 64, please replace ";" with --:-- after "comprises".

Signed and Sealed this

Third Day of October, 2006

JON W. DUDAS
*Director of the United States Patent and Trademark Office*